United States Patent
Amendola et al.

(10) Patent No.: US 9,680,193 B2
(45) Date of Patent: Jun. 13, 2017

(54) ELECTRICALLY RECHARGEABLE, METAL ANODE CELL AND BATTERY SYSTEMS AND METHODS

(71) Applicant: Eos Energy Storage, LLC, Edison, NJ (US)

(72) Inventors: Steven Amendola, Easton, PA (US); Michael Binder, Brooklyn, NY (US); Phillip J. Black, McConnellsburg, PA (US); Stefanie Sharp-Goldman, East Brunswick, NJ (US); Lois Johnson, Edison, NJ (US); Michael Kunz, Saylorsburg, PA (US); Michael Oster, Red Bank, NJ (US); Tesia Chciuk, Bethlehem, PA (US); Regan Johnson, Fairfield, PA (US)

(73) Assignee: Eos Energy Storage, LLC, Edison, NJ (US)

( * ) Notice: Subject to any disclaimer, the term of this patent is extended or adjusted under 35 U.S.C. 154(b) by 156 days.

(21) Appl. No.: 14/364,742

(22) PCT Filed: Dec. 14, 2012

(86) PCT No.: PCT/US2012/069677
§ 371 (c)(1),
(2) Date: Jun. 12, 2014

(87) PCT Pub. No.: WO2013/090680
PCT Pub. Date: Jun. 20, 2013

(65) Prior Publication Data
US 2015/0010833 A1    Jan. 8, 2015

Related U.S. Application Data

(60) Provisional application No. 61/570,716, filed on Dec. 14, 2011.

(51) Int. Cl.
*H01M 12/08* (2006.01)
*H01M 10/04* (2006.01)
(Continued)

(52) U.S. Cl.
CPC .............. *H01M 12/08* (2013.01); *H01M 4/24* (2013.01); *H01M 4/362* (2013.01); *H01M 4/38* (2013.01);
(Continued)

(58) Field of Classification Search
CPC . H01M 4/64–4/80; H01M 4/86–4/863; H01M 12/00; H01M 12/04–12/085
See application file for complete search history.

(56) References Cited

U.S. PATENT DOCUMENTS 2,654,795 A   10/1953 Brill et al.
3,043,898 A   7/1962 Miiler et al.
(Continued)

FOREIGN PATENT DOCUMENTS

DE   1805022   5/1969
EP   1027746   8/2000
(Continued)

OTHER PUBLICATIONS

EOS Energy Storage, LLC, "Energy Storage: Commercial & Industrial Opportunity Summary", 2012.
(Continued)

*Primary Examiner* — Jonathan Crepeau
*Assistant Examiner* — Jacob Buchanan
(74) *Attorney, Agent, or Firm* — Honigman Miller Schwartz and Cohn LLP; Andrew N. Weber; Jonathan P. O'Brien

(57) ABSTRACT

The invention provides for a fully electrically rechargeable metal anode battery systems and methods of achieving such systems. An electrically rechargeable metal anode cell may
(Continued)

comprise a metal electrode, an air contacting electrode, and an aqueous electrolyte separating the metal electrode and the air contacting electrode. In some embodiments, the metal electrode may directly contact the liquid electrolyte and no separator or porous membrane is needed between the air contacting electrode and the electrolyte. Rechargeable metal anode cells may be electrically connected to one another through a centrode connection where a metal electrode of one cell and an air contacting electrode of a second cell are electrically connected. Air tunnels or pathways may be provided between individual metal anode cells arranged in a stack. In some embodiments, an electrolyte flow management system may also be provided to maintain liquid electrolyte at constant levels during charge and discharge cycles.

73 Claims, 20 Drawing Sheets

(51) Int. Cl.
  H01M 2/36 (2006.01)
  H01M 2/38 (2006.01)
  H01M 4/24 (2006.01)
  H01M 4/36 (2006.01)
  H01M 4/38 (2006.01)
  H01M 4/42 (2006.01)
  H01M 4/46 (2006.01)
  H01M 4/48 (2010.01)
  H01M 4/50 (2010.01)
  H01M 4/52 (2010.01)
  H01M 4/58 (2010.01)
  H01M 4/66 (2006.01)
  H01M 4/86 (2006.01)
  H01M 4/90 (2006.01)
  H01M 10/26 (2006.01)
  H01M 10/28 (2006.01)
  H01M 12/06 (2006.01)

(52) U.S. Cl.
  CPC ............... H01M 4/42 (2013.01); H01M 4/46 (2013.01); H01M 4/48 (2013.01); H01M 4/50 (2013.01); H01M 4/52 (2013.01); H01M 4/58 (2013.01); H01M 4/5825 (2013.01); H01M 4/661 (2013.01); H01M 4/663 (2013.01); H01M 4/667 (2013.01); H01M 4/8615 (2013.01); H01M 4/8631 (2013.01); H01M 4/8647 (2013.01); H01M 4/8657 (2013.01); H01M 4/8663 (2013.01); H01M 4/90 (2013.01); H01M 4/9016 (2013.01); H01M 4/9041 (2013.01); H01M 10/0413 (2013.01); H01M 10/0418 (2013.01); H01M 10/0486 (2013.01); H01M 10/26 (2013.01); H01M 10/281 (2013.01); H01M 10/282 (2013.01); H01M 12/065 (2013.01); H01M 12/085 (2013.01); H01M 4/386 (2013.01); H01M 10/0445 (2013.01); H01M 2004/8689 (2013.01); H01M 2220/10 (2013.01)

(56) References Cited

U.S. PATENT DOCUMENTS

| | | | |
|---|---|---|---|
| 3,306,774 A | 2/1967 | Dengler | |
| 3,573,988 A * | 4/1971 | McKee et al. | H01M 4/86 423/299 |
| 3,767,466 A | 10/1973 | McCoy et al. | |
| 3,783,026 A * | 1/1974 | Kordesch | H01M 12/06 429/403 |
| 3,849,868 A | 11/1974 | Jost | |
| 3,922,177 A * | 11/1975 | Groppel | H01M 12/08 429/405 |
| 4,038,458 A | 7/1977 | Jacquelin | |
| 4,041,211 A | 8/1977 | Wiacek | |
| 4,042,481 A | 8/1977 | Kelly | |
| 4,096,318 A * | 6/1978 | Wurmb | H01M 4/66 429/199 |
| 4,101,718 A | 7/1978 | Tamura et al. | |
| 4,152,489 A | 5/1979 | Chottiner | |
| 4,168,349 A * | 9/1979 | Buzzelli | H01M 12/08 429/405 |
| 4,341,848 A | 7/1982 | Liu et al. | |
| 4,463,066 A * | 7/1984 | Adlhart | H01M 2/38 429/451 |
| 4,463,067 A * | 7/1984 | Feigenbaum | H01M 2/38 429/451 |
| 4,463,068 A * | 7/1984 | Cohn | H01M 2/38 429/451 |
| 4,503,132 A | 3/1985 | Struthers | |
| 4,551,399 A | 11/1985 | Despic | |
| 4,596,749 A * | 6/1986 | Congdon | H01M 2/36 429/409 |
| 4,842,963 A * | 6/1989 | Ross, Jr. | H01M 4/244 29/623.1 |
| 4,908,072 A * | 3/1990 | Taki | C23C 8/02 148/218 |
| 4,927,717 A | 5/1990 | Turley et al. | |
| 4,948,682 A | 8/1990 | Sonneveld | |
| 4,988,581 A | 1/1991 | Wycliffe | |
| 5,049,457 A * | 9/1991 | Niksa | H01M 2/1264 429/188 |
| 5,126,218 A | 6/1992 | Clarke | |
| 5,188,712 A | 2/1993 | Dilmore et al. | |
| 5,232,798 A | 8/1993 | Goldstein et al. | |
| 5,242,763 A | 9/1993 | Konishi et al. | |
| 5,306,579 A | 4/1994 | Shepard, Jr. et al. | |
| 5,460,896 A | 10/1995 | Takada et al. | |
| 5,521,029 A | 5/1996 | Fiorino et al. | |
| 5,560,999 A | 10/1996 | Pedicni et al. | |
| 5,615,717 A * | 4/1997 | Cheiky | H01M 2/362 137/260 |
| 5,716,726 A * | 2/1998 | Cheiky | H01M 2/362 429/144 |
| 6,051,328 A | 4/2000 | Witzigreuter et al. | |
| 6,068,944 A | 5/2000 | Witzigreuter et al. | |
| 6,235,418 B1 | 5/2001 | Pedicni | |
| 6,265,094 B1 | 7/2001 | Pedicini et al. | |
| 6,689,711 B2 | 2/2004 | Lefebvre | |
| 6,716,331 B2 | 4/2004 | Chikuma | |
| 7,238,448 B1 | 7/2007 | Kaplan et al. | |
| 7,314,685 B2 | 1/2008 | Brown et al. | |
| 7,396,440 B2 | 7/2008 | Amendola | |
| 7,582,385 B2 | 9/2009 | Clarke | |
| 8,802,304 B2 | 8/2014 | Amendola et al. | |
| 2001/0014416 A1 | 8/2001 | Faris et al. | |
| 2001/0023036 A1 | 9/2001 | Faris et al. | |
| 2002/0031701 A1* | 3/2002 | Kawakami | H01M 2/14 429/137 |
| 2002/0031705 A1 | 3/2002 | Tucholski | |
| 2002/0064710 A1* | 5/2002 | Kawakami | H01M 4/02 429/231.95 |
| 2002/0142203 A1 | 10/2002 | Ma et al. | |
| 2003/0113632 A1 | 6/2003 | Brown et al. | |
| 2003/0162087 A1 | 8/2003 | Clarke et al. | |
| 2004/0053132 A1* | 3/2004 | Smedley | H01M 4/42 429/229 |
| 2004/0115503 A1 | 6/2004 | Jacobson et al. | |
| 2004/0202931 A1 | 10/2004 | Christian et al. | |
| 2004/0247969 A1 | 12/2004 | Faris et al. | |
| 2005/0121655 A1 | 6/2005 | Bugnet et al. | |
| 2005/0208386 A1 | 9/2005 | Clarke | |
| 2006/0003228 A1* | 1/2006 | Chin | H01M 4/12 429/229 |
| 2006/0108214 A1 | 5/2006 | Amendola | |
| 2006/0141340 A1 | 6/2006 | Takeuchi et al. | |

(56) References Cited

U.S. PATENT DOCUMENTS

| | | |
|---|---|---|
| 2007/0003833 A1 | 1/2007 | Li et al. |
| 2007/0196260 A1 | 8/2007 | Kikkawa et al. |
| 2007/0202403 A1 | 8/2007 | Oh et al. |
| 2007/0256932 A1 | 11/2007 | Martin et al. |
| 2008/0044640 A1 | 2/2008 | Wang Chen |
| 2008/0096061 A1 | 4/2008 | Burchardt |
| 2008/0096074 A1 | 4/2008 | Wu |
| 2008/0182176 A1 | 7/2008 | Aurbach et al. |
| 2009/0272645 A1 | 11/2009 | Yang et al. |
| 2010/0015473 A1 | 1/2010 | Hendriksen et al. |
| 2010/0062327 A1* | 3/2010 | Li ................. H01M 10/26 429/105 |
| 2011/0070506 A1 | 3/2011 | Friesen et al. |
| 2011/0104576 A1* | 5/2011 | Johnson ............ B82Y 30/00 429/405 |
| 2011/0111287 A1* | 5/2011 | Sayre ............. H01M 4/8605 429/199 |
| 2011/0200884 A1* | 8/2011 | Uchida ............ H01M 4/139 429/245 |
| 2011/0318656 A1* | 12/2011 | Hago ............... C01B 25/37 429/405 |
| 2012/0021303 A1 | 1/2012 | Amendola et al. |
| 2012/0034515 A1 | 2/2012 | Kang et al. |
| 2012/0040254 A1 | 2/2012 | Amendola et al. |
| 2013/0115531 A1 | 5/2013 | Amendola et al. |
| 2013/0209919 A1 | 8/2013 | Amendola et al. |

FOREIGN PATENT DOCUMENTS

| | | | |
|---|---|---|---|
| EP | 1850412 | 10/2007 | |
| JP | 55-47003 | 11/1980 | |
| JP | 2009-266675 | 11/2009 | |
| JP | 2010-108904 | 5/2010 | |
| WO | 88/01103 | 2/1988 | |
| WO | 96/19838 | 6/1996 | |
| WO | 00/44057 | 7/2000 | |
| WO | 2005/004260 | 1/2005 | |
| WO | 2007/065899 | 6/2007 | |
| WO | 2007/144357 | 12/2007 | |
| WO | WO 2010055922 A1 * | 5/2010 | ............ H01M 4/139 |
| WO | 2010/118586 | 10/2010 | |
| WO | 2012/012558 | 1/2012 | |
| WO | 2012/021550 | 2/2012 | |
| WO | 2013/112660 | 8/2013 | |

OTHER PUBLICATIONS

EOS Energy Storage, LLC, "Energy Storage: Military Opportunity Summary", 2012.

EOS Energy Storage, LLC, "Energy Storage: Opportunity Summary", 2012.

EOS Energy Storage, LLC, "Energy Storage: Technology Opportunity Summary", 2012.

EOS Energy Storage, LLC, "Energy Storage: Utility Opportunity Summary", 2012.

Liu, Jing-Liang et al., "Low temperature hydrothermal synthesis of nano-sized manganese oxide for supercapacitors", Journal of the International Society of Electrochemistry, Elsevier, vol. 66, Apr. 1, 2012, pp. 302-305.

Zhao, Dezhi et al., "Ozone Catalytic Oxidation of HCHO in Air over MnOx at Room Temperature", Chinese Journal of Catalysis, vol. 33, Issue 3, 2012, pp. 396-401.

Bredikhin S. I., et al., "Protective Coatings Based on Mn—Co Spinel for Current Collectors of Solid Oxide Fuel Cells", Russian Journal of Electrochemistry, vol. 45, No. 5, 2009, pp. 520-526.

Fratello, V.J., et al., "Nickel containing perovskites", Journal of Crystal Growth, vol. 166, Iss. 1-4, Sep. 1996, pp. 878-882.

International Search Report for PCT/US2011/044715 Dated Feb. 24, 2012.

International Search Report for PCT/US2011/047137 Dated Feb. 29, 2012.

International Search Report for PCT/US2012/069677 Dated Jun. 19, 2013.

International Search Report for PCT/US2013/022852 Dated May 29, 2013.

Leninskie, Gory, "Exoemission and catalytic activity of oxides with perovskite and spinel structures in the oxidation of CO and hydrocarbons", Russian Chemical Bulletin, vol. 51, No. 1, Jan. 2002, pp. 46-53.

Shropshire, Joseph A., et al. "The Nitric Acid-Air Redox Electrode", Am. Chem. Soc., Jan. 1, 1963, pp. 158-16169.

* cited by examiner

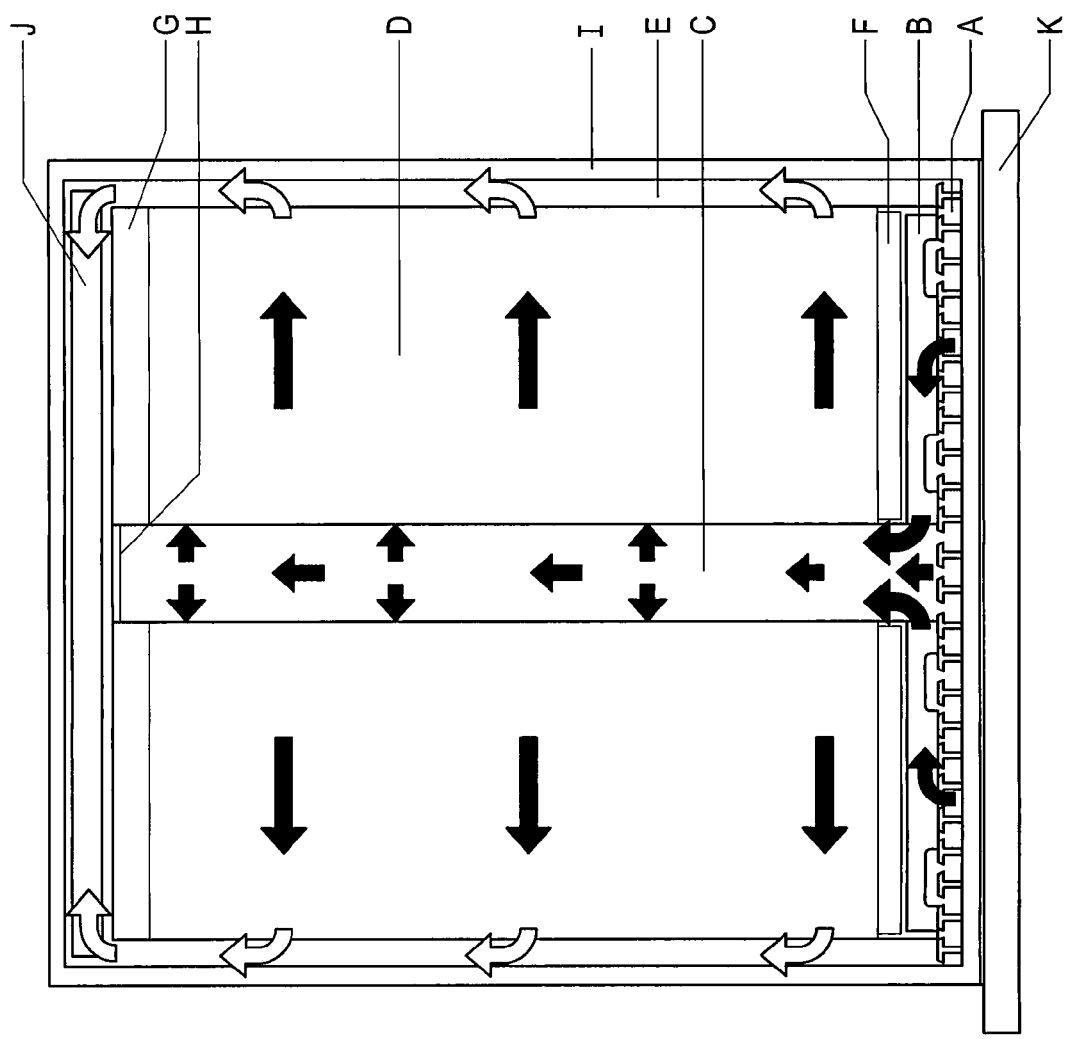

ELECTRICALLY RECHARGEABLE, METAL ANODE CELL AND BATTERY SYSTEMS AND METHODS

CROSS REFERENCE TO RELATED APPLICATION

This U.S. non-provisional application claims the benefit of PCT application number PCT/US2012/069677, filed on Dec. 14, 2012, which claims the benefit of U.S. provisional application ser. No 61/570,716, which was filed on Dec. 14, 2011. The entire contents of these applications are incorporated by reference herein.

BACKGROUND OF THE INVENTION

The combination of an aging electrical grid infrastructure and integration of intermittent generation sources from large scale renewable energy resources (such as wind, solar, and ocean waves) has increased the critical need to develop effective energy storage technologies to achieve power supply stability of the grid and shift electric power supplies during peak and off-peak periods. Electricity providers are looking for ways to add clean power to the grid, prevent power outages and manage peak loads in a cost effective way without adding additional generating capacity. Storage batteries are critical elements in the expansion and large-scale adoption of renewable energy sources such as wind power and solar farms.

To date, no single battery system is commercially successful in this application. There are several reasons for this. One reason is the high cost of existing battery systems. Consequently, electricity providers prefer using gas turbines to provide peak power to the grid as needed. However, gas turbines are not as versatile or useable as true storage devices such as batteries. A second reason is that current battery cycle life is too low, making true lifetime costs much higher than the initial battery cost. Another reason is that many batteries (such as sodium-sulfur batteries) operate at elevated temperatures, contain hazardous chemicals, or may be subject to secondary detrimental chemical reactions such as those occurring in lithium based batteries. In short, there is no current commercial battery technology that offers large scale battery size, suitable performance, and long discharge/charge cycle life at a commercially viable price and a viable service life for electricity providers.

Ideally, electrochemical charging of a cell or battery is such that 60% or more, preferably 80% or more, and more preferably 90% or more of a battery or cell's prior discharge capacity can be available again for useful discharge capacity within an electrochemical charging period of one hour or less, and preferably within 30 minutes or less.

Therefore, a need exists for improved battery systems. A further need exists for rechargeable battery configurations that are commercially viable.

SUMMARY OF THE INVENTION

The present invention provides solutions to one or more of the technical problems described above.

The present invention provides a new electrically rechargeable metal anode system design and battery chemistry has been provided in accordance with various aspects of this invention. This metal anode cell design incorporates a substantial number of novel and previously unexplored chemical, materials, structural, and design changes. The various changes and modifications of this zinc anode battery system will be described in greater detail below. In some embodiments, this metal anode cell may be a zinc-air cell. The new battery system has been successfully electrically discharged and charged this new battery system over 1800 times with no evidence of air cathode degradation. Based on such results, a long operational life is expected. Some (or all) of the modifications listed herein may be combined to obtain cell performance with long cycle life that may make this zinc air system both affordable and practical.

An aspect of the invention is directed to a rechargeable metal anode cell which may comprise a metal electrode; an air contacting, porous electrode containing a catalyst; and an aqueous electrolyte between the metal electrode and the porous, air contacting electrode, wherein the metal electrode directly contacts the electrolyte and no separator is provided or needed between the air contacting electrode and the metal electrode. In some additional embodiments, no separator is provided between the air contacting electrode and the electrolyte.

A metal may include any metal, metal alloy, intermetallic material, mischmetals, or mixtures of aforementioned materials.

Metals may also include clad materials where one metal is coated on another metal or on any suitable conductive substrate. It may also include tri-clad materials where one metal (or metal alloy) is coated on a second metal (or suitable conductive substrate), and in turn, a third metal (or metal alloy) is coated on top of these two metals. The underlying metal and the coated metal may either be the same metal or alloy or a different metal or alloy. A simple example of a metal clad could include a case where metal A is coated on metal B. Metal A may be the same as metal B or it could be a different metal. A tri-clad could consist of three separate metals for example, metal C coated on top of metal A, which in turn, is coated on metal B. Metal C could either be the same as either metal A or B, or it could be a totally different metal. Examples could include titanium coated on copper or nickel. Another suitable metal may be coated between the titanium and copper. Any number of metals and/or other conductive materials may be clad, including but not limited to two, three four, five, six, seven or more. Any of the cladding materials and/or substrates may be any conductive material, which may include but is not limited to metal (e.g., copper, nickel, aluminum, titanium, silver, gold, iron, steel, brass, platinum, palladium), any other electrically conductive materials, and/or any other material described elsewhere herein.

An intermetallic may refer to compositions which consist of only metal atoms which are bound to each other via metallic bonds in non-stoichiometric ratios. Examples could include but are not limited to Ag—Ni, Ag—Au, PdPt, $Pt_{0.5}Au_{0.5}$, PdNi, PdIr, or $A_xB_y$, where A represents ruthenium, palladium, rhenium, iridium or platinum, B represents aluminum, scandium, yttrium, the lanthanides, titanium zirconium, hafnium, vanadium, niobium, or tantalum, and x and y are suitable subscripts, such that x and y are integers and both greater than or equal to 1 (e.g., 1, 2, 3, 4, 5, 6, 7, 8, or the like) and x+y is greater than or equal to two.

A separator may include a generally porous material designed to separate or electrically isolate the cathode from the anode. This material may be ionically conducting but electrically insulating. By being positioned between the cathode and anode, a separator could reduce convective flow by ~20%. A separator could reduce ionic transport (over that which would occur if no separator were present) by ~15%.

An air contacting electrode could comprise an electrically conductive, porous material which is in contact with air. This porosity may allow oxygen from the air to diffuse through the pores and come into physical and electrical contact with the material in the electrode. Ordinarily, one side of the gas contacting electrode is in contact with a gas phase (for instance the air space of a metal anode cell) and the other side is exposed to an electrolyte phase. In a bipolar cell configuration, an electrical contact is provided between an air contacting electrode of one cell and the anode of an adjacent cell.

Another aspect of the invention is directed to a rechargeable metal anode cell system comprising a metal electrode; an air contacting electrode; and an aqueous electrolyte solution having a pH in the range of about 3 to about 10 (e.g., about 3.5 to about 9.5, about 4 to about 9, or about 5 to about 8), wherein the battery cell system is capable of at least 500 or more discharge and electrically recharge cycles without physical degradation of the materials or substantial degradation of the cell and system's performance.

A cell assembly may be provided in accordance to another aspect of the invention. A battery assembly may comprise a number of individual cells. Each cell may comprise a metal electrode, an air contacting electrode containing a catalyst, and liquid electrolyte between them. The first cell may be connected to a second cell also having a metal electrode, an air contacting electrode, and liquid electrolyte between them. These two cells are connected in a manner where the metal electrode of cell #1 contacts the air contacting electrode of cell #2. This allows an air space or tunnel to be formed between the electrode of cell #1 and the air contacting electrode of cell #2. In this configuration, the metal electrode and air contacting electrode are parallel to each other and horizontally oriented.

An additional aspect of this invention provides an energy storage system comprising: a liquid electrolyte supply assembly having a flow control feature that is configured in such a way as to distribute (e.g., add or remove) liquid electrolyte, as needed, to individual cells. It may include at least one port having an overflow portion, wherein the flow control feature allows excess or surplus electrolyte to overflow from each individual cell in a battery if electrolyte volumes in that cell increases considerably. It may also allow individual cells within a battery to be refilled with liquid electrolyte should electrolyte volumes in that particular cell decrease. In some embodiments, the flow control features may be vertically aligned over the overflow portion.

A method for storing energy may provide another aspect of the invention. This method may comprise receiving an electrolyte at an electrolyte supply tank; and allowing, if overflow occurs at the electrolyte supply tank, some electrolyte to fall from an electrolyte supply tank to an underlying cell; and allowing, if overflow occurs at the underlying cell, some electrolyte to fall from the first cell to a second cell or a collection tank. This electrolyte cascading effect assures that electrolyte levels in all cells are approximately level and full. This may help maintain good electrical contact and approximately equal and level electrolyte volumes even with expansion, contraction or evaporation of electrolyte.

Additional methods may be provided in accordance with other aspects of the invention. A method for storing electrical energy may comprise providing one or more bipolar air contacting electrodes with an air space between them. The combination of an air contacting electrode from one cell connected to a metal electrode of another cell—may be referred to as a "centrode". A 'centrode' consists of a metal electrode (generally, the anode) from one cell in electrical contact with an air contacting electrode of a second cell. This allows an air tunnel to be provided between the metal electrode and the air contacting electrode. A frame extends on top of one or more of these centrodes and a second frame extends below these centrodes. The first cell comprises the space over the metal electrode and is enclosed by the first frame for accepting liquid electrolyte. A second cell comprises the space below the air contacting electrode and closed by the second space for accepting an electrolyte. In some embodiments, a centrode may be provided as described or illustrated elsewhere herein.

A system for storing utility-scale energy, provided in accordance with an aspect of the invention, may comprise a plurality of cells comprising at least one frame, wherein one or more air tunnels are provided between individual cells; an electrolyte flow management system that is configured to distribute electrolyte to one or more cells or cell stacks; and an air flow assembly configured to provide air flow through the one or more air tunnels. In some embodiments, the electrolyte management system may be integral to one or more frames.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of potential or preferable embodiments. For each aspect of the invention, many variations are possible as suggested herein that are known to those of ordinary skill in the art. A variety of changes and modifications can be made within the scope of the invention without departing from the spirit thereof.

One aspect of the present invention provides an electrically rechargeable metal anode cell or battery comprising a metal electrode, an air contacting electrode; and an aqueous electrolyte situated between the metal electrode and the air contacting electrode, wherein the metal electrode directly contacts the liquid electrolyte, and without an ionically conducting and electrically insulating material between the air contacting electrode and the liquid electrolyte.

Some embodiments provide a cell or battery that comprises a frame supporting both the metal electrode and the air contacting electrode so that the metal electrode and the air contacting electrode are situated at a fixed distance from one another. For example, the fixed distance between the metal electrode and the air contacting electrode defines a space in which liquid electrolyte may be contained. In other examples, the frame is at least partially formed of a polymer material or plastic. And, in some examples, the frame comprises a shelf that protrudes within the battery or cell and that contacts the metal electrode.

In some embodiments, the metal electrode comprises zinc. In others, the metal electrode comprises magnesium.

In some embodiments, the air contacting electrode comprises a matrix comprising carbon or a polymer; an air permeable hydrophobic membrane; and a corrosion resistant, electrically conductive current collector.

In some embodiments, the current collector comprises a conductive material comprising an expanded metal, a conductive screen, cloth, foam, a sheet, a wire, a shard, a rod, wool, or any combination thereof. In some examples, the current collector comprises one or more electrically conductive polymers.

In some embodiments, oxygen gas evolution is favored during the charging of the cell or battery.

In some embodiments, a metal compound changes its oxidation state and forms a catalytic material that favors oxygen gas evolution during the charging of the cell or battery.

In some embodiments, the air contacting electrode and metal electrode are connected in a bipolar configuration. In others, the air contacting electrode is in a horizontal orientation and positioned above the metal electrode.

Some embodiments further comprise an auxiliary electrode configured for cell charging and associated oxygen generation that is situated between the air contacting electrode and the metal electrode, or on both sides of the metal electrode.

In some embodiments, the air contacting electrode comprises a carbon material. For example, the air contacting electrode comprises one or more of the following: carbon black, acetylene black, thermal or furnace black, channel black, activated carbon, graphite, pyrolytic graphite, reticulated vitreous carbon, fluorinated carbons, or glassy carbon. In other examples, the air contacting electrode comprises carbon-based particles of various shapes and sizes which include one or more of the following: carbon nanotubes, functionalized nanotubes, carbon nanofibers, functionalized nanofibers, wires, flakes, films, graphene, or fullerenes. And, in some examples, the air contacting electrode comprises at least one carbon-based compound, wherein the resistivity of the air contacting electrode is less than 60 ohms-cm.

In other embodiments, the air contacting electrode comprises at least one carbon-based compound, wherein the porosity of the air contacting electrode is greater than 30%.

In some embodiments, the air contacting electrode comprises at least one carbon based electrically conducting polymer.

Some embodiments further comprise a binder that imparts the air contacting electrode with a tensile strength of greater than about 2 psi.

In some embodiments, the air contacting electrode comprises at least one non-carbonaceous material.

In alternative embodiments, the air contacting electrode comprises at least one metal or non-metal oxide. For example, the air contacting electrode comprises one or more metal oxides that are non-stoichiometric and have the formula $M_{m-x}O_{m-y}$, wherein M represents a metal, O represents oxygen, subscript x has a value $0<x<1$, subscript y has a value $0 \leq y \leq 1$, and subscript m may have a value $1 \leq m \leq 5$. In other examples, the air contacting electrode comprises one or more metal or non-metal oxides belonging to the group selected from: $PtO_2$, $NiO_2$, $Nb_2O_5$, $MoO_3$, $ZnO_2$, $SnO_2$, $Fe_2O_3$, $W_2O_3$, $Al_2O_3$, $Bi_2O_3$, $Yb_2O_3$, $Ge_2O_3$, $B_2O_3$ or $CeO_2$. And, in other embodiments, the air contacting electrode comprises doped or undoped silicon. For example, the air contacting electrode comprises one or more of the following: $SiO_2$, aluminosilicate, ultra-marine, or $Al_2O_3$.

In some embodiments, the air contacting electrode comprises a sulfur compound. And, in some instances, the sulfur compound comprises a sulfide (e.g., SnS or $TiS_2$).

In other embodiments, the air contacting electrode comprises a carbide of one or more of the following: a metal, a non metal, or a transition metal. For example, the air contacting electrode comprises one or more of the following: TiC, VC, WC, or BC.

In some embodiments, the air contacting electrode comprises a boride of one or more of the following: a metal, a non metal, or a transitional metal. For example, the air contacting electrode comprises $TiB_2$.

In some embodiments, the air contacting electrode comprises one or more of: a metal, a non metal, or a transition metal. For example, the air contacting electrode comprises one or more of the following elements: Ir, Zr, Ti, Pt, Ru, Rh, Co, Mn, V, Ce, Bi, Ag, Cu, Fe or Au. In other examples, the air contacting electrode comprises nanoparticles comprising one or more of the following elements: Ir, Zr, Ti, Pt, Ru, Rh, Co, Mn, V, Ce, Bi, Ag, Cu, Fe or Au.

In some embodiments, the air contacting electrode comprises $TiH_2$.

In some embodiments, the air contacting electrode comprises one or more metal or transition metal oxides. For example, the air contacting electrode comprises one or more compounds including titanium and oxygen. In other examples, the air contacting electrode comprises one or more of the following: $TiO_2$, $Ti_4O_7$, $Ti_5O_8$, or $Ti_5O_9$. And, in some examples, the air contacting electrode comprises nanosized particles comprising one or more of the following: $TiO_2$, $Ti_4O_7$, $Ti_5O_8$, or $Ti_5O_9$.

In some embodiments, the air contacting electrode comprises one or more titanium compounds, wherein the titanium has an average oxidation number of 4.0 or less. For example, the air contacting electrode comprises one or more titanium compounds, wherein the titanium has an average oxidation number between 3.5 and 4.0. In other examples, the air contacting electrode comprises one or more titanium compounds, wherein the titanium has an average oxidation number between 3.2 and 3.5.

In some embodiments, the air contacting electrode comprises one or more compounds comprising vanadium and oxygen. For example, the air contacting electrode comprises one or more of the following vanadium compounds: vanadium(II)oxide, vanadium(III)oxide, vanadium(IV) oxide, or vanadium(V)oxide. And, in some examples, the air contacting electrode comprises one or more compounds containing vanadium and oxygen, wherein the oxidation state of vanadium has a non-integer value ranging between 5.0 and 3.0. In alternative examples, the air contacting electrode comprises $V_6O_{13}$ or $V_5O_8$.

In some embodiments, the air contacting electrode comprises one or more manganese compounds wherein manganese has oxidation state of 4.0 or less. For example, the air contacting electrode comprises one or more manganese compounds wherein manganese is in an average oxidation state between 3.5 and 4.0. In other examples, the air contacting electrode comprises one or more manganese compounds wherein manganese is in an average oxidation state between 3.0 and 3.5. And, in some examples, the air contacting electrode comprises one or more manganese compounds wherein manganese is in an average oxidation state between 2.5 and 3.0.

In some embodiments, the air contacting electrode comprises one or more of the following: $MnO_2$, $Mn_3O_4$, $Mn_5O_8$, or $MnO_x$ where the subscript x is in the range of $1.10 \leq x \leq 2.01$.

In some embodiments, the air contacting electrode comprises nanosized particles comprising one or more manganese compounds, wherein the manganese is in an average oxidation state between 3.0 and 3.5.

In some embodiments, the air contacting electrode comprises one or more compounds including a metal or transition metal, and oxygen. For example, the air contacting electrode comprises one or more of the following: $IrO_2$, $RuO_2$, $V_2O_5$, $CeO_2$, or $RhO_2$. In other examples, the air contacting electrode comprises nanoparticle sized metal oxides including one or more of the following: $IrO_2$, $RuO_2$, $V_2O_5$, $CeO_2$, or $RhO_2$.

In some embodiments, the air contacting electrode comprises metal alloys, or combinations of metals and metal alloys.

In some embodiments, the air contacting electrode comprises intermetallic mixed metals.

In some embodiments, the air contacting electrode comprises one or more of the following: Ag—Ni; Ag—Au; PdPt; $Pt_{0.5}Au_{0.5}$; $Pt_xY_{1-x}$, wherein Y is selected from the group consisting of cobalt, nickel, vanadium, copper, iron, chromium, palladium, titanium, tungsten, aluminum, silver, copper, gold or combinations thereof, and x is between 0.1 and 0.9; or $Pt_xM_zY_{1-x-z}$ wherein M is selected from the group consisting of iridium, rhenium, cobalt and nickel and combinations thereof, Y is selected from the group consisting of cobalt, nickel, vanadium, copper, iron, chromium, palladium, titanium, tungsten, aluminum, silver, copper, gold or combinations thereof, and x+z is between 0.1 and 0.9.

In some embodiments, the air contacting electrode comprises one or more metal based cyclic ring compounds that contain nitrogen groups. For example, the air contacting electrode comprises a porphyrin comprising one or more metals, or thermal or radiation induced decomposition products of a porphyrin comprising one or more metals.

In some embodiments, the air contacting electrode comprises a cyclic ringed compound or complex. For example, the air contacting electrode comprises a tetraazaazulene.

In some embodiments, the air contacting electrode comprises cobalt or a compound thereof.

In some embodiments, the air contacting electrode comprises nickel or a compound thereof.

In some embodiments, the air contacting electrode comprises nanosized transition metals.

In some embodiments, the air contacting electrode comprises a plurality of cobalt particles having a mean diameter of less than 1 micron.

In some embodiments, the air contacting electrode comprises one or more oxides, carbides, or borides of a transition metal and further comprising an electrically conductive additive.

In some embodiments, the air contacting electrode comprises a manganese oxide and an electrically conductive additive. For example, the air contacting electrode comprises a manganese oxide and electrically conductive carbon.

In some embodiments, the air contacting electrode comprises a manganese oxide and a plurality of conductive particles comprising a metal.

In some embodiments, the air contacting electrode comprises a manganese oxide having the general formula $A_aMn_xM_yO_zS_sH_h$; wherein A is chosen from H, Li, Na, K, Rb, Sr or Ag; subscript a is $0.00 \leq a < 1.2$; Mn represents manganese; M is chosen from V, Ce, Bi, Ti, Fe, Co, Ni, Zr, La, Yb; O represents oxygen; S represents sulfur; subscript s is $0.00 \leq s \leq 0.1$; H is chosen from F or Cl; subscript h is $0.00 \leq h \leq 0.15$; and subscripts x, y, and z have values such that the overall compound is electrically neutral.

In some embodiments, the manganese compound comprises a crystallographic phase selected from: alpha, beta, or gamma $MnO_2$.

In some embodiments, the manganese compound comprises an amorphous phase.

In some embodiments, the air contacting electrode comprises cobalt oxides. For example, the air contacting electrode comprises cobalt and oxygen, wherein cobalt has an oxidation number of from +2 to +8. In other examples, the air contacting electrode comprises one or more of the following: $CoO$, $CoO_3$, $CoO_4$, or $Co_3O_4$. And, in some examples, the air contacting electrode comprises a plurality of particles comprising $CoO$, $CoO_3$, $CoO_4$, or $Co_3O_4$ and having a mean particle diameter of less than 1 micron.

In some embodiments, the air contacting electrode comprises $PbMnO_x$ wherein Pb represents lead, Mn represents manganese, and the subscript x is a number such that the compound is electrically neutral.

In some embodiments, the air contacting electrode comprises one or more compounds having a stable combination of a transition metal, oxygen, and a lanthanide. For example, the air contacting electrode comprises a plurality of particles of one or more compounds having a stable combination of a transition metal, oxygen, and a lanthanide, wherein the particles have a mean diameter of less than 1 micron. In other examples, the air contacting electrode comprises $LaMnO_3$. And, in some examples, the air contacting electrode comprises nanoparticles of $LaMnO_3$.

In some embodiments, the air contacting electrode comprises a compound having the general formula $LaM_xMn_yO$, wherein La represents lanthanide, M represents a metal, Mn represents manganese, O represents oxygen, and subscripts x, y, and z are numbers such that the compound is electrically stable. For example, the air contacting electrode comprises one or more of: $LaNi_{0.5}Mn_{0.5}O_3$, $LaCu_{0.5}Mn_{0.5}O_3$, $La_{0.8}Sr_{0.2}MnO_3$, $La_{2/3}Ca_{1/3}MnO_3$, or $La_{1/2}Sr_{1/2}MnO_3$. In other examples, the air contacting electrode comprises nanoparticles of $LaNi_{0.5}Mn_{0.5}O_3$, $LaCu_{0.5}Mn_{0.5}O_3$, $La_{0.8}Sr_{0.2}MnO_3$, $La_{2/3}Ca_{1/3}MnO_3$, or $La_{1/2}Sr_{1/2}MnO_3$.

In some embodiments, the air contacting electrode comprises a transition metal, an alkali or alkaline earth metal, and a phosphate group, having the general formula $A_xM_yPO_z$ wherein A is an alkali or alkaline earth metal, M is transition metal, and subscripts x and y are numbers such that the compound is stable and the subscript z has a value of about 4.

In some embodiments, the air contacting electrode comprises $LiMnPO_4$, $LiCoPO_4$, or $LiFePO_4$. For example, the air contacting electrode comprises nanoparticles of $LiMnPO_4$, $LiCoPO_4$, or $LiFePO_4$.

In some embodiments, the air contacting electrode comprises a compound having a combination of a lanthanide, a metal, a transition metal oxide, and a halogen, having the general formula $Mn_xM_yA_zO_aH_b$ wherein Mn is manganese, M is a transition metal, A is an alkali or alkaline earth metal, O is oxygen, H is a halogen, and subscripts x, y, a, and b are values such that the compound is electrically stable.

In some embodiments, the air contacting electrode comprises nanoparticles of a compound having a combination of a lanthanide, a metal, a transition metal oxide, and a halogen having the general formula $Mn_xM_yA_zO_aH_b$ wherein Mn is manganese, M is a transition metal, A is an alkali or alkaline earth metal, O is oxygen, H is a halogen, and subscripts x, y, a, and b are values such that the compound is electrically stable.

In some embodiments, the air contacting electrode comprises a compound that undergoes electrochemical reduction or oxidation, and thereby provides an additional voltage plateau or added capacity during electrical discharge. In some examples, the compound is one that by undergoing electrochemical reduction or oxidation effectively lowers required cell charging potentials or raises potentials during cell discharge.

In some embodiments, a compound proximal to the air contacting electrode undergoes reduction during cell discharge, and is reoxidized by an oxidizing agent or oxidizing surface or present in the battery or cell or introduced into the battery or cell from an external source. In some instances, he oxidizing agent is an oxygen or hydrogen peroxide. In others, the oxidizing agent is $N_2O$ or ammonium nitrate. And, in some instances, the oxidizing agent is a transition metal compound dissolved in the electrolyte.

In some embodiments, the battery or cell is configured to undergo one or more electrode reactions involving one or more of urea, nitrate, chloride, or ammonia. For example, the battery or cell is configured to undergo one or more electrode reactions involving at least one of: chlorine, oxygen, hypochlorite, or chloride.

In some embodiments, the air contacting electrode current collector is made of an electrically conducting polymer.

In some embodiments, the air contacting electrode current collector is made of a metal. For example, the air contacting electrode current collector is made of titanium metal or an alloy thereof.

In some embodiments, the air contacting electrode current collector is made of titanium metal or titanium alloys coated with a corrosion resistant coating. For example, the air contacting electrode current collector is made of titanium metal or titanium alloys coated with one or more of the following: TiN, TiC, Ti, $TiB_2$ oxycarbide, $Ti_2S_3$, NiB, CrN, pyrolytic graphite, conductive polymers, or vitreous carbon. In other examples, the air contacting electrode current collector is made of titanium coated with $TiO_2$ and/or its sub-oxides. In some examples, the air contacting electrode current collector is made of titanium or its alloys coated with $TiO_2$ and which has been made more electrically conducting by means of additives or dopants.

In some embodiments, the air contacting electrode current collector is coated with an oxygen reduction or water oxidation catalyst. For example, the air contacting electrode current collector is first coated with a suitable protective coating and then coated with a suitable oxygen reduction or water oxidation catalyst. For example, the air contacting electrode current collector comprises titanium coated with an oxygen reduction or water oxidation catalyst. In other examples, the air contacting electrode current collector comprises titanium coated with a protective coating and then coated with an oxygen reduction or water oxidation catalyst.

In some embodiments, the air contacting electrode current collector is in the form of an electrically conducting screen, perforated foil, woven fabric, wire, mesh, or porous foam. For example, the air contacting electrode current collector is in the form of an electrically conductive screen, and is a composite comprising a metal, and a glassy carbon or graphite.

In some embodiments, the electrolyte comprises an aqueous chloride based electrolyte. For example, the electrolyte comprises a mixture of soluble chloride salts whose cations are suitable for forming soluble chloride salts in solution. In other examples, the electrolyte is an aqueous chloride based electrolyte having a pH in the range of about 3 to about 10. And, in some examples, the electrolyte is an aqueous chloride based electrolyte having a conductivity greater than 30 (milliohm cm)-1. In alternative examples, the electrolyte is an aqueous chloride based electrolyte having [Cl−] to [Zn++] ratios of 2 or more. And, in some examples, the electrolyte is an aqueous chloride based electrolyte having [Cl−] to [Zn++] ratios of 3 or more. In other examples, the electrolyte is an aqueous chloride based electrolyte having [Cl−] to [Zn++] ratios of 5 or more.

In some embodiments, the electrolyte comprises a mixture of soluble salts based on at least one of the following anions: sulfates, nitrates, carbonates, hexafluorosilicates, tetrafluoroborates, methane sulfonates, permanganate, hexafluorophosphates, borates, fluorides, or phosphates.

In some embodiments, the pH level of the electrolyte is such that $CO_2$ normally present in the air is not absorbed by the electrolyte, and little or no carbonates are formed.

In some embodiments, the electrolyte further comprises an additive, or combinations of additives, that improves zinc deposition during plating (cell charging) on the metal electrode. For example, the electrolyte further comprises an additive that includes at least one of the following: polyethylene glycols or thiourea.

In some embodiments, the electrolyte further comprises an additive that prevents electrolyte foaming and allows any generated gas to be released.

In some embodiments, the electrolyte comprises an additive that includes one or more of the following: Simethicone, Dowex, Aloe Vera, emulphogen, sodium dodecasulphate, turkey red oil, rosins or other surfactants.

In some embodiments, the electrolyte comprises an additive that prevents hydrogen evolution during charging.

In some embodiments, the electrolyte comprises an additive that includes one or more of the following high hydrogen overpotential chloride salts: tin chloride, tin nitrate, lead chloride, lead nitrate, mercurochloride, cadmium chloride, cadmium nitrate, bisthmuth nitrate, indium nitrate, indium chloride, or bismuth chloride.

In some embodiments, the electrolyte comprises an additive that prevents or minimizes chlorine gas and/or hypochlorite evolution during cell recharge.

In some embodiments, the electrolyte comprises an electrolyte additive comprising urea.

In some embodiments, the electrolyte comprises an additive that promotes desirable zinc plating or precipitation.

In some embodiments, the electrolyte comprises an additive that promotes zinc deposits that have an electrochemical surface area of at least twice the geometric surface area of the electrode.

In some embodiments, the electrolyte comprises an additive anion including at least one of the following anions: benzoates, iodates, stearates, nitrates, citrates or carbonates. For example, the electrolyte comprises an additive comprising an anion with a pKa of 2 to 11.

In some embodiments, the electrolyte comprises a soluble manganese salt.

In some embodiments, the metal electrode further comprises a current collector formed of a metal coated with a protective or conductive coating. For example, the metal electrode further comprises current collector formed of titanium metal coated with a protective coating of one or more of the following: TiC, TiN, CrN, $TiB_2$, NiB, a pyrolytic carbon, or a conductive polymer.

Another aspect of the present invention provides a battery assembly comprising a first cell having a metal electrode, an air contacting electrode, and electrolyte therebetween; and a second cell having a metal electrode, an air contacting electrode, and electrolyte therebetween, wherein the metal electrode of the first cell contacts the air contacting electrode of the second cell so that an air tunnel is formed between the metal electrode of the first cell and the air contacting electrode of the second cell, and wherein both the metal electrode and air contacting electrode are substantially horizontally oriented.

In some embodiments, the metal electrodes and the air contacting electrodes are housed in a substantially horizontal orientation.

In some embodiments, the metal electrode of the first cell contacts the air contacting electrode of a second cell by a mechanical crimp around the edges of the air contacting electrode of the first cell, thereby forming a centrode.

In some embodiments, the centrode provides a series connection between the first cell and the second cell.

In some embodiments, the first cell, the second cell, and one or more cells are substantially horizontally oriented, and arranged in a series parallel manner so as to achieve a desired voltage and deliver a desired current density.

In some embodiments, gas flows in a horizontal direction within the air tunnel.

Some embodiments further comprise a third cell having a metal electrode, an air contacting electrode, and electrolyte therebetween; and a fourth cell having a metal electrode, an air contacting electrode, and electrolyte therebetween, wherein the metal electrode of the third cell is mechanically crimped around the edge of the air contacting electrode of the fourth cell so that an air tunnel is formed between the metal electrode of the third cell and the air contacting electrode of the fourth cell, thereby forming a second centrode, and wherein the second centrode is in electrical contact with the first centrode, thereby providing electrical connection between the first cell and the second cell.

Another aspect of the present invention provides an energy storage system comprising an electrolyte supply assembly having a flow control feature configured to uniformly distribute liquid electrolyte to underlying metal air cells; and one or more metal anode cells comprising at least one common fill or drain port having a liquid overflow portion, wherein the flow control feature is vertically aligned over the overflow portion.

In some embodiments, the flow control feature breaks the liquid electrolyte into discontinuous, and separate drops.

In some embodiments, the one or more metal anode cells are horizontally oriented and stacked on top of each other.

In some embodiments, the fill or drain ports of each of the individual metal anode cells in a battery stack are oriented and stacked on top of each other, thereby forming a continuous vertical flow channel for liquids to traverse.

In some embodiments, the energy storage system further comprises a liquid electrolyte collection tray positioned underneath one or more metal anode cells.

In some embodiments, the electrolyte supply assembly providing liquid electrolyte to individual cells is gravity-driven.

In some embodiments, the physical structure of the electrolyte supply assembly is injection molded.

In some embodiments, the plurality of individual metal anode cells are stacked together under compression.

In some embodiments, the plurality of horizontally oriented metal anode cells are tilted slightly upwards near the electrolyte supply assembly.

In some embodiments, the metal anode cells are tilted upwards at an angle of 1 to 5 degrees from horizontal.

Another aspect of the present invention provides a method for storing energy comprising: receiving a liquid electrolyte at an electrolyte supply tank; allowing, if the liquid electrolyte overflows from the electrolyte supply tank, the liquid electrolyte to drip down to underlying metal anode cells; and allowing, if further liquid electrolyte overflow occurs at the underlying metal anode cells, some electrolyte to drip down to a second level of underlying metal anode cells or a collection tank situated beneath the underlying metal anode cells.

Some implementations further comprise: removing the liquid electrolyte from the collection tank; treating the liquid electrolyte from the collection tank; adding additional ingredients to the liquid electrolyte if needed; and providing fresh or treated liquid electrolyte to the electrolyte supply tank if needed.

In some implementations, a first metal anode cell and a second metal anode cell are electrically connected to one another in a series arrangement.

In some implementations, a first metal anode cell and a second metal anode cell have an air gap therebetween.

Another aspect of the present invention provides a method for storing energy comprising: providing one or more centrodes having a metal electrode of a first cell in contact with an air contacting electrode of a second cell, wherein an air tunnel or pathway is provided between the metal electrode and the air contacting electrode; and providing a first frame extending over the one or more centrodes and a second frame extending below the one or more centrodes, wherein the first cell comprises the space above the metal electrode and enclosed by the first frame for accepting electrolyte and the second cell comprises the space below the air contacting electrode and closed by the second space for accepting electrolyte.

Another aspect of the present invention provides a battery stack configuration comprising an arrangement of a plurality of cells stacked vertically and horizontally adjacent to one another, wherein an individual cell comprises a metal electrode and an air contacting electrode, and wherein the arrangement of the plurality of cells permits electrical connections between cells both vertically and horizontally, thereby permitting the bypass of a failed cell.

Another aspect of the present invention provides a system for storing utility-scale energy comprising: a plurality of horizontally arranged and vertically stacked metal anode cells comprising at least one frame, wherein one or more air tunnels are provided between the cells; an electrolyte flow management system integral to the one or more frames configured to automatically distribute liquid electrolyte to the cells; and an air flow assembly configured to provide air flow through the one or more air tunnels or pathways.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The various novel features of this invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 8F provides an additional view of an air flow assembly.

DETAILED DESCRIPTION OF THE INVENTION

Figure 1:
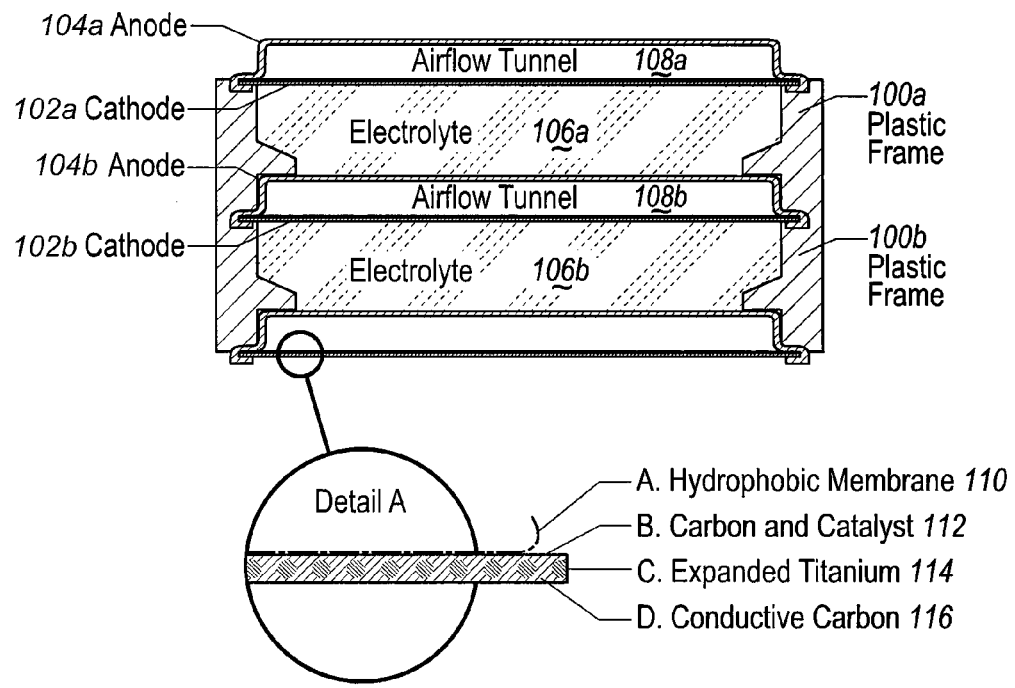
FIG. 1 shows rechargeable metal anode cells arranged in a horizontal orientation in accordance with an embodiment of the invention. For each individual cell, the air breathing, porous cathode may be positioned in a horizontal direction (on top) while the metal anode is positioned horizontally (on the bottom). Liquid electrolyte may be contained between the air breathing cathode on top and the metal anode on the bottom. A plastic frame may hold both the cathode and anode tightly in place and may prevent liquid electrolyte from leaking out of these cells. This electrode arrangement does not require a separator membrane between the cathode and anode. The open region or air space provided between each individual cell in a multi-cell assembly allows for air to readily flow in the space between these cells. As air flows between these cells, it may provide oxygen (fuel) to the porous air-breathing cathode that is facing the air space.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides electrically rechargeable metal anode cells and methods of assembling individual cells into battery systems. Various aspects of the invention described herein may be applied to any of the particular applications set forth below or for any other types of battery systems. The invention may be applied as a stand-alone system or method, or as part of a grid/utility system or a renewable energy storage system or method. It shall be understood that different aspects of the invention can be appreciated individually, collectively, or in combination with each other.

I. Metal-Air Battery

Metal anode batteries could include any number of battery systems that use a metal anode and a suitable cathode. The anode in a cell is the electrode where oxidation or loss of electrons occurs. The cathode in a cell is where reduction or acceptance of these electrons occurs. A cathode may include materials that themselves undergo electrochemical reduction. A cathode may also provide a surface or a porous structure where a suitable species may undergo reduction. As an example, oxygen from ambient air may be reduced on suitable catalytic or high surface area substrates. Metal air batteries have potential for very high energy densities at low cost. Accordingly, one aspect of the present invention provides a metal anode battery system that uses readily available atmospheric oxygen as the cathode reactant. Metal air batteries are unique power sources in that one of the reactants, oxygen gas, is not stored within the battery itself. Instead, oxygen gas, which constitutes about 20 percent of ambient air may be taken from the unlimited supply of surrounding air as needed and allowed to enter the cell where it is reduced by catalytic surfaces inside an air contacting electrode. Oxygen gas may be considered to be an essentially inexhaustible cathode reactant. Because one of the cell reactants, oxygen gas, need not be carried within the cell, the specific characteristics such as overall cell weights, volume, or size may be relatively low and energy densities (cell ampere-hour capacities per given cell weight) may be higher than for other electrochemical energy storage systems. Another advantage is the small volume and weight taken up by porous air contacting electrodes. This weight and volume advantage results in higher specific characteristics of the system (ampere-hour/kilogram and ampere-hour/liter) compared to other electrochemical power sources.

Air breathing battery systems produce electricity by the electrochemical coupling of an oxidation reaction at a reactive metal electrode, which, during cell discharge, acts as an anode (releases electrons) together with oxygen reduction reaction (accepts electrons) at a porous air contacting electrode. The air contacting electrode may be a sheet-like member, having opposite surfaces respectively exposed to the atmosphere and to the aqueous electrolyte of the cell. During cell operation, oxygen is reduced within the cathode while the metal anode is oxidized, providing a usable electric current flow through external circuitry connected between the anode and cathode. In some embodiments of the present invention, the air cathode may be permeable to air but substantially impermeable to aqueous electrolyte, and may incorporate an electrically conductive element to which the external circuitry can be connected. In one embodiment, the air cathode comprises a conductive material (e.g., carbon), an added oxygen dissociation-promoting catalyst, a hydrophobic polymeric material (e.g., a finely divided polymeric material), and an optional electrically conductive element for collecting electrical current, i.e., a current collector.

In some embodiments, the current collector may comprise any type of conductive materials in any suitable shape or configurations including but not limited to: expanded metals, screens, cloths, foams, sheets, wires, shards, rods, wool, or any combinations thereof.

In other embodiments, the anode comprises a zinc material (e.g., elemental zinc, an oxide thereof, an alloy thereof, or any combination thereof).

In some embodiments, the air contacting electrode comprises a suitable amount of one or more oxygen reduction catalysts. Generated free electrons from the zinc anode (oxidation) may travel through an external load to the porous air contacting electrode where these electrons are accepted by the reduction reaction thus completing the electrical circuit.

However, a key drawback of these metal-air type batteries may be that they typically have not been electrically rechargeable for large number of discharge and charge cycles. A discharge-charge cycle is defined herein as one full electrical discharge followed by a full electrical charge. In some embodiments, a full electrical discharge can last about 6 hours while a follow-up full charge can also last about 6 hours. This 12 hour discharge and charge cycle (with the possibility of shorter duration charges and discharges to stabilize or regulate the electrical utility grid) could be characteristic and expected for a typical one full day of backup service on the electrical grid. Electrical rechargeability may be necessary or highly desirable for any battery that is to be considered for utility scale electrical grid applications. Traditional large scale metal-air batteries are either not at all electrically rechargeable or may only be cycled for less than a few hundred discharge charge cycles. Furthermore, traditional large metal-air battery systems are not readily available commercially. To be practical for utility applications, an electrically rechargeable battery should deliver at least 3500 to 10,000 high performance discharge and charge cycles with good overall charge/discharge efficiency. This corresponds to an approximate 10 to 30 year life.

Within a metal-air type battery, the electrically conducting electrolyte connecting the metal electrode and air contacting electrode is usually a liquid solution (in some embodiments water-based, aqueous) containing dissolved salts. Metal-air batteries may be thought of combining desirable properties of both fuel cells and batteries: the metal (e.g. zinc) is the fuel, reaction rates can be controlled by varying the air flow, and oxidized metal/electrolyte paste can be replaced with fresh metal or paste. A tremendous safety advantage of metal air cells is the fact that they are inherently short circuit proof. Since metal air cells are limited by the amount of oxygen they can continually withdraw and utilize from ambient air, they are ultimately limited by how much current they can produce. When a short circuit occurs inside a cell, unlike other battery chemistries, a metal air cell simply does not supply unlimited current—the current delivering capability has a maximum, an upper limit. This is an important safety consideration. Metal-air battery systems can include, but are not limited to, aluminum-air, magnesium-air, iron-air, lithium-air, sodium-air, titanium-air, beryllium-air, and zinc-air.

Zinc, in particular, has a number of advantages over other metals. It is important to point out that any of the embodiments discussed elsewhere herein may also be applied to any type of metal anode battery system which may or may not include zinc. Any reference to zinc as an anode can also be applied to any other suitable metal, and vice versa. Any reference to zinc-air or zinc anode batteries can be applied to any other metal-air battery, or metal anode system. In addition, reference to water or aqueous electrolyte, does not limit the discussion to only water or aqueous based systems. Any modifications discussed here could readily apply to any other suitable liquids and/or electrolytes.

Zinc may be an advantageous material for the battery anode because it is lightweight, nontoxic, inexpensive, readily available, and has rapid electrochemical reaction rates for plating during electrochemical charging. Because of this, zinc anode cells have been used as primary (throwaway) and rechargeable (reusable) cells. Zinc anode cells may be recharged either mechanically or electrically. In mechanically rechargeable (physically refuelable) cells, consumed zinc may be physically removed from a cell/battery and mechanically replaced with fresh zinc metal. Spent zinc may be processed separately at a different location back to metallic zinc. Such mechanically rechargeable batteries can be used for a grid storage application in some embodiments.

In preferable embodiments, electrically rechargeable cells or secondary cells may be used. In the more practical electrically rechargeable cells, electricity from an external source may be applied to the cell or battery and this electrical energy may be converted and stored as chemical potential energy within the cell or battery. In one type of rechargeable cell, such as a zinc air cell, when electricity from an external source is provided to the cell, water in the aqueous electrolyte undergoes an oxidation (loses electrons) to generate oxygen gas at the porous air contacting electrode, while zinc ions in solution may be electrochemically re-deposited (plated) back onto the metal electrode as zinc metal. During electrochemical charging, the electrochemical processes that occur during cell discharge are reversed and the original chemical species are regenerated and reconstituted. During cell charging, the zinc electrode, which during cell discharge had been the anode (had lost electrons), now becomes the cathode (or electrode that now gains electrode). The air contacting electrode, which during cell discharge had acted as the cathode (and gained electrons) now functions as an anode (where water loses electrons and becomes oxidized) to generate oxygen gas. Ordinarily, zinc anode systems typically use alkaline-based aqueous electrolytes. These electrolytes are based on highly caustic, high pH solutions, such as potassium hydroxide, KOH.

During normal cell operation during cell discharge, oxygen from surrounding air may be reduced (gains electrons)

while the reactive metal undergoes oxidation (loses electrons). In zinc air cells containing alkaline electrolyte, for example, the following simplified cell reactions may occur:

At the anode: $2Zn+4OH^- \rightarrow 2ZnO+2H_2O+4e^-$
$E_0=1.25V$

At the cathode: $O_2+2H_2O+4e^- \rightarrow 4OH^-$ $E_0=0.40V$

Overall reaction: $2Zn+O_2 \rightarrow 2ZnOE_{(OCV)}=1.65V$

In some instances, the actual anode reaction products are not simply $ZnO+H_2O$ but rather $Zn(OH)_4^{2-}$. The overall anode reaction could therefore be written as:

$2Zn+8OH^- \rightarrow 2Zn(OH)_4^{2-}+4e^-$

The generated zinc oxidation product, potassium zincate, can remain in solution.

Zinc-air rechargeable cells that use alkaline electrolytes may have a number of technical issues. The first issue is that as air enters the cell, $CO_2$, carbon dioxide (normally present in ambient air) may enter as well and slowly reacts with alkaline electrolyte to form insoluble carbonate species. These insoluble carbonates precipitate within pores of the porous air contacting electrodes and also in the alkaline electrolyte. This generated precipitate lowers electrical conductivity of the electrolyte, and, because air contacting electrode pores are being blocked by insoluble material, air contacting electrode performance is markedly reduced. Although carbon dioxide, $CO_2$, absorbing systems have been used to remove (scrub) $CO_2$ from incoming air, the added weight and complexity of such a scrubbing system detracts from advantages of metal anode systems that use alkaline electrolyte.

In addition, because commonly used alkaline electrolytes suffer from being deliquescent (absorbing water from the air) in humid environments, excess water may accumulate in these battery systems, causing the porous air contacting electrode to become flooded with water. Since air (oxygen) cannot readily diffuse through water, less oxygen can now enter and become reduced within the porous air cathode. This may cause alkaline based air cathodes to quickly lose their active properties.

Another issue with traditional alkaline-based zinc air cells is that although ionic conductivity and cell power performance improve with increasing $OH^-$ concentration, so does solubility of formed zinc species. This presents a cell design dilemma. On one hand, a higher pH (greater $[OH^-]$) is desirable for improved electrolyte electrical conductivity and good cell capacity. The tradeoff is that higher electrolyte pH (greater $[OH^-]$) can simultaneously lead to greater solubility of formed zinc discharge product. This may result in greater shape changes during cell charge—the plated zinc will not plate back in a desired morphology—thus leading to lower cycle life. In other words, in a typical cell design, one may select having either good cell capacity with poor cycle life or good cycle life with poor cell capacities. The desired combination of both good cycle life and good cell capacity is not currently available in electrochemically rechargeable metal anode cells.

Yet another issue with using zinc in typical alkaline electrolytes is that during electrical charging, plated zinc tends to migrate and redistribute over the zinc electrode. After only a few charging cycles, zinc can deposit in unwanted morphologies (e.g. as spongy, mossy, or filamentary, dendritic like deposits). Dendritic deposits may have long pointy growths protruding out of the normally smooth plated metal surface. Irregularly plated zinc particles are undesirable since they typically have higher electrical resistance and do not mechanically adhere well to each other. These zinc particles may easily flake off metal electrodes to form isolated zinc deposits. All of these factors contribute to reduced battery capacity and reduced power output for traditional zinc air batteries after continued discharge and charge cycles.

Another challenge facing zinc air cells that use alkaline electrolytes is that during cell discharge, zinc oxide tends to form on the zinc surface. This passivating layer results in an increase in internal resistance of the cell and that limits discharge rates and decrease cell performance.

II. Battery Electrolyte

In accordance with an aspect of the invention, a battery electrolyte may be selected that may improve the performance of a metal anode battery, such as a zinc-air battery. In some embodiments, the battery electrolyte may be an aqueous, chloride based electrolyte. In some embodiments, the electrolyte may have a pH of about 6. The electrolyte may have a pH of 10 or less, or any other pH value mentioned herein or less. In alternate embodiments, the electrolyte may have a pH falling between 3-10, 4-9, 5-7, 5.5-6.5, or 5.75-6.25. In some embodiments, an electrolyte may have a pH of about 3, 4, 5, 5.25, 5.5, 5.75, 5.8, 5.9, 5.95, 6, 6.1, 6.2, 6.3, 6.5, 6.75, 7, 8, 9, or 10. In some embodiments, the electrolyte may be alkali. The pH may be relatively pH neutral. In some embodiments, substantially no carbonates are formed as a result of $CO_2$ present in the air reacting with the alkaline electrolyte. This may be because the electrolyte in systems and methods described herein does not contain significant amounts of hydroxide ions. This electrolyte may allow zinc to be plated without significant dendrites formed during plating with little or no $CO_2$ absorption.

A battery provided in accordance with an embodiment of the invention may utilize an aqueous, chloride-based electrolyte. Because of lower electrolyte pH, no carbon dioxide (or an extremely low level of carbon dioxide) is absorbed from the air and thus no insoluble carbonates form in either the electrolyte or in the pores of the air contacting electrode. In addition, since chloride based aqueous electrolytes are commonly used in zinc plating industries to deposit smooth and well adherent zinc deposits, zinc plating efficiencies (during cell charging) should be markedly improved.

A preferable chloride-based electrolyte in a zinc air cell is in accordance with an embodiment of the invention. An electrolyte may comprise a mixture of one or more soluble chloride salts in aqueous solution. Soluble chloride salts may have a cation suitable for yielding a soluble chloride salt in an aqueous solution. Cations of suitable chloride salts may include zinc, ammonium, sodium, or any other large or complex cations such as ammonium, or alkyl ammonium that can yield soluble, stable chloride salts in aqueous solutions. A conductive electrolyte may be a mixture of soluble salts based on sulfates, nitrates, carbonates, hexafluorosilicates, tetrafluoroborates, methane sulfonates, permanganate, hexafluorophosphates, borates, or phosphates, either singly or mixed together in an aqueous solution. If a mixture of ammonium and zinc chloride electrolytes is used, for example, this new zinc-air cell may be described schematically as:

$Zn/ZnCl_2,NH_4Cl,H_2O/O_2(Carbon)$

Here, reading from left to right, zinc or a suitable zinc alloy may be the anode. The electrolyte may contain $ZnCl_2$ and $NH_4Cl$ and $H_2O$. The porous carbon based air contacting electrode is where $O_2$ is reduced during cell discharge and generated during cell charge.

In some embodiments, various amounts of KOH or other electrolytes may be added. Such a system may require or utilize addition of a $CO_2$ scrubber as a potassium hydroxide electrolyte absorbs $CO_2$. Any electrolyte known in the art may be used in conjunction with embodiments of the systems and methods described herein.

In some embodiments, oxygen evolution may be enhanced by charging a cell at low current densities. Such current densities may minimize or reduce $Cl_2$ evolution that may occur when using chloride based electrolytes. Examples of such current densities may include values from about 1 $mA/cm^2$ to about 100 $mA/cm^2$. Such current densities may be less than, greater than or between any of the following current densities: about 1 $mA/cm^2$, 5 $mA/cm^2$, 10 $mA/cm^2$, 20 $mA/cm^2$, 30 $mA/cm^2$, 40 $mA/cm^2$, 50 $mA/cm^2$, 60 $mA/cm^2$, 70 $mA/cm^2$, 80 $mA/cm^2$, 90 $mA/cm^2$, or 100 $mA/cm^2$. The oxygen evolution reaction may also be enhanced by regulating electrolyte pH. Furthermore, oxygen evolution may be enhanced by using an electrode or catalyst deliberately designed to have a low over-potential for oxygen evolution or a high over-potential for chlorine oxidation.

In some embodiments, the metal electrode may be formed of zinc, may be plated zinc, or may include zinc in any other form such as an alloy or plated over another metal. In accordance with one embodiment of this invention, the electrolyte may comprise a mixture of about 15% zinc chloride ($ZnCl_2$) and about 15% ammonium chloride ($NH_4Cl$) in water by % mass. Electrolyte may alternatively comprise a mixture of about 15% zinc chloride and about 20% ammonium chloride in water by % mass. In some embodiments, the aqueous electrolyte may contain varying amounts of zinc chloride and ammonium chloride and may also contain other suitable salts or chlorides such as LiCl. For example, an electrolyte may comprise about 10%, 12%, 13%, 14%, 14.5%, 15%, 15.5%, 16%, 17%, 18%, or 20% zinc chloride or ammonium chloride. In some embodiments, about the same amount or similar amounts of zinc chloride and ammonium chloride may be provided. Other materials may be added to buffer the electrolyte. These could include ammonium citrate or other compatible buffers such as ammonium acetate, or ammonium hydroxide in 1 to 2% by mass.

III. Porous Air Contacting Electrode

A porous, structurally sound, air contacting electrode (cathode) could be fabricated by using any suitable carbon based material. A suitable group could include carbon black, acetylene black, natural or artificial graphite, activated carbon, glassy carbon, carbon-based polymers, functionalized or non functionalized carbon nanoparticles (defined here as having dimensions of less than one micrometer), functionalized or non functionalized carbon nanotubes, carbon nanofibers, fullerenes, graphene sheets, or any other suitable combination of carbon-based matrix materials or modified carbon based materials. Functionalized carbon may indicate that the carbon has been modified to contain attached pendant groups of other species. The attached species may contain functional groups (e.g. nitrogen or fluorine containing functional groups) within a carbon structure that may be used to construct a functional porous electrode. As an example, a fluorinated carbon may have the general formula $CF_x$ where the subscript x is generally less than 1.0. The cathode may be made of composites or mixtures of any of these carbon types, with or without a suitable binder to hold these particles together. To this carbon based cathode a suitable oxygen reduction or water oxidation catalyst may be added.

A binder as described herein may include generally a polymeric material that helps maintain electrode integrity by introducing mechanical cohesion between electrode particles themselves and also provides adhesion between electrode particles and the current collector. Essentially, a binder holds electrode particles together. Binders are typically insoluble in materials present in a battery and are generally inert in the cell or battery range of operating voltages. The percentage of polymeric binder can vary from 0.1% to 25%, and preferably from 1% to 10%, of the entire electrode mass. In some instances, the percentage of binder may be greater than and/or less than one or more of the following values: 0.1%, 1%, 2%, 3%, 4%, 5%, 6%, 7%, 8%, 9%, 10%, 12%, 15%, 17%, 20%, 22%, and/or 25%. Excessive amount of binder may detract from the gravimetric density of the cell or battery (and generally lowers electrode conductivity) while too little binder in the electrode does not provide adequate mechanical cohesion.

It is possible that one or more of the above materials may itself serve a multifunctional role in a battery system. These materials may behave not only as a support material i.e. a high surface area, conductive, dispersed phase, but may also act to help catalyze either oxygen reduction or water oxidation reactions. It is also possible that some of the materials contained in the air contacting electrode actually participate in the cell reduction or oxidation reactions. By doing so, they can help increase cell ampere-hour capacity.

Examples of materials that may catalyze oxygen reduction reactions could include, but are not limited to, special carbon based materials or selected precious metals, noble metals such as Pt, Pd, Au, Ru, or Rh, or any other metals such as Mn, V, Ce, Bi, Ag, Cu, or Fe. Combinations of these metals may also be useful. Examples could include binary catalysts such as PdPt, or $Pt_xY_{1-x}$, wherein Y is selected from the group consisting of cobalt, nickel, vanadium, copper, iron, chromium, palladium, titanium, tungsten, aluminum, silver, copper, gold or combinations thereof, and x is between 0.1 and 0.9 (e.g., 0.1, 0.2, 0.3, 0.4, 0.5, 0.6, 0.7, 0.8, 0.9). Examples could also include ternary catalysts such as $Pt_xM_zY_{1-x-z}$ wherein M is selected from the group consisting of iridium, rhenium, cobalt, nickel or combinations thereof, Y is selected from the group consisting of cobalt, nickel, vanadium, copper, iron, chromium, palladium, titanium, tungsten, aluminum, silver, copper, gold or combinations thereof, and x+z is between 0.1 and 0.9.

Oxides of suitable precious or non precious metals (e.g. $RuO_2$, $IrO_2$, or $V_2O_5$) may also be used.

Other suitable catalysts may include combinations of various precious metals such as $Pt_{0.5}Au_{0.5}$(PtAu).

Other suitable catalysts may include transition metals such as Mn, Fe, or Co, or V based compounds, metal oxides, doped metal oxides, mixed metal oxides, metal based porphyrins, or any suitable combinations thereof. Suitable materials as cathode additives may also include various metal oxides, transition metal chalcogenides, and carbon nanotube supported metal particles.

The air contacting electrode matrix may also be fabricated with non carbon-based materials. Any material that provides electrical conductivity and is stable in the electrolyte solution may be used. Examples may include, but are not limited to, silicon or sulfur compounds (such as $SiO_2$, SnS), oxides, (such as aluminosilicate, ultra-marine, $Al_2O_3$), or titanium compounds (such as $Ti_4O_7$ or $Ti_5O_9$, or $TiB_2$). Non-carbon based, long chain polymers may also be used.

The air contacting electrode may be fabricated with various mixtures or combinations of carbon-based together with non carbon-based materials. The air contacting electrode may be fabricated with mixtures or combinations of carbon-based materials and other materials described herein.

The catalytic materials added to the air contacting electrode need not function solely or simply as oxygen reduction or water oxidation catalysts. These materials may actually take part and play a role (either partially or entirely) in the actual cell discharge or cell charge reaction. By itself taking part in either a reduction or oxidation reaction, these materials may effectively provide either higher operating cell load voltages or extended ampere-hour capacities than would otherwise be observed in these cells. These materials may also play a role in lowering required charging potentials. This raising of cell operating voltage, increasing cell capacities, or lowering required cell charging voltages may lead to greater cell capacities, better cell cycling efficiencies, higher power capabilities, and improved cycle life.

As an example, $MnO_2$ as an additive to the air contacting electrode may actually participate in the cell discharge reaction via a so-called double-injection process. This involves the insertion or intercalation of protons from the aqueous electrolyte solution and reduction of Mn oxide by electrons from the external circuit. This double-injection process could be expressed as:

$$MnO_2 + H^+ + e^- \rightarrow MnOOH$$

If the air contacting electrode continues to discharge, formed MnOOH may be further reduced at the second step:

$$MnOOH + 3H^+ + e^- \rightarrow Mn^{2+} + 2H_2O$$

By taking part in the actual reaction, cell ampere-hour capacity may be increased. An advantageous feature of Mn oxides is that they may undergo both oxidation and reduction. By oxidizing an already reduced manganese oxide, the reduced manganese oxide may become regenerated and restored to its former oxidation state and be able to undergo further reduction reactions. Oxygen from either the outside air or oxygen that is dissolved in the electrolyte (or present in the cell) may help partially reoxidize these materials during periods of lower rate discharge or during periods of no discharge. By becoming reoxidized, these manganese oxides may be further available to continue being reduced thus providing additional ampere-hour cell capacity. In a sense, this may allow oxygen to augment a substantial portion of the total cell discharge capacity.

Possible examples of such air contacting electrode additives that could take part in the actual reduction/oxidation reactions may include, but are not limited to, transition metal oxides such as $Fe_2O_3$, $CoO_2$, $Co_3O_4$, $MnO_2$, MnOOH, $Mn_5O_8$, or $CeFe_2O_4$. Transition metal based oxides may also provide beneficial effects either by catalyzing the cell charge or cell discharge reaction or in actually changing the cell charge/discharge reactions through a new oxidation/reduction couple or electrochemical reaction shuttle that results in higher operational cell voltages. Examples of other suitable oxides may include the general class of Mn oxides, described by the general formula $MnO_{xy}$ (e.g. $Mn_2O_3$, $Mn_3O_4$, or $Mn_5O_8$, and higher oxides) where subscripts x, y, z and w are any suitable set of numbers, such as $(1-z/2) \leq y/x \leq (2-z/2)$ and $w<2$. Further examples of other suitable oxy-hydroxides may include the general class of Mn oxides, described by the general formula $Mn_xO_y(OH)_z(H_2O)_w$ (e.g. $Mn_2O_3$, $Mn_3O_4$, or $Mn_5O_8$, and higher oxides) where subscripts x and y are any suitable set of numbers, such as $1 \leq y/x \leq (2-z)$. Manganese can exhibit a number of different oxidation states. Due to the stability of these oxidation states, such as 2+, 3+, and/or 4+, any single manganese oxide composition may actually contain a stable mixture of a variety of different oxides such as, e.g., $MnO_2$, $Mn_2O_3$, $Mn_3O_4$, and MnO.

It is well known that manganese oxide particles may be fabricated in various crystal structures. The particular crystal structure of a manganese oxide is expected to affect catalytic and electrochemical properties and cell performance. When manganese oxides used either alone or in combination with physical mixtures of other suitable additives (e.g. carbon, inclusion of other metals such as W or Mo, or by addition of selected oxides, sulfides, or borides such as $PtO_2$, $NiO_2$, $V_2O_3$, $V_2O_5$, $Nb_2O_5$, $MoO_3$, $ZnO_2$, $SnO_2$, $Fe_2O_3$, $W_2O_3$, $CO_3O_4$, CoO, $Al_2O_3$, $Bi_2O_3$, $Yb_2O_3$, $Ge_2O_3$, $CeO_2$, $B_2O_3$, ZnO, $TiO_2$, $ZrO_2$, $TiS_2$, or $TiB_2$) the combination may show cell performance improvements and added stability especially in a chloride-based electrolyte. Other suitable species that may be either used alone or added to manganese oxides may include transition metal oxides that also contain a metal. Examples could include substances such as $Mn_{1.5}Ni_{0.5}O_4$, or $PbMnO_x$, where subscript x could be any suitable number, such as $2 \leq x \leq 8$ (e.g., 2, 3, 4, 5, 6, 7, or 8). Other examples of possible stand alone material for the air contacting electrodes or as additives to the air contacting electrode may include transition metal oxides that also contain lanthanide group atoms either alone or in combination with other materials (e.g. $LaMnO_3$ or $LaMnO_3+a$), where subscript a may have suitable values, such as a=1 or $0 < a \leq 1$ (e.g., 0.1, 0.2, 0.3, 0.4, 0.5, 0.6, 0.7, 0.8, 0.9, 1.0).

Another group of materials may include compounds containing a lanthanide group atom, a metal, and a transition metal oxide. These compounds may have the general formula $LaM_xMn_yO_z$, where La represents a suitable lanthanide element, M represents a suitable metal, and Mn represents manganese. Subscripts x, y, and z may be suitable numbers chosen so that the compound is electrically stable, such as $0 \leq x \leq 1$, x+y=1, $3 \leq z \leq 4$. Examples of this class of compounds could include, but is not limited to compounds such as $LaNi_{0.5}Mn_{0.5}O_3$, $LaCu_{0.5}Mn_{0.5}O_3$, or $La_{0.8}Sr_{0.2}MnO_3$, or $La_{2/3}Ca_{1/3}MnO_3$, $La_{1/2}Sr_{1/2}MnO_3$.

Other examples of suitable additives to the oxygen electrode include compounds having the general formula $Mn_xM_yO_z$, where Mn represents manganese, M is a suitable metal (e.g., selected from the group bismuth, indium, yttrium, ytterbium, or niobium), O represents oxygen, and subscripts x, y, and z are suitable numbers, such as $0 < x \leq 1$, x+y=1, $1 \leq z \leq 4$.

Another example of suitable additives to the oxygen electrode include compounds having the general formula $Mn_xM_yA_zO_aH_b$ where Mn represents manganese in its +4, +3 or +2 or in a fractional oxidation state between +4 and +2, M is a suitable metal or transition metal that may be in a 4+, 3+, 2+ oxidation state, such as, lead, tin, germanium, titanium, zirconium, boron, aluminum, indium, bismuth, copper, zinc, nickel, cobalt, iron, molybdenum, yttrium, scandium, niobium, ytterbium, A is a suitable alkali or alkaline earth metal, and H is a suitable halogen. Subscripts x, y, z, a, and b are such that the compound is electrically neutral, such as for the metal M in a 4+ oxidation state and Mn in a 4+ oxidation state 4x+4y+z+b=2a, such as for the metal M in a 3+ oxidation state and Mn in a 4+ oxidation state 4x+3y+z+b=2a, such as for the metal M in a 2+ oxidation state and Mn in a 4+ oxidation state 4x+2y+z+b=2a, such as for the metal M in a 3+ oxidation state and Mn in a 3.5+ oxidation state 3.5x+3y+z+b=2a, as for the metal M in a 4+ oxidation state and Mn in a 3+ oxidation state 3x+4y+z+b=2a, such as for the metal M in a 3+ oxidation state and Mn in a 3+ oxidation state 3x+3y+z+b=2a, such as for the metal M in a 2+ oxidation state and Mn in a 3+ oxidation state $3x+2y+z+b=2a$, as for the metal M in a 4+ oxidation state and Mn in a 2+ oxidation state $2x+4y+z+b=2a$, such as for the metal M in a 3+ oxidation state and Mn in a 2+ oxidation state $2x+3y+z+b=2a$, such as for the metal M in a 2+ oxidation state and Mn in a 2+ oxidation state $2x+2y+z+b=2a$, for example such compounds may be $Mn_{0.97}Bi_{0.03}O_2H$, $Mn_{0.97}Bi_{0.03}Na_{0.03}O_2H_{0.97}$.

Another possible type could include a suitable transition metal, a suitable alkali or alkaline earth metal, and including a phosphate group. This general class of compounds may have the general formula $A_xM_yPO_4$ where A is an alkali or alkaline earth metal, and M is a suitable transition metal. Subscripts x and y are such that the compound is electrically stable, such as $x+2y=3$. Examples of this class of compounds could include $LiMnPO_4$, $LiCoPO_4$, and $LiFePO_4$.

Any of the additives or catalysts described or listed above (either alone, in combination, or together with other suitable materials listed above) may function to either catalyze oxygen reduction or water oxidation reactions to generate oxygen. In addition, all the possible cathode additives listed above may also act to provide a new discharge or charge reaction mechanism or pathway where these materials themselves are undergoing a reduction or oxidation reaction thus directly contributing to the number of coulombs transferred during the cell reaction. These materials may also function as an electrochemical shuttle. For example, a material may itself undergo reduction during cell discharge and then become reoxidized (and available for further reduction reactions) via side reactions with oxygen or any other suitable oxidizing agent present in the cell. Oxygen or other oxidizing agent could either be available from the outside air or present in a dissolved form (such as dissolved oxygen) within the liquid electrolyte. This oxygen assisted "recharge" reaction could help elevate cell load voltages, increase cell capacities, or decrease cell charge voltages.

By undergoing valence changes during cell oxidation/reduction, these additives/catalysts may undergo reduction or oxidation. This reduction and oxidation reaction may lead to cells having two voltage plateaus upon cell charge/discharge. One voltage plateau would be due to the ordinary zinc air cell reactions taking place during charge/discharge. The other voltage plateau could be due to oxidation/reduction of either the additive itself or of a coupled reaction shuttle in which the additive, or portions of the additive, takes part.

Any of the above listed additives or catalysts may be involved in more than just one of the above reaction mechanisms. A given catalyst may act as both a direct catalyst for water oxidation or oxygen reduction, while simultaneously, or at a later time, act as an electrochemical reduction and oxidation shuttle to effectively raise the under-load cell potential, increase the cell ampere hour capacity, and/or lower cell charging potentials. The particular reduction and oxidation couple need not involve solely the selected material and oxygen. Other reducing agents (either present in the cell itself, or introduced from the outside) may effectively be used.

Any of these various catalysts or additives described above (for example a manganese oxide) could themselves possibly undergo oxidation/reduction reactions by forming a reaction intermediate with any suitable cell component either normally present in the cell or electrolyte, or formed in the cell or electrolyte either during charge or discharge. The additive may also possibly undergo oxidation and/or reduction reactions by forming a reaction intermediate with any product formed in the cell either during cell charge or during cell discharge.

As an example, oxygen gas present in the cell may reoxidize the reduced compound. This newly oxidized species may then be readily available to further undergo subsequent reduction reactions in the cell. This may have the effect of extending the cell's ampere-hour capacity. This reoxidation of one of the reduced cell components by oxygen may occur either while the cell is at rest, i.e. not being discharged, or it may occur even during low rate discharge where oxygen reoxidation is able to compete with cell discharge rates and reoxidize the material after it becomes reduced in the cell reaction.

The oxidizing agent that helps regenerate the cathode material need not be oxygen. It could be any suitable oxidizing agent that is present in the cell, electrolyte, or introduced from outside the cell.

Examples of oxidizing agents could include $KMnO_4$, $N_2O$, other suitable manganese compounds, or any other suitable compounds that are known to undergo oxidation number changes in solution. In particular, vanadium and iron compounds are known to exist in various oxidation states and their well known reduction and oxidation couples may behave as a reduction and oxidation shuttle in this system to help reoxidize selected air contacting electrode additives.

During cell discharge under constant current, two discharge voltage regimes may appear. One lower, voltage level could be due to the ordinary discharge reactions (for example oxygen reduction) normally occurring in a zinc-air cell. The other, higher voltage level during cell discharge could be due to the catalyst and/or additive undergoing a separate oxidation/reduction couple. This may have the effect of prolonging the cell discharge reaction thus increasing cell ampere-hour capacity. In some instances, any number of multiple discharge voltage regimes may appear.

It is also possible to have a scenario where higher level voltage plateaus during cell discharge could be due to the normal combination of two half cell reactions: a metal oxidation and oxygen reduction while the second, lower voltage plateau could be due to metal oxidation and a reduction reaction of the additive itself. This could also have the overall effect of prolonging the cell discharge reaction thus increasing the cell ampere-hour capacity.

Similarly, during cell charge under constant current, two charging voltage regimes may appear. One higher potential level during electrical charging in a zinc cell could be due to ordinary reactions occurring in the air contacting electrode during zinc air cell charging (i.e. water being oxidized to form oxygen gas). The other, lower charging voltage level charge could be due to the catalyst or additive undergoing a separate oxidation reaction. In some instances, any number of multiple charge voltage regimes may appear.

It is also possible to have a scenario where a lower charging voltage plateau is due to the normal zinc and air reduction and oxidation couple while the higher voltage plateau being due to the oxidation of the specific air contacting electrode additive.

The extent and cell ampere hour capacity due to these new higher discharge voltage plateaus or lowered ampere hour charging required could depend on the amount of additive present. Since the additive may take part in the discharge and/or charge reaction itself, the duration of this additional voltage plateau would therefore depend on the amount of additive present.

The extent and cell ampere hour capacity improvements may also be mostly independent of amount of additive and rely to a large extent on one or more shuttle reactions where the species of interest that is being oxidized or reduced is continually regenerated in the cell.

During cell discharge, oxygen from ambient air may enter the cell through a porous air contacting electrode and may undergo oxygen reduction at specifically designed catalyst sites in or on the air contacting electrode. The air contacting electrode may be either a carbon-based electrode or may be based on other suitable materials. Meanwhile, at the metal electrode (which may be zinc), zinc goes into solution as soluble zinc ions. In the presence of a chloride-based electrolyte, zinc chloride may be somewhat soluble in the aqueous electrolyte. As cell discharge continues and more zinc ions are created in solution, the solubility limit of zinc chloride may be exceeded. This may cause some zinc chloride to be precipitated. Methods for dealing with the precipitation in accordance with an embodiment of the invention will be described in greater detail below. During cell charge, a reverse electrochemical reaction occurs. Oxygen gas is generated from oxidation of the liquid electrolyte at the air contacting electrode while zinc metal may be regenerated (plated) back on to the zinc electrode.

A simplified discharge/charge processes in chloride electrolyte, which may have a pH of about 6, may be described by the following reactions:

During Cell Discharge

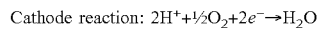
Cathode reaction: $2H^+ + \frac{1}{2}O_2 + 2e^- \rightarrow H_2O$

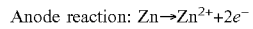
Anode reaction: $Zn \rightarrow Zn^{2+} + 2e^-$

During Cell Charge

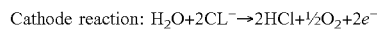
Cathode reaction: $H_2O + 2CL^- \rightarrow 2HCl + \frac{1}{2}O_2 + 2e^-$

Anode reaction: $ZnCl_2 + 2H^+ + 2e \rightleftarrows Zn + 2HCl$

Zinc species formed during cell discharge in an ammonium chloride electrolyte could be more precisely described as $Zn(NH_3)_2Cl_2$.

At the air contacting electrode, oxygen gas obtained from ambient air may enter the cell through an air permeable, hydrophobic membrane. During cell charging, oxygen gas may be produced via water electrolysis (oxidation) at the porous air contacting electrode.

One side effect of using chloride based aqueous electrolytes in rechargeable zinc air battery technologies is that during cell charging (under anodic potentials), an unwanted parasitic reaction involving chlorine evolution may possibly occur:

$2Cl^- \rightarrow Cl_2(g) + 2e^- \quad E_0 = 1.36\ V$ \quad (1)

Generating chlorine may be an undesirable reaction in this electrolyte system since it can lower overall cell charging efficiencies. This is because electrical energy may go into generating chlorine (unwanted reaction) rather than into evolving oxygen (desired reaction). Therefore, it may be desirable for the battery system to be designed so that during cell charging, anodic potentials favor oxygen evolution and minimize chlorine evolution.

$2H_2O \rightarrow 4H^+ + O_2(g) + 4e^- \quad E0 = 1.23\ V$ \quad (2)

Oxygen evolution (reaction 2) with its lower oxidation potential (1.23 volts) would be expected to predominantly occur because it is thermodynamically favored over chlorine evolution (reaction 1) with a higher oxidation potential of 1.36 Volts. However, every reaction has an over-potential. The term over-potential refers to the amount of voltage (above the theoretical potential) necessary to cause a particular reaction to actually occur. It turns out that chlorine evolution is a much simpler chemical reaction and has a lower over-potential than does the oxidation of water to $O_2(g)$. This means that in aqueous chloride environments, undesirable chlorine evolution may actually become more likely to occur than oxygen evolution.

Chlorine generated during cell charging may dissolve in water to form hypochlorous acid, HClO. Hypochlorite ions could then decompose into chloride, several known oxidized chlorine species, or even free dissolved chlorine gas depending on the conditions. Even though chlorine gas per-se does not remain intact, this reaction may still be undesirable in the cell since it lowers overall charging efficiencies.

There are a number of practical ways to minimize or reduce undesirable chlorine (or hypochlorite) evolution (or improve oxygen generation efficiencies). Since oxygen evolution is favored under low current density conditions, one possibility may be to lower charging current densities so as to favor oxygen (instead of chlorine) evolution. In some embodiments, desirable charging current densities may be from about 10 mA/cm$^2$ to about 200 mA/cm$^2$ and can be varied depending on the application up to the maximum charging or discharging current that the battery will tolerate.

Another approach may be to regulate electrolyte pH. At certain pH values, oxygen generation may be more favored than chlorine evolution. Higher pH favors $O_2$ evolution over $Cl_2$ evolution. The electrolyte may be slightly raised and buffered by addition of ammonium hydroxide or ammonium citrate. Chlorine evolution is favored below pH 2. While ammonium chloride acts as a pH buffer in this system, addition of aqueous ammonium hydroxide would raise the electrolyte pH without adversely affecting the electrolyte conductivity or other performance properties.

Another approach may be to use air contacting electrodes or selected catalysts in the air contacting electrode that have high over-potentials for chlorine evolution and/or very low over-potentials for oxygen evolution. This way, during cell charging, oxygen evolution is favored. This can be achieved either by modifying electrode surfaces (as will be discussed in greater detail further below), or by adding materials like $MnO_2$, which are well known to have low over-potentials for oxygen evolution. Similarly, addition of various electrolyte salts has been shown to minimize chlorine evolution. Examples of such salts or chemicals may include cobalt chloride, iridium oxide ($IrO_2$) or soluble manganese salts. Additionally, there are water-soluble additives such as urea which are known to react with chlorine, if it is formed, to produce non-toxic, easily vented gases.

It should be understood, however, that alkali electrolyte can be used as part of the disclosed system herein if carbon dioxide is first removed from the incoming air. If this occurs, all the benefits of a cell as described herein could still be realized.

IV. Zinc Air Cell with Third Electrode

An aspect of the invention relates to a reversible or rechargeable battery, such as a zinc-air cell, having a zinc electrode and a carbon-based cathode for electrochemical reduction of oxygen gas. This type of cathode may also be known as an air cathode since the oxygen that is chemically reduced is typically obtained from ambient air.

In traditional limited electrically rechargeable metal air cells, air contacting electrodes are expected to perform two distinct yet opposite functions (hence the occasional name bi-functional air contacting electrode). A first function of the bifunctional electrode is to allow oxygen reduction to occur during cell discharge. A second function of the bifunctional electrode is to allow oxygen gas evolution during cell charge.

Since a bi-functional air contacting electrode serves multiple diverse purposes (e.g., a reduction and oxidation), there are several challenges for these air contacting electrodes. Firstly, there are only a handful of conductive materials that will not readily corrode in aqueous electrolytes under these wide shifts in applied electrical potential. This corrosion is especially prevalent when dealing with aqueous chloride electrolytes. This makes selecting an air contacting electrode current collector considerably more challenging. Secondly, generating oxygen gas bubbles during cell charging may introduce pressure and mechanical stresses in the porous carbon structure, which tend to weaken this porous air contacting electrode.

One possible approach is to not require that the same porous air contacting electrode perform both oxygen reduction and oxygen generation reactions. Instead, in some embodiments, a third or auxiliary electrode may be provided in a cell, in lieu of the standard air contacting electrode. This auxiliary electrode may exclusively perform only one function: for example only cell charging and associated oxygen generation or only cell discharge and oxygen reduction. Thus, one air contacting electrode may be provided exclusively for oxygen reduction during cell discharge while a second, auxiliary, air contacting electrode may be designed and used exclusively for water oxidation and oxygen generation during cell charge. The auxiliary electrode designed for oxygen generation may be situated either between the normally used air contacting electrode and metal electrode, or situated on both sides of the metal electrode. Since an auxiliary electrode would usually only be used during cell recharging and generating oxygen, it could then be optimized for recharge (oxygen production) by means of optimized catalysts for oxygen production while the traditional air contacting electrode would be optimized for discharge (oxygen reduction).

Figure 12:
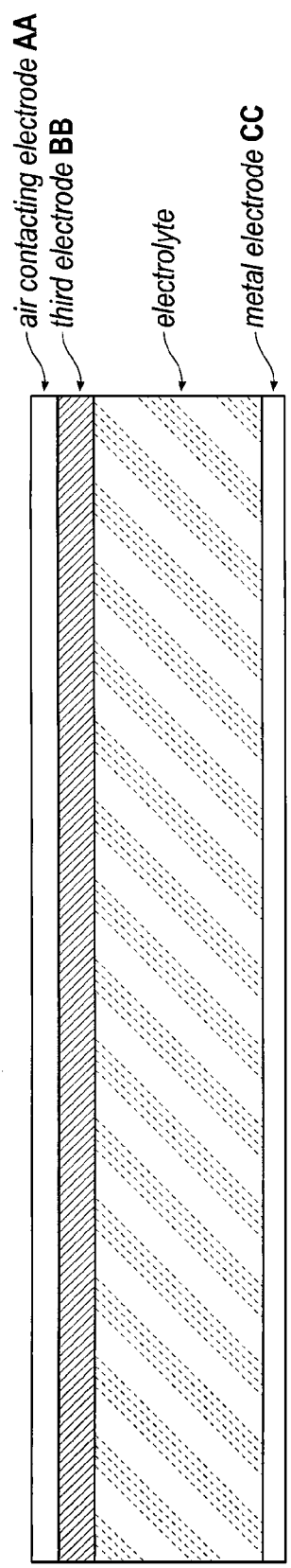
FIG. 12 provides a schematic of a three electrode design for an electrically rechargeable metal anode cell.

FIG. 12 shows an example of this new electrode configuration. FIG. 12 provides a schematic of a three electrode design in an electrically rechargeable zinc-air cell. Here, a traditional porous air contacting electrode (AA) and a solid zinc electrode (CC) are separated by liquid electrolyte. A third, auxiliary electrode (BB), which is only used during cell charge, and electrically isolated from electrode AA, may be situated between electrode CC and electrode AA. In some embodiments, the auxiliary electrode BB may be electrically isolated from electrode AA either by an insulator or by a gap.

Electrode AA may be a standard porous carbon air contacting electrode, or any other type of air contacting electrode that is designed and optimized for oxygen reduction. Electrode CC may be a zinc metal electrode, or any other metal electrode or anode as described elsewhere herein. In some instances, the third electrode, the auxiliary electrode (BB), would only be used during cell charging. Suitable materials used to fabricate this auxiliary electrode could include but are not limited to a metal, metal oxide, or carbon fabricated into a screen, foil, mesh, or foam, wire, expanded metal, or it could be pressed or sintered metal, carbon, or suitable metal oxide.

During cell discharge, electrodes AA and CC are connected and electric currents are produced.

During cell charging, electrodes BB and CC may be automatically connected to the circuit via an electrical switch. Electric currents from an external circuit may be applied across these electrodes to generate oxygen gas from the water solution.

By using an auxiliary electrode arrangement, a different (possibly cheaper and more efficient) electrode dedicated to the charging portion of the cell operation may be obtained.

During cell discharge, electrodes CC and AA, connected through an external circuit, may provide electrical power. Current flow may be in the same direction as in traditional cells. Oxygen from ambient air may be electrochemically reduced by electrons generated at the zinc electrode.

Prior to cell charging, electrode AA may be disconnected from the circuit connecting it to metal electrode CC (e.g. the zinc electrode) and the auxiliary, third electrode (BB) may be automatically electrically switched into the cell circuitry and connected to metal electrode CC. Now, during charge, electrodes BB and AA are electrically connected and utilized. Auxiliary electrode BB may be especially configured in a format having increased surface areas. These current collectors could be in the form of a mesh, porous plates, wires, screens, foam, pressed or sintered powder, nanoparticles, strips, or other suitable open and or high surface area structures. Here, the surface area may be considerably greater than that of its geometric footprint. This could allow better contact with electrolyte so that oxygen generation can more readily occur. The porous nature of this electrode is designed to allow electrolyte to flow through and could also allow generated oxygen gas to easily escape. Since $O_2$ gas is generated only at this porous auxiliary electrode, the oxygen reduction electrode AA will not become damaged.

This auxiliary, third electrode may also be designed to contain specific catalysts to enhance $O_2$ evolution (catalysts having low over-potentials for oxygen generation). In addition, this third electrode may then be protected from reverse currents during cell discharge by using switching diodes that only allow this electrode to be utilized during cell charge.

After the cell has been fully charged, the third (charging) electrode BB may be electrically disconnected from the cell circuitry and the standard metal electrode CC and traditional air contacting electrode AA may be reconnected.

During cell discharge, air contacting electrode AA and metal electrode CC may be electrically connected.

During cell charge, air contacting electrode BB and metal electrode CC may be electrically connected.

Any electrical switching or connection/disconnection mechanism known in the art may be used to provide the desired connections during charging and discharging. Such connections may be made in response to instructions provided by a controller.

The recharging air contacting electrode may be made:
1. Larger than the discharge air contacting electrode to allow rapid recharging at lower current densities.
2. Smaller than the discharge air contacting electrode to occupy less volume and not block the air contacting electrode.

V. Metal Hydrides as a Battery Anode

In some embodiments of the invention, titanium hydride, $TiH_2$, may be a suitable metal electrode/anode material in the presently described horizontally configured battery.

Unlike other $AB_5$-type metal hydrogen storage alloys such as $LaNi_5$, Ti powder and its hydride could be cheaper and have higher energy densities. Also, unlike other metal electrodes that dissolve when undergoing oxidation, $TiH_2$ does not dissolve following its oxidation. $TiH_2$ simply becomes solid, metallic Ti.

As an anode, during the cell discharge cycle, $TiH_2$ may release two protons and two electrons to form Ti metal. During charge, two protons and two electrons may be returned to Ti metal and $TiH_2$ may be formed again. The discharge/charge reactions could be:

Discharge: $TiH_2 \rightarrow Ti + 2H^+ + 2e^-$

Charge: $Ti + 2H^+ + 2e^- \rightarrow TiH_2$

Typical metal hydrides deteriorate following numerous discharge/charge cycling due to induced mechanical stresses. This may cause decrepitation and smaller sized metal and metal hydride powders to form. These smaller sized powders do not adhere together well, resulting in lowered electrical conductivity and poor cell performance. However, in conjunction with the present proposed horizontal configured cell design as provided further herein, where metal electrodes are horizontally positioned, the action of gravity may help even finely divided Ti and TiH$_2$ powder settle back towards the current collector below. Even if the metal electrodes are slightly tilted, gravity should nevertheless allow Ti and TiH$_2$ powders to settle back on the current collector in a relatively even or uniform fashion. Since TiH$_2$ and Ti powders will remain in intimate contact both with themselves and with the current collector, this metal electrode can continue to undergo oxidation and reduction with good efficiency.

Ti powder may also be modified by treatment via any one of the various treatment processes proposed herein to make Ti more electrically conductive.

Titanium hydride can work as a standard battery or as a titanium-hydride-air battery. Features or portions of the discussion relating to titanium hydride electrodes may also apply to zinc-air batteries or other metal anode batteries and vice versa.

VI. Horizontal Cell Configuration/Orientation

In accordance with another aspect of the invention, a metal anode battery system, such as a zinc-air battery system, may have a horizontal cell configuration. FIG. 1 shows rechargeable zinc-air cells arranged in a horizontal orientation in accordance with an embodiment of the invention. The battery system may include plastic frames 100a, 100b, an air contacting electrode 102a, 102b, a metal electrode 104a, an electrolyte 106a, 106b, and an airflow tunnel 108a, 108b. In some embodiments, an air contacting electrode 102a, 102b may include a hydrophobic membrane 110, carbon and catalyst 112, expanded titanium 114, and conductive carbon 116. The air contacting electrode may function as a cathode during cell discharge. The metal electrode functions as an anode during cell discharge. In other words, during cell discharge the air contacting electrode functions as a cathode while the metal electrode functions as an anode. During cell charging, the roles are reversed. The porous carbon air contacting electrode now functions as an anode (loses electrons) while the metal electrode now functions as a cathode (gains or accepts electrons). In some embodiments, a metal anode battery cell system may comprise a metal electrode, an air contacting electrode, and an aqueous electrolyte solution. In some embodiments, the electrolyte may have a pH within the range of about 3 to 10.

In some examples, an insulating plastic frame may be formed of various plastics including but not limited to Noryl, polypropylene (PP), polyphenylene oxide (PPO), polystyrene (PS), high impact polystyrene (HIPS), acrylonitrile butadiene styrene (ABS), polyethylene terephthalate (PET), polyester (PES), polyamides (PA), polyvinyl chloride (PVC), polyurethanes (PU), polycarbonate (PC), polyvinylidene chloride (PVDC), polyethylene (PE), polycarbonate/Acrylonitrile Butadiene Styrene (PC/ABS), or any other polymer or combination thereof. In some embodiments, the plastic used to form a frame may be chosen for its ability to tolerate high temperature, i.e., as high as the boiling point of the electrolyte. In some embodiments, the plastic used to form a frame may be injection moldable. A plastic frame made from injection molded plastic such as, but not limited to, Noryl may be designed to hold both a solid zinc electrode (shown on the bottom of the cell) and an air contacting electrode. The zinc electrode on the bottom of the cell may be separated from an expanded metal titanium current collector screen (embedded within the underside of the porous carbon air contacting electrode by a fixed distance. This separation space between the zinc electrode (metal electrode/anode) and titanium screen current collector for the air contacting electrode/cathode is filled with the electrically conductive, aqueous chloride electrolyte solution.

Frame 100a may surround a cell. An air contacting electrode 102a may be provided as a top layer of a cell. A metal electrode 104a may be provided as an intermediate portion of a cell. An airflow tunnel 108b may be provided between the metal electrode 104a of a first cell and an air contacting electrode 102b of a second cell. An electrolyte 106a may be provided within the cell. Electrolyte 106a may be contained by the frame 100a and also by the metal electrode layer 104a. In alternate embodiments, the positions of the air contacting electrode and metal electrode may be switched so that a metal electrode may be provided as a top layer, and an air contacting electrode may be provided as an intermediate portion.

In some embodiments, the porous air contacting electrode may be a carbon-based oxygen cathode electrode or a polymer based oxygen electrode having an air permeable hydrophobic catalytic membrane, and/or a corrosion resistant current collector, wherein during electrical charging under anodic potentials, oxygen evolution may be favored. Air contacting electrodes may also include any materials known in the art.

In some embodiments, low temperature gas plasma treatment may be used to markedly enhance adhesion of metals to various plastics. Gas plasma has been shown to improve adhesion of vapor deposited metals to various polymer surfaces. By treating polymer surfaces with various gas plasmas prior to applying structural adhesives, a stronger, more durable bond, may be formed. Examples of desirable gas plasmas may include $O_2$, mixtures of $CF_4/O_2$, or $N_2$. Such treatment is expected to enhance adhesion of a plastic frame to a metal electrode. In either single cell or multi-cell designs, there may be a number of locations within cell stacks where a plastic surface is adhesively bonded to a metal surface with structural adhesives. This longer lasting seal could translate in a longer lived cell.

There are a number of distinct advantages to having a horizontal electrode orientation. Firstly, a horizontal configuration may allow cells to be rapidly and inexpensively assembled from injection molded plastic containers or frames. Another advantage is that no porous battery separator is needed. In most batteries separating membranes are often expensive and puncturing this membrane is also the key failure mode of these batteries as well. By eliminating a need for a porous battery separator, horizontally oriented cells may be more inexpensively and reliably manufactured and used. In some embodiments, a liquid electrolyte within a particular cell may directly contact a metal electrode of that same cell. In some embodiments, the liquid electrolyte may or may not directly contact the porous air contacting electrode of the cell. No separating layer need be provided between the liquid electrolyte and the metal electrode. In some embodiments, no separation or separating layer may be provided between the liquid electrolyte and the metal electrode and/or air contacting electrode. For example, a rechargeable metal anode battery cell may be provided, that has a metal electrode, an air contacting electrode, and an aqueous electrolyte between the metal electrode and air contacting electrode, wherein the air contacting electrode may directly contact the electrolyte and no separator is provided between the air contacting electrode and the electrolyte.

Eliminating a separating membrane between the metal and the air contacting electrode is a key to lowering battery costs to affordable levels and helping extend battery cycle life so that it becomes suitable for utility use. By orienting cells so that a metal electrode is on the lower portion, gravity helps keep the plated metals from contacting (and shorting) the air contacting electrode above. In some embodiments, the metal electrode may be a zinc metal anode, and gravity may keep plated zinc from contacting the air contacting electrode above. This creates an extremely reliable battery since there is no membrane to fail and the cell relies on gravity to ensure proper operation. A rechargeable metal anode battery system may be capable of a large number of discharge/recharge cycles without physical degradation of materials or substantial degradation of the battery cell system's performance. In some embodiments, the system may be capable of about 100 or more, 200 or more, 300 or more, 350 or more, 400 or more, 450 or more, 500 or more, 700 or more, 1,000 or more, 1,500 or more, 2,000 or more, 3,000 or more, 5,000 or more, 10,000 or more, or 20,000 or more discharge/recharge cycles without substantial degradation.

During cell operation, reaction discharge products may primarily be zinc chloride. When the solubility of zinc chloride exceeds its solubility limits (and since it is formed in chloride-based electrolytes the presence of chloride ions will, via the common ion effect, cause zinc chloride solubility limits to be quickly exceeded) it precipitates. Here, the horizontal cell configuration together with assistance of gravity, should help precipitating zinc chloride particles settle back onto the horizontally positioned zinc metal electrode below. Since zinc chloride particles deposit on/near the zinc electrode, zinc ions will undergo considerably less migration. This means that during cell charge, when zinc is deposited back on the metal electrode, there may be less zinc lost to other locations in the cell. This leads to considerably improved zinc cycling efficiencies and improved cell capacity. Elimination of membrane separators in rechargeable cells also means that internal resistance losses within cells may be minimized or reduced. This leads to higher operating potentials and less waste heat generated.

A horizontal cell geometry may also allow for establishing a reproducible fixed distance between the metal (zinc) electrode (anode) and current collector of the air contacting electrode. This helps control electrolyte resistance more reproducibly. In some embodiments, a battery cell may have a frame that supports the metal electrode and air contacting electrode at a fixed distance from one another. A fixed distance may define a space in which a liquid electrolyte may be contained. Secondly, in horizontal geometries, where each individual air-breathing electrode is on top of the cell assembly i.e. the air contacting electrode is facing upwards, numerous zinc air cell assemblies may be stacked on top of each other. This not only increases energy densities (since cells may now be closely packed together) but also allows for designing a battery system with open air spaces between individual cells. This open space may act as a horizontal gas flow manifold where air may be pumped through battery casings between individual cells to circulate air/oxygen on top of each individual air contacting electrode.

Figure 2:
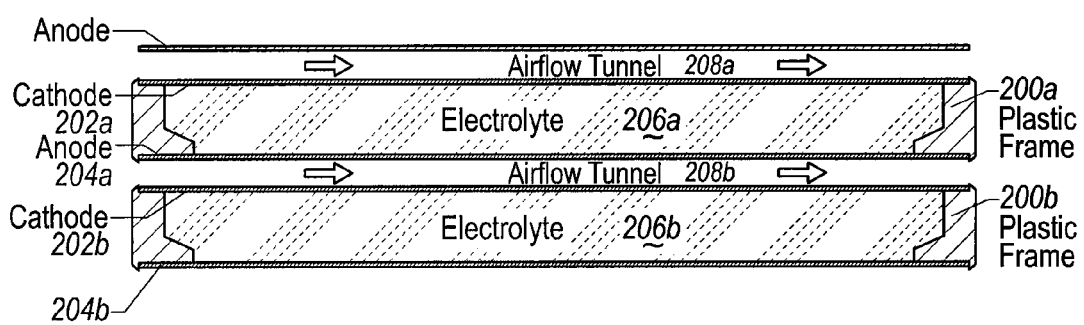
FIG. 2 shows an example of individual cells that may be stacked on top of one another. Individual cells are held together by an electrically insulating plastic frame.

FIG. 2 shows an example of individual cells that may be stacked on top of one another. A cell may include a plastic frame $200a$, $200b$, an air contacting electrode $202a$, $202b$, a metal electrode $204a$, $204b$, and an electrolyte $206a$, $206b$. The liquid electrolyte may be contained by the plastic frame and may be further supported by the metal electrode on the lower part of the cell. In some embodiments, the air contacting electrode may be provided above the electrolyte. The electrolyte may be sandwiched and held between the metal electrode below and air contacting electrode above. One or more air flow tunnels $208a$, $208b$ may be provided between individual cells. An air flow tunnel $208b$ may be provided between a metal electrode $204a$, and an air contacting electrode $202b$.

Thus, two individual cells may be separated from each other by a horizontal air passage or tunnel (not drawn to scale). This horizontal cell configuration may allow air/oxygen to be pumped and circulated between cells to individual air contacting electrodes. Flowing air/oxygen to air contacting electrodes may allow cells to maintain their needed oxygen supply even at higher current densities and the air flow additionally provides cell cooling. Air circulation need not be continually operating and air flow rates may be carefully regulated via feedback mechanisms. In some embodiments, air may flow between individual cells in a stack all in the same direction for each of the air flow tunnels. Alternatively, air flowing between individual cells in a stack may be designed to flow in varying directions.

In one example, a fan (which may include axial fans, centrifugal fans, cross-flow fans), pump, or any other suitable mechanism for producing airflow may be used. One or more actuators may be part of the air flow mechanism or may be in communication with the air flow mechanism. Examples of actuators may include but are not limited to, motors, solenoids, linear actuators, pneumatic actuators, hydraulic actuators, electric actuators, piezoelectric actuators, or magnets. Actuators may cause the air to flow based on a signal received from a controller. The actuators may or may not be connected to a power source. One or more sensors may be provided in a cell arrangement. In some embodiments, the sensors may be temperature sensors, voltage sensors, current sensors, or pH sensors. These sensors may be in communication with the controller. Based on signals received from the sensors, the controller may provide signals to the air flow mechanisms, which may vary and/or maintain the flow of air between cells.

As previously mentioned, there are a number of advantages of a horizontal geometry in metal anode cells.

A. A horizontal geometry may allow fixed/controlled electrolyte resistance, which may require less active management of cell's temperature, current density, or electrolyte levels.

B. A horizontal geometry may also provide ease of physically assembling and stacking multiple cells.

C. There may be no need for a battery separator as gravity helps separate and settle materials of different densities onto the metal electrode.

D. The precipitated discharge product may be helped by gravity, as previously mentioned, to settle as an even (or substantially even) layer on a metal electrode below.

E. A horizontal design may assist in cooling cells and may also allow greater oxygen delivery to individual air contacting electrodes, which may allow higher currents F. Gravity may also help to flow electrolyte as later described.

G. Compression may hold cells in place.

A horizontal battery design need not be limited to a metal anode battery, such as a zinc-air battery. A horizontal cell design may be also used in other battery systems where a solid or a slightly soluble discharge product is formed either during cell operation or during cell idling. This may include, but is not limited to, lead-acid ("flooded" and VRLA) batteries, NiCad batteries, nickel metal hydride batteries, lithium ion batteries, lithium-ion polymer batteries, or molten salt batteries.

VII. Centrode Design for Cell Interconnection

In accordance with an aspect of the invention, systems and methods may be provided for inexpensive, scalable connections between multiple cells.

Interconnecting a number of individual cells in a series electrical connection while maintaining a horizontal geometric configuration for one or more cells (or each cell) may be easily accomplished by what may be referred to as a "centrode". A "centrode" may be created by taking an air contacting electrode of one cell and crimping it along both sides with a separate metal piece. This metal piece may be electrically attached to the cell above it or may itself be the metal electrode for the cell above it. The space between the metal electrode (now positioned on top) and the air contacting electrode (now positioned below) may be separated by a thin air channel 208a, 208b that allows air to be flowed on top of these air contacting electrodes. This is shown in FIG. 2. The resulting centrode sub-assembly resembles a hat section when viewed through the air path 108a, 108b (front to back) as shown in FIG. 1. The metal electrode and the air contacting electrode may be substantially vertically aligned and horizontally oriented.

FIG. 1 illustrates how a metal electrode 104a of a first cell may be crimped around an air contacting electrode 102b of a second cell, thereby connecting the first and second cells in series. The metal electrode of a first cell and an air contacting electrode of a second cell may be electrically connected in any number of suitable ways. For example, either the metal electrode or the air contacting electrode may either be crimped against one another, brazed to one another, welded to one another, pressed against one another, attached to one another with conductive adhesive, soldered to one another, or otherwise fastened.

In some embodiments, an air contacting electrode and metal electrode may be separated by a fixed distance wherein the air contacting electrode may be located above the metal electrode. The fixed distance may be uniform across the area of the air contacting electrode and metal electrode. Alternatively, the fixed distance may be varying across the area of the area of air contacting electrode and metal electrode. In some embodiments, the fixed distance may fall in a range that may include about 1 mm, 2 mm, 3 mm, 4 mm, 5 mm, 6 mm, 7 mm, 8 mm, 9 mm, 1 cm, 1.5 cm, 2 cm, 3 cm, or more. The fixed distance between the air contacting electrode and the metal electrode may define a space in which an electrolyte may be contained or provided. The air contacting electrode and metal electrode may be part of the same cell.

Any number of cells may be assembled, stacked and connected to achieve whatever operating total voltage is required. Each plastic frame may be a common part designed to fit to the shape and sealing requirements of individual centrodes. Each centrode may have unique upper and lower features molded into the plastic. The features molded into the plastic may be the same from cell to cell, or may vary. The molded features may assist with stacking the cells, and for supporting the centrodes within the cells. An automated process assembles the cells in modular fashion by essentially sandwiching multiple centrodes between two corresponding plastic cell frames. This process may be repeated continuously.

Figure 3:
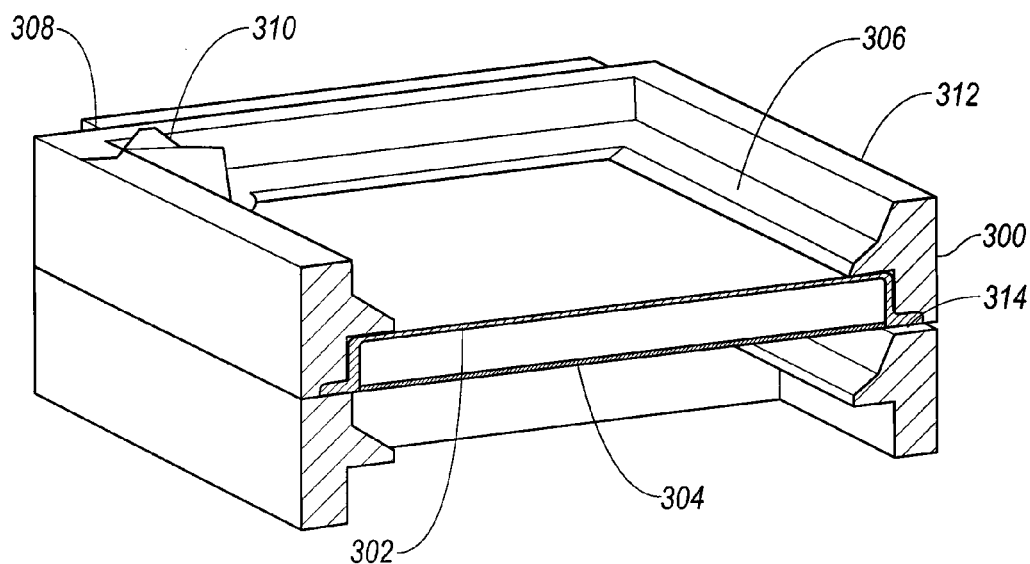
FIG. 3 shows a single cell isometric section view in accordance with an embodiment of the invention. The plastic housing may hold the individual electrodes.

FIG. 3 shows a single cell isometric section view in accordance with an embodiment of the invention. The cell may have a frame 300, metal electrode 302, and air contacting electrode 304. The cell may have desired shape or dimension. For example, the cell may have a rectangular shape, square shape, circular shape, triangular shape, trapezoidal shape, pentagonal shape, hexagonal shape, or octagonal shape. The frame may be correspondingly shaped to fit around the cell.

In some embodiments, a frame 300 may have a vertical portion 312. The frame may also have a horizontal shelf 306 that may protrude within the cell. The shelf may protrude from the vertical portion anywhere along the vertical portion. In some embodiments, the shelf may protrude at or near the bottom of the vertical portion, at or near the top of the vertical portion, or at or near the center of the vertical portion. The vertical portion and/or horizontal shelf may be provided along the entire circumference of the cell or may be provided along one, two, three, four or more sides of the cell. In some embodiments one or more portions of the cell may or may not include a portion of the frame (e.g., the vertical and/or shelf portion of the frame). In some embodiments, the shelf cross-section may be provided as a rectangle, trapezoid, square, any other quadrilateral, triangle, or may have any other shape. In some embodiments, the top surface of the shelf may be tilted. In some embodiments, the top surface of the shelf may be tilted downward toward the center of the cell, or may be tilted downward to the perimeter of the cell. Alternatively, the top surface may be flat with a horizontal orientation.

In some embodiments, a metal electrode 302 may be provided below the shelf 306. In some embodiments, a metal electrode may have a horizontal orientation. The metal electrode may contact the underside of the shelf. In some embodiments, the metal electrode may be shaped to contact one or more vertical sides 312 of the frame. Alternatively, the metal electrode may be shaped to be in close proximity to the vertical side without contacting the vertical side. The metal electrode may be parallel or substantially parallel to the vertical side at that portion.

In some embodiments, the frame may have a bottom feature 314 provided on a lower portion of the cell. In some embodiments, the bottom feature may be an indentation, groove, channel, slot, or hole that may be provided at or near the bottom of the frame. The metal electrode may be shaped to fit within the bottom feature. A portion of the metal electrode fitting within the bottom feature may be parallel or substantially parallel to the surface of the metal electrode spanning the cell. A portion of the metal electrode fitting within the bottom feature may be perpendicular or substantially perpendicular to a portion of the metal electrode contacting or in close proximity to the vertical side.

In some embodiments, an air contacting electrode 304 may span a cell. The air contacting electrode may have a substantially planar configuration. In some embodiments, the air contacting electrode may contact a bottom feature 314 of a cell. In some embodiments, the air contacting electrode may be fitted within the bottom feature of the cell. In some embodiments, a portion of the metal electrode 302 may electrically contact the air contacting electrode within the bottom feature of the cell. For example, the portion of the metal electrode may be crimped around the air contacting electrode within the bottom feature of the cell. In preferable embodiments, a gap may be provided between the portion of the air contacting electrode spanning the cell, and the portion of the metal electrode spanning the cell. Air may be provided within the gap. In some embodiments, air may flow within this gap.

In some embodiments a top feature may be provided on an upper portion of the cell. In some embodiments, the top feature may be an indentation, groove, channel, slot, or hole that may be provided at or near the top of the frame. In some embodiments, the top feature may be a mirror image of the bottom feature. In some embodiments, a top feature may accommodate a metal electrode and/or air contacting electrode above the cell. In some embodiments, an electrical contact between a metal electrode and air contacting electrode may be sandwiched between a bottom feature of a first cell and top feature of a second cell. In other embodiments, a top feature need not be provided. Also, a plastic cell may be injection molded around a centrode or other electrical connections.

Other configurations for frame features, metal electrodes, and air contacting electrodes may be provided. For example, a metal electrode may be provided on top of a shelf. An air contacting electrode may be provided on top of a cell. Positions of metal electrodes and air contacting electrodes may be exchanged.

In some embodiments, a frame may include additional molded features such as a lip 308. The frame may also include a slanted portion 310. In some embodiments, a lip may capture an electrolyte. In some embodiments, some of the electrolyte may be funneled by the slanted portion 310 in a cell. The electrolyte may be contained by the vertical portion 312 of the cell and may be supported by a portion of the metal electrode 302 spanning the cell. In some embodiments, the lip may allow a portion of the electrolyte to flow through the lip portion of the frame and exit beneath the lip portion of the frame. This may prevent or reduce overflow of electrolyte from the cell. In some embodiments, the electrolyte may be provided from within the cell, or may be provided from a source above the cell or may be captured, held or fed to a bladed or expansion chamber pushing up or diagonally up above the cell so that gravity will push the electrolyte back down when there is room in the cell.

An additional advantage of a horizontal configuration is that cells may be designed so that liquid electrolyte management becomes significantly easier. A gravity-based electrolyte management system may be provided in accordance with an embodiment of the invention. As zinc-air batteries discharge, the net volume of the liquid zinc-electrolyte system may increase. If some accommodation is not made for this increased volume, as liquid electrolyte expands, pressure could build up within the cell and liquid electrolyte could penetrate the underside of the porous air contacting electrode. This may not only cause flooding of the porous air contacting electrode but the pressure differential from expanding liquid electrolyte pushing into the porous air contacting electrode may damage the fragile air contacting electrode. In small, sealed batteries, extra space must be allowed for such electrolyte liquid expansion. However, this extra volume may lower overall cell energy density and could create problems in a system where many cells are connected in series and all cells must maintain a correct electrolyte level. It also does not allow new liquid electrolyte to be fed into the system or for the liquid electrolyte to be tested.

In accordance with an aspect of the invention, this issue may be addressed by four horizontally aligned adjacent cells where all four cells share a common corner. This four cell horizontal assembly may be referred to as a "quad". At the point where all four cells meet, the cells could share a filling or overflow or recirculation port. Each cell can be designed to have access to this small port. Each port may have a small overflow lip L that may be tilted slightly above the bottom surface of each air contacting electrode.

Figure 4A:
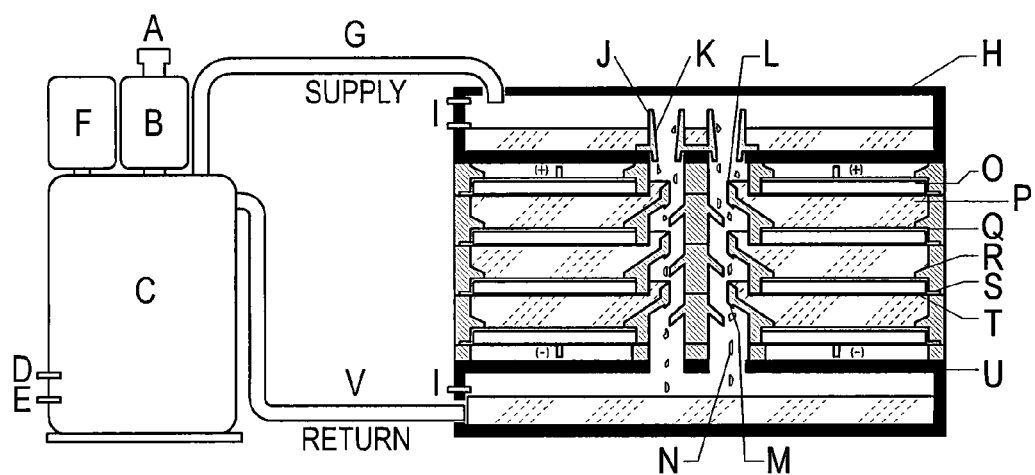
FIG. 4A shows a system for maintaining a substantially constant and uniform electrolyte level within a group of cells that are horizontally arranged, wherein these cells may share a common electrolyte fill port and recirculation tank in accordance with an embodiment of the invention.
Figure 5:
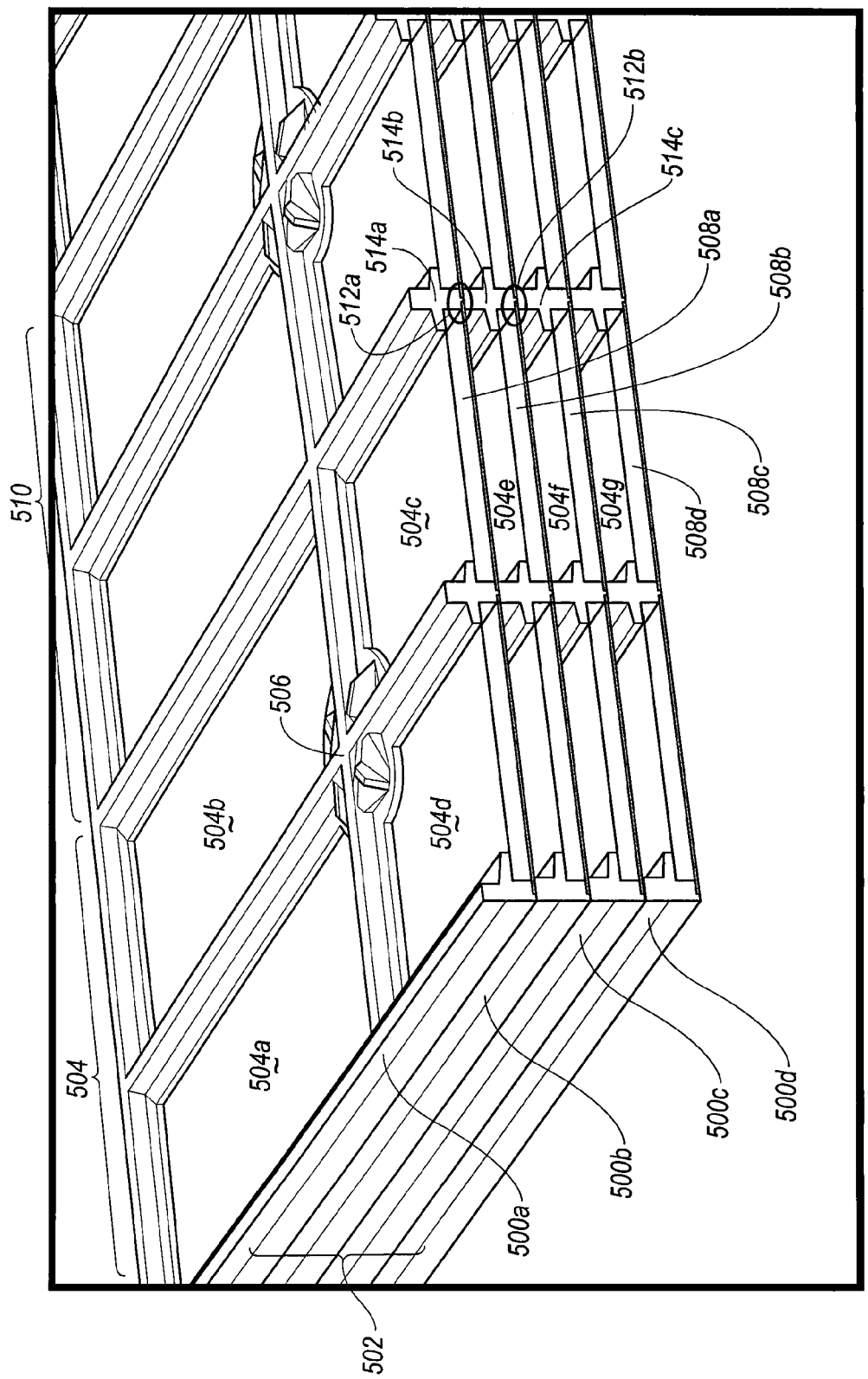
FIG. 5 shows an example of a battery stack configuration.

FIG. 5 shows an example of a four-cell quad, and FIG. 4A shows a stack of cells in cross section within a gravity-based liquid electrolyte management system. The gravity-based liquid electrolyte management system may include a gas relief channel A, from a tank or container B, which may be in fluid communication with another tank or container C. In some embodiments, valves or entry or exit ports D, E may be provided at a tank. In some embodiments, additional tanks or containers F may be in communication with a main tank or container C. Any distribution of tanks or containers may be provided. These may or may not include filters that may capture unwanted particles. In some embodiments, the reservoir tanks may also provide an opportunity to add or remove any desired materials such as electrolyte additives. As an electrolyte circulates within an electrolyte management system, its concentration and/or composition is monitored and may be modified as necessary.

A supply fluid passageway G may supply electrolyte to the entire battery system. A return fluid passageway V may return liquid electrolyte to the battery system. A fluid passageway may include a pipe, tube, channel, wick or any other assembly that may transport fluid. Electrolyte may be supplied to an upper electrolyte tank H. One or more drains or fill port J may be provided. When electrolyte K overflows the tank, it may drip down into an underlying cell and be caught by an overflow lip L.

An overflow lip L may insure a constant liquid electrolyte level that is always in contact with all points of the underside face of the air contacting electrode T. Electrolyte P may be provided within a cell. During cell discharge when liquid electrolyte expands, this lip may allow excess electrolyte in the horizontal "quad" to drain. All of this may be accomplished without requiring any hydrostatic pressure on the air contacting electrode. In other words, these unique ports may allow for liquid electrolyte expansion and gaseous exhaust while maintaining proper (and automatically controlled) electrolyte levels for each group of horizontally arranged cells. This automatic electrolyte level balancing may also help maintain uniform electrical performance. These ports, located at the common center of each adjacent four cell "quad", may line up vertically directly above other ports below (in "quads" located underneath) to create a series of vertically oriented feeder pipes. These pipes may distribute any overflow liquid electrolyte from all parts of the stacked cells to a small sump tray U situated at the bottom of a given stack of cells. These ports may include a prismatic portion M that helps to break overflowing liquid electrolyte into tiny drops N.

The cells may include an air contacting electrode T and a metal electrode R that may be connected at one or more connection points S. An air tunnel 0 may be provided between the air contacting electrode and the metal electrode. In some embodiments, the air contacting electrode and the metal electrode may form a centrode. A frame Q may be provided for a cell, quad, or groups of cells or quads. The frames may be stacked within the battery system.

One or more valves or ports I may be provided within an upper electrolyte tank H or sump tray U. This port may allow electrolyte additives and/or some electrolyte to be drained. A port may allow gases to vent. In some embodiments, ports may provide access to take conductivity or pH measurements. Ports may have additional other uses.

During cell charge, when liquid electrolyte volumes in each cell decreases, these same fill ports may be used to add liquid electrolyte back into each cell of a "quad". During cell charging, a sump pump may be triggered to fill the upper "quad". Electrolyte overflowing this uppermost horizontal four-cell horizontally configured quad enters the drain pipe and by gravity feed, simply fills the horizontal "quad" below it. This overflow may continue and fill the next "quad" below that. Automatic filling of horizontal quads with liquid electrolyte may proceed quickly until all "quads" in a vertical stack have been refilled (or topped off) with liquid electrolyte. These fill/overflow ports may be designed to also serve another function. A prismatic protrusion (M) placed under each overflow lip (4-L) may help break apart any electrolyte liquid into small drops (N) before they drip into a particular quad. This may advantageously help with breaking apart or disconnecting any electrically conductive circuit that might have otherwise been created by a continuous conductive liquid flow (i.e. a large number of connected individual drops) between individual cells. An unbroken flow of conductive electrolyte could have caused a large electrical short circuit across the high voltage produced by numerous cells stacked in series.

In vertically oriented cells that use conventional plate and frame type configurations, liquid connections between cells can be a source of energy loss and other design problems. The horizontal configuration described herein and provided in accordance with embodiments of the invention, with the described fill/overflow port may minimize or reduce these issues with an easily assembled, injection molded, plastic part.

The ease of assembly, modularity and scalability of this battery design is also readily apparent compared to the difficulties associated with conventional battery assemblies (See FIG. 5).

Figure 4B:
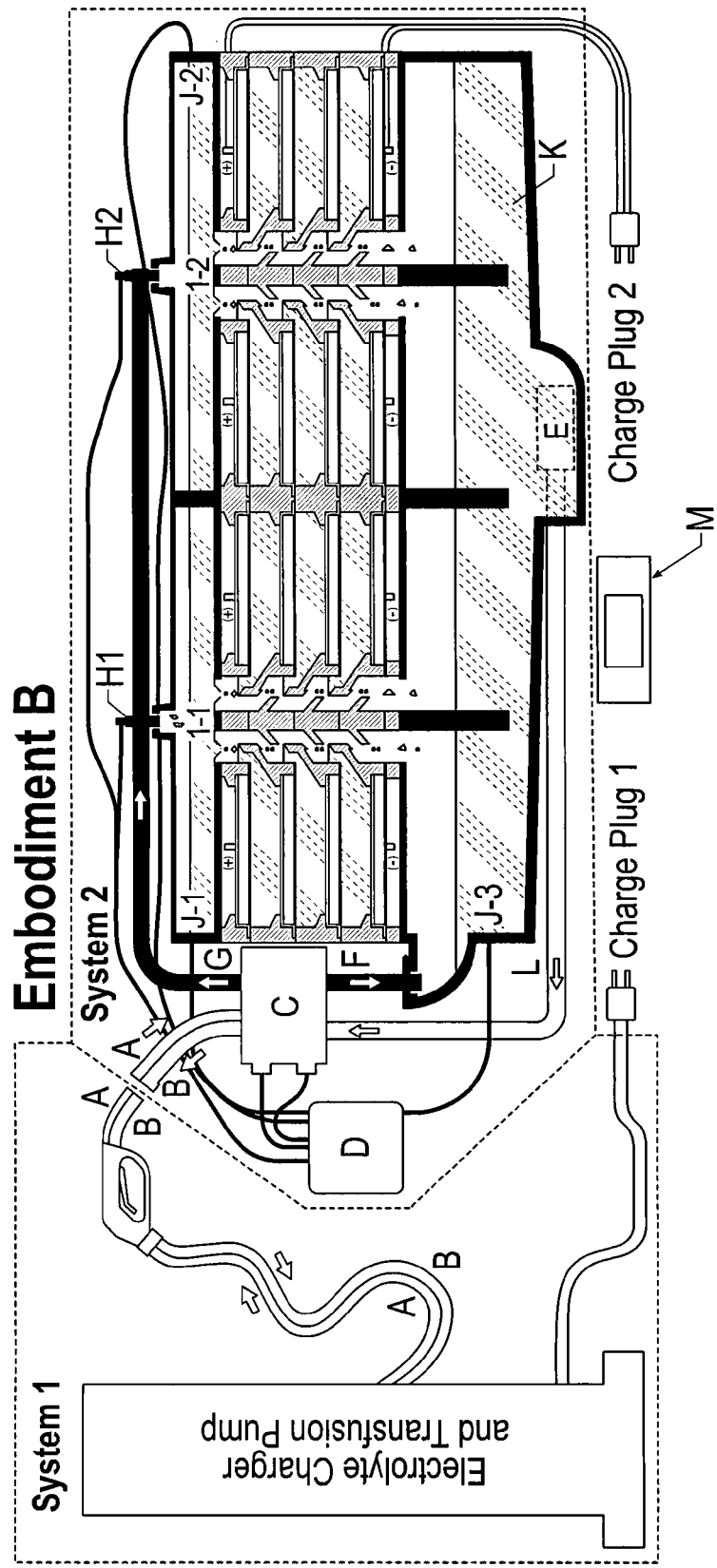
FIG. 4B shows an additional system for maintaining electrolyte levels within a plurality of cells with side by side cells in one plane sharing a common fill port and may include a separate tank or charger where spent electrolyte may be swapped for charged electrolyte (with zinc metal or a zinc slurry) in accordance with another embodiment of the invention.

FIG. 4B shows an additional system for maintaining a constant electrolyte level within a plurality of stacked cells in accordance with another embodiment of the invention. A gravity-flow battery liquid electrolyte management system may include two separate systems. The first system may include a transfusion station with an electrolyte recharger. The second system may include a gravity flow metal anode battery, such as a gravity-flow zinc-air battery.

An electrolyte charger and transfusion pump may be provided in accordance with an embodiment of the invention. The charger may be electrically connected to a charge plug which in turn, may be connected to a power source, such as a grid/utility. A rectifier may be provided to convert AC electricity from a power source to DC to charge the battery. The transfusion system with electrolyte charger may be used for existing fuel stations, residential or fleet use. It may be incorporated into pre-existing structures. The transfusion pump may include one or more electrolyte conducting members A, B which may be a pipe, tube, channel or any other fluid passageway to convey an aqueous electrolyte. A first electrolyte conducting member may be an electrolyte supply A. A second conducting member may be an electrolyte return B. Electrolyte may flow from the electrolyte charger and transfusion pump in the electrolyte supply and may flow to the electrolyte charger and transfusion pump in the electrolyte return. In some embodiments, a pump, valve, pressure differential or any other mechanism may be used to initiate and cause electrolyte flow. In some embodiments, a valve, switch, or locking mechanism may be provided that may stop and/or start electrolyte flow.

A gravity assisted electrolyte flow metal anode battery may include a recharged electrolyte fill tube A, a used electrolyte return tube B, a control valve C, an electronic controller D, a pump E, a supply line to an electrolyte storage tank F, a supply line to upper manifolds G, upper supply control valves H1, 112, upper electrolyte flow controller 11, 12, ports J-1, J-2, J-3, storage tank K, and electrolyte return line from storage tank L. In some embodiments, in a gravity assisted flow design, gravity may push the electrolyte through the cells without requiring a pump to push electrolyte through the cells. In a gravity-flow electrolyte-overflow design, a wicking agent is not required.

Electrolyte fill tube A may provide liquid electrolyte to the gravity flow metal anode battery. Control valve C may determine whether electrolyte is to be provided to the metal anode battery and what should be the electrolyte/flow rate. The control valve may be directed by an electronic controller D that provides instructions to the control valve. These instructions may determine how much electrolyte flow the control valve allows. Instructions may be provided automatically from the controller. The controller may or may not be in communication with an external processor, which may provide instructions to the controller. In some embodiments, the controller may have a user interface or may be in communication with an external device that may have a user interface. In some embodiments, a user may be able to communicate with a user interface, and may provide instructions to the controller, which may affect instructions provided to the control valve.

In some embodiments, the metal-air battery may have a pump E that may assist with electrolyte flow and circulation. In some embodiments, the pump may be provided within a storage tank K of the metal anode battery. An electrolyte return line from the storage tank L may provide electrolyte from the storage tank K to the control valve C. The electrolyte return line from the storage tank may be connected to the pump. The pump may force electrolyte through the electrolyte return line to the control valve. The electronic controller may provide instructions to the control valve that may determine whether electrolyte can return and/or the flow rate at which the electrolyte can return.

A supply line to the storage tank F may be provided. Electrolyte may flow from the control valve C to the storage tank K. A supply line to upper manifolds G may also be provided. Electrolyte may flow from the control valve to the upper manifolds. In some embodiments, one manifold may be provided. In other embodiments, a plurality of upper manifolds may be provided. The upper manifolds may or may not be in fluid communication with one another. In some embodiments, the electrolyte provided through the supply line G may be controlled by one or more upper supply control valves H1, H2. In some embodiments, a control valve may be provided for each upper manifold. The control valve may regulate the electrolyte flow into each upper manifold. The electronic controller D may be in communication with the upper supply control valves. The electronic controller may provide instructions to the upper supply control valves. In some embodiments, instructions provided by the electronic controller may be provided over a wired connection, or may be provided wirelessly.

In some embodiments, upper electrolyte flow controllers 11, 12 may control the electrolyte flow from the upper manifold to the cells below. The flow controllers may break the electrolyte into small drops that do not form a continuous electrically conducting stream. The flow controllers may control the rate of the fluid being transferred from the upper manifold to the underlying cells.

In some embodiments, the upper manifold and/or the storage tank K may have ports J-1, J-2, J-3. In some implementations the ports may be in communication with the electronic controller D. In some embodiments, ports may provide access to take one or more measurements. The measurements may be communicated to the electronic controller which may provide instructions to other parts of the electrolyte management system. For example, based on the measurements, the electronic controller may cause the flow rate of the electrolyte to be adjusted, the temperature of the electrolyte to be adjusted, the pH of the electrolyte to be adjusted, or the composition of the electrolyte to be adjusted.

An electrical connection may be provided within the battery system. For example, an electrical connection may be provided at a (+) side of the battery and an electrical connection may be provided at a (−) side of the battery, and may be connected to a second charge plug. Charge plug 2 may be plugged into a wall socket, such as a grid/utility. An AC to DC rectifier may be provided that may convert AC from a grid/utility to DC to charge the batteries. An inverter may or may not be provided that may convert DC from the batteries to AC as the batteries are discharged.

In some embodiments, the voltage of the battery system may be monitored. In some embodiments, the voltage of the overall system may be monitored, or the voltage of each module may be individually monitored. When voltage drops unexpectedly, this may indicate a problem with one or more cells. In some embodiments, the system may increase electrolyte flow rate when the voltage drops.

In some embodiments, one or more characteristics of the battery and/or electrolyte may be monitored at a single point. For example, the pH of the electrolyte, temperature of the electrolyte, composition of the electrolyte may be measured at a single point, such as inside the storage tank. The invention may include a simplified monitoring system that may determine whether the system needs to be adjusted without requiring expensive and complex sensing systems.

VIII. Additives to Improve Zinc Plate Quality and Form Insoluble Zinc Species

Internal resistance (IR) losses can be kept low by plating out a good quality zinc coating during each recharge cycle. A key factor in the longevity of this cell is that no specific electrode shape need be maintained. In this battery electrolyte, continued cell cycling does not damage the metal electrode. The battery system may include any number of well known additives that may improve zinc deposition on the metal electrode. Examples of additives may include but are not limited to polyethylene glycol of various molecular weights, and/or thiourea. With these additives, a fresh, smooth, level, highly conductive zinc coating may be plated during each cell recharge cycle. This zinc layer is then readily available to undergo facile oxidation and form dissolved zinc ions during the next cell discharge. In this battery system, no exact physical shape is required to be formed during zinc plating. Since gravity helps hold deposited or plated zinc in place, metal electrode failure (quite common in other battery systems) may now be minimized or reduced as a failure mode. This helps achieve a very long cycle life battery.

Another embodiment may include other additives that would cause zinc ions that are generated (during oxidation at the metal electrode during cell discharge) to remain in close proximity to the zinc metal electrode or metal current collector. This is important because these zinc species will then be readily electrically reduced (without excessive migration) during cell charging. It would therefore be useful to have a water soluble additive electrolyte that (once in contact with $Zn^{2+}$ ions formed at the metal electrode) may form an insoluble zinc species that can precipitate to the bottom of horizontally oriented cells. Insoluble zinc species may remain near the zinc electrode and be more easily available for subsequent electrochemical reduction during cell recharge. The battery system may include an additive that may control desirable precipitation. Such additives may include any of the following water soluble species. Examples of water soluble species that form insoluble zinc species include but are not limited to: benzoates, carbonates, iodates, and stearates.

In some embodiments, additives having any of the properties described herein may include but are not limited to urea, thiourea, polyethylene glycol, benzoates, carbonates, iodates, stearates, water soluble catalyst surfactant, or aloe vera, alone or in combination. In some embodiments, adding aloe vera extract may reduce zinc corrosion.

IX. Soluble Catalysts as Electrolyte Additive to Improve Oxygen Formation During Recharge In addition to the solid catalysts incorporated in the air contacting electrode itself other materials such as water soluble manganese salts can be added to improve cell performance during recharge. Since oxygen is generated during cell recharge it is also useful to allow oxygen bubbles to easily escape. This can be accomplished by adding surfactants that act as antifoaming agents (such as Simethicone or Dowex) to break up generated bubbles. The battery system may include an additive that prevents foaming and allows gas release. Additives may include one or more of the following: simethicone, Dowex, aloe vera, or other surfactants.

The air contacting electrode can also be mounted with a small angle to the parallel to assist formed oxygen bubbles to leave a four cell quad via a common fill port near the overflow lip. In some embodiments, expanded titanium could also be disposed with a slight negative crown or stamped perimeter gas relief channel so that it may be ensured that the majority of air contacting electrode surface area is compliant with the electrolyte. Any air bubbles or gases may easily escape via the common fill ports. These configurations will also address flatness tolerance issues and mitigate leveling issues).

X. Urea as Electrolyte Additive to Eliminate Formed Chlorine

The battery system may include an additive to the electrolyte to prevent or minimize chlorine and/or hypochlorite evolution during cell recharge. Urea may be added to the aqueous battery electrolyte to control chlorine generation. Urea and chlorine may react to form chlorides and benign gaseous products (e.g., $N_2$, $CO_2$, and $H_2$). If any free chlorine is formed at all in the electrolyte during cell charging, it may readily react with soluble urea to form additional chloride (which is already an electrolyte component). Generated gases from the reaction of chlorine with urea are not hazardous and may be safely vented. If urea is added to the electrolyte and not replenished, then, as cells are charged (and if chlorine gas is generated), urea may react with formed chlorine, be depleted, and not be available to remove any chlorine gas generated during subsequent charging cycles.

In the cell design provided in accordance with an embodiment of the invention, electrolytes may be periodically tested and, if chlorine levels are above a predetermined level, additional urea may be added as required. In some embodiments, the electrolytes may be manually tested. In other embodiments, one or more sensors may be provided to automatically test the chlorine levels and if necessary, add additional urea to react with and remove chlorine. In some embodiments, urea may be manually added as needed. In alternate embodiments, urea may be automatically added when chlorine levels are above a predetermined level. In some embodiments, the predetermined level may be in the range of 5% urea by weight but typically would be a few ppm urea.

In some embodiments, the battery electrolyte system may include an additive that may prevent hydrogen evolution during cell charging. The additive may include but is not limited to high hydrogen over-potential chloride salts such as tin chloride, lead chloride, mercurochloride, cadmium chloride, or bismuth chloride.

XI. Rapid Recharge with Zinc/Electrolyte Slurry

With a horizontal cell design, a system may be provided where cells may be rapidly recharged (e.g., for long range mobile applications). Zinc chloride particles formed during discharge may be rapidly removed from cells via suctioning this slurry into a waste tank or bladder. This used electrolyte liquid may be replaced by fresh zinc pellets in electrolyte slurry that may be pumped back into the horizontal cell. Solid zinc particles may settle to the bottom of the cell (metal electrode). This mechanical recharging is only expected to take a few minutes.

In some embodiments, as shown in FIG. 4B, one or more horizontal cells may be within a housing or may form part of the battery housing. The housing may be connected to a tank. In some embodiments, used electrolyte liquid may be returned to the tank. The electrolyte liquid may be returned via a return pipe, tube, channel, conduit, or any other fluid communications apparatus. In some embodiments, the tank may supply electrolyte liquid to the housing. The electrolyte may be supplied via a supply pipe, tube, channel, conduit, or any other fluid communication apparatus. In some embodiments, the same tank may receive used electrolyte liquid and provide fresh electrolyte liquid. Electrolyte liquid may then be cycled within the system. In some embodiments, the tank may have one or more treatment processes that may treat the used electrolyte liquid before it is supplied back to the housing. For example, fresh zinc pellets may be added to the electrolyte. In other embodiments, different tanks may be used to receive the used electrolyte liquid and provide fresh electrolyte liquid. Fresh electrolyte may enter the system, and used electrolyte may be removed from the system.

The zinc chloride particles from the used cell can be regenerated locally or in some regional facility (the equivalent of a refinery or tank farm) by well known electrochemical techniques. Such a modification would convert this system from what would be typically envisioned as a battery to more of a flow type cell or zinc air fuel cell. However, all of the above advantages would still be available, and a longer discharge cycle could be accomplished than a discharge cycle that would be available from just the amount of zinc that can fit into each cell without the circulating of external zinc. Another refueling method could be described as electrolyte transfusion, where degraded electrolyte may be exchanged with fresh electrolyte for fast, convenient refueling, similar to traditional pumping stations.

XII. Metal Anode Battery Housing and Assembly

As previously described, the metal anode battery system may include a battery housing. This housing may have any number of configurations that may contain one or more enclosed individual cells. In some embodiments, a cell itself may form part of the housing. For example, cells may be stacked so that cell frames may form part of the housing. In some embodiments, the housing may by fluid-tight. For example, the housing may be liquid tight and/or air tight. In some embodiments, the housing may include one or more venting mechanisms.

A. Plastic Housing with Shared Four Cell "Quad" and Electrolyte Fill/Exhaust Port System The layout and design of a plastic cell frame can be optimized or improved for space efficiency, strength, moldability, and minimized or reduced internal resistance losses due to lowered intercell resistance.

A cell frame design, in accordance with an embodiment of the invention, may incorporate a common centralized electrolyte management system which may be shared by four individually framed, horizontally oriented cells. In other embodiments, the centralized electrolyte management system may be shared by any number of cells, including but not limited to one, two, three, four, five, six, seven, eight, nine, ten, eleven, twelve, thirteen, fourteen, fifteen, sixteen, seventeen, eighteen, nineteen, twenty, or more cells. This design may allow for optimal "centralized" spacing, physical stackability, and electrical connectivity of the manifold system.

FIG. 5 shows an example of a battery stack configuration of an energy storage system. The exterior walls of the plastic frames $500a$, $500b$, $500c$, $500d$ may form a housing wall $502$. In some embodiments, four cells $504a$, $504b$, $504c$, $504d$ may form a quad $504$ with a shared centralized electrolyte management system $506$.

Any number of cells may be stacked on top of one another. For example, four cells $504c$, $504e$, $504f$, $504g$ may be stacked on top of one another. In some embodiments, one or more, two or more, three or more, four or more, five or more, six or more, seven or more, eight or more, nine or more, ten or more, twelve or more, fifteen or more, twenty or more, thirty or more, or fifty or more cells may be stacked on top of one another. One or more air flow passages $508a$, $508b$, $508c$, $508d$ may be provided for each cell. The plurality of vertically stacked cells may be selected to achieve a desired voltage. If vertically stacked cells are connected in series, the number of vertically stacked cells may correspond to an increased voltage level. As described elsewhere herein, a centrode may be used to create a series connection between cells.

Any number of quads or stacks of quads may be provided adjacent to one another. For example, a first quad $504$ may be adjacent to a second quad $510$. One or more rows of quads and/or one or more columns of quads may be provided in an energy storage system. In some embodiments, an energy storage system may include an i×j array of quads, wherein i and j are any whole numbers greater than or equal to 1, including but not limited to 1, 2, 3, 4, 5, 6, 7, 7, 8, 9, 10, 11, 12, 13, 14, 15, or more. In other embodiments, cells or quads may have staggered configurations, concentric configurations, or be positioned in any manner with respect to one another. Gaps may or may not be provided between the adjacent cells or quads. Alternatively, adjacent cells and/or quads may be electrically connected to one another. In some embodiments, one or more cells, or one or more quads may share a common frame with the adjacent cell or quad. In other embodiments, each cell or quad may have its own frame which may or may not contact the frame of the adjacent cell or quad.

As previously discussed, any number of cells may share a common centralized liquid electrolyte management system. Four quadrilateral cells may share a common centralized electrolyte management system, forming a quad. In other examples, six triangular cells may share a common centralized electrolyte management system or three hexagonal cells may share a common centralized electrolyte management system. Any combination of cell shapes may be used, wherein a corner of one or more cells may share a common centralized electrolyte management system. Any reference to quads may also be applied to other numbers or configurations of cells that may share a common centralized electrolyte management system. Horizontal and/or vertical cross conductive connections may be provided. This may provide redundancy of connection.

B. Unique Manifold and Gravity Controlled Drip System Design

Figure 6:
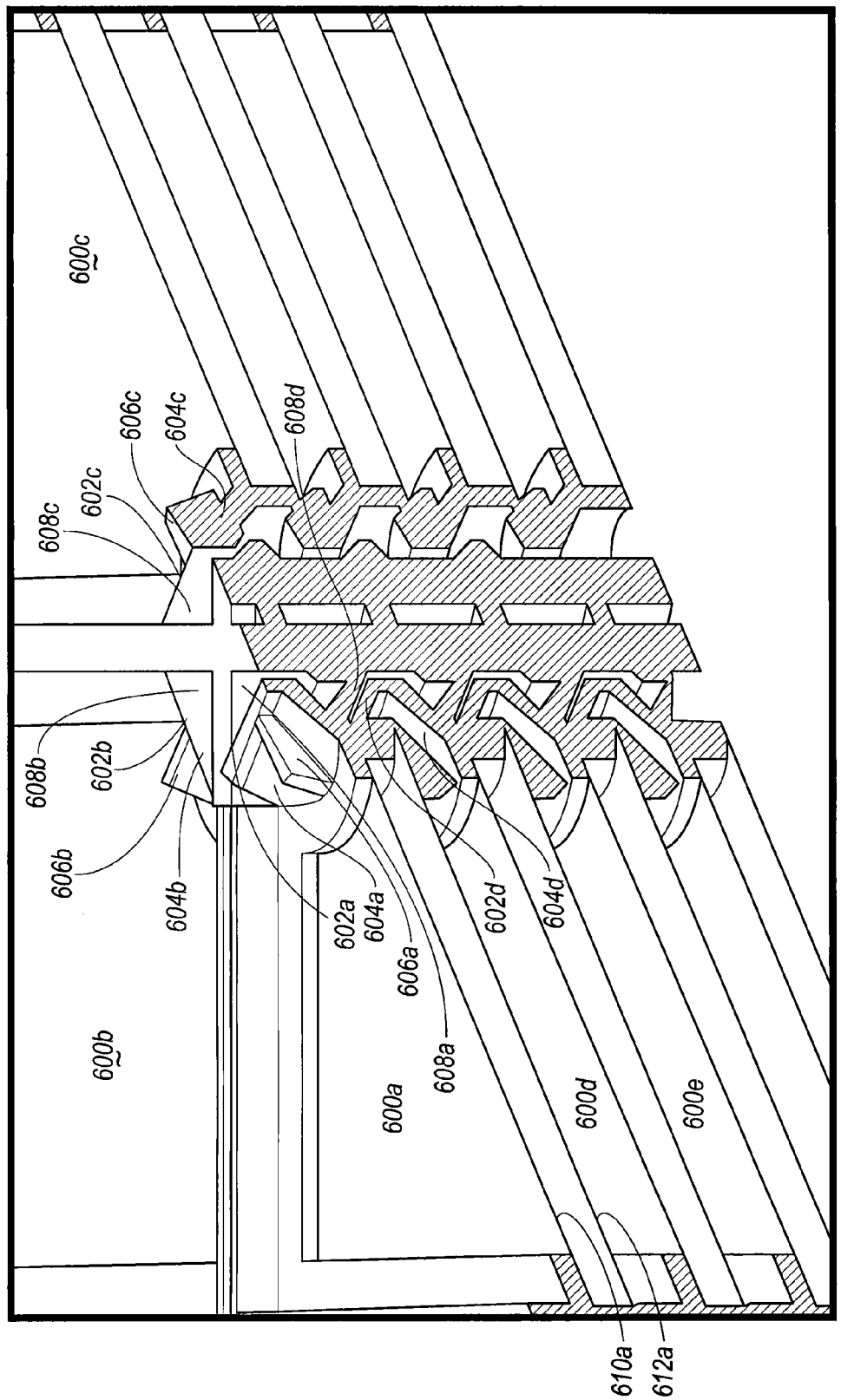
FIG. 6 shows an example of a centralized electrolyte management port for an energy storage system that allows each cell to be filled with liquid electrolyte. Excess electrolyte from one cell may cascade or overflow in a controlled manner into other cells situated below in accordance with an embodiment of the invention.

FIG. 6 shows an example of a centralized electrolyte management system for an energy storage system in accordance with an embodiment of the invention. A plurality of cells 600*a*, 600*b*, 600*c* may share a common electrolyte management system. The electrolyte management system may include a lip 602*a*, 602*b*, 602*c* for each cell. The lip may assist with containing liquid electrolyte within the cell. The electrolyte management system may also include one or more slanted or vertical portions 604*a*, 604*b*, 604*c*. The slanted or vertical portion may direct electrolyte to flow into the cell. In some embodiments, the combination of lip and slanted or vertical portion may capture electrolyte provided from above the cell. In some embodiments, one or more support protrusions 606*a*, 606*b*, 606*c* may be provided. The centralized electrolyte management system may also include a prismatic protrusion 608*a*, 608*b*, 608*c* that allows overflow electrolyte to drip to underlying cells and/or an electrolyte capturing tank below.

In one example, electrolyte liquid may be caught by an overflow lip 602*a* of a first cell 600*a*. Electrolyte liquid may flow down the slanted or vertical portion 604*a* and become contained within the cell. If liquid electrolyte overflows the first cell, it may flow over the overflow lip, and into the prismatic protrusion 608*a*. After flowing through the prismatic protrusion, liquid will be caught by the lip 602*d* and slanted or vertical portion 604*d* of a second cell 600*d* situated below the first cell. Electrolyte may now be captured and contained within the second cell. If the second cell is overflowing or subsequently overflows, electrolyte fluid may flow through the prismatic protrusion 608*d* of the second cell, and may be caught by a third cell 600*e*, or may continue flowing downward to additional cells below.

When initially filling a battery system with liquid electrolyte, cells on top may be filled first, and then liquid electrolyte may overflow into underlying cells or quads, which may then flow over into further underlying cells or quads, for however many layers of vertical cells are provided. Eventually, all of the cells in a vertical stack configuration may be filled with electrolyte and excess electrolyte may be captured by a bottom reservoir tray located beneath the cells.

Any of the features of the electrolyte management system may be integral to the cell frame or may be separate or separable from the cell frame. In some embodiments, the component features may be injection molded.

The electrolyte management system may continually manage liquid electrolyte levels in each four cell "quads" to ensure constant and uniform electrical contact with the lower portion of each air-electrode. Sufficient electrolyte may be provided to the cells so that electrolytes may contact the lower portion (e.g., 610*a*) of an air contacting electrode. In some embodiments, the lower portion may be a metal electrode/anode. In other embodiments, sufficient electrolyte may or may be not be provided to the cell to ensure electrolyte contacts a bottom portion 612*a* of an air electrolyte overhead. The bottom portion of the air contacting electrode may be a cathode during discharge.

FIG. 3 provides an additional view of a cell having an electrolyte management system in the corner.

In preferable embodiments, a prismatic protrusion or lip may be configured to break or disconnect any potential connection of conductive liquid flowing between cells. The prismatic protrusion may break the electrolyte liquid into small sized, individual drops. The prismatic protrusion may control the flow rate of any overflow electrolyte.

The electrolyte management system may be useful for allowing for efficient electrolyte overflow and management. Overflowing electrolyte may be captured by cells below or may flow downwards until it is captured by a tank below.

The electrolyte management system may also allow unwanted, generated gases to be safely vented. In some embodiments, the gases may be vented through passages formed by the prismatic portions, either upward, or downward.

Advantageously, the electrolyte management system may replenish cells with liquid electrolyte via a gravity-controlled, drip system. Cells may be replenished by overflow from cells located overhead, or from an electrolyte source. For example, as shown in FIG. 4A, electrolyte may be supplied to an upper holding tank. Electrolyte may be supplied to the cells or the holding tank in any other manner.

As provided in embodiments of the invention, gravity assisted overflow together with a common refill port for each cell may be generalized and used in any other energy storage device where liquid electrolyte levels may change during discharge and charge. Such liquid management systems need not be limited to metal-air cells, such as zinc air cells described here. Other types of energy storage cells may also benefit from utilizing similar liquid management systems. Liquid electrolyte levels may automatically be adjusted so that liquid only touches the lower portion of each individual air contacting electrode.

An additional modification to this design involves fabricating each cell with a recessed cavity contained on one side. This cavity may function as a liquid reservoir where excess electrolyte volumes may be safely stored as needed. When electrolyte volumes decrease, excess liquid stored in this cavity may automatically flow via gravity and be used to refill the cell thus assuring that all parts of the electrolyte-facing side (bottom portion) of the air contacting electrode remains in contact with the liquid electrolyte.

C. Compression Design for Reliability

FIG. 5 provides a view of a battery stack configuration. As previously described, in some embodiments, the outer surfaces of the frames of the cells can form a housing. In some embodiments, all critical sealing surfaces may be under vertical compressive load for added long term sealing reliability. For instance, a compressive load may be applied to the stack of cells, which can distribute the compressive load to the frames. This causes frames to be compressed together and form a seal. The compressive load may be provided in a direction that compresses a stack of cells together. The compressive load may be provided in a direction perpendicular to a plane formed by a metal electrode or air contacting electrode of the cell. In some embodiments, the compressive load may be provided in a vertical direction.

Centrode assemblies may be sandwiched between corresponding plastic frames to form a series of individually sealed cells. As previously discussed, centrodes may be formed when a metal electrode of one cell is electrically connected to the air contacting electrode of another cell. In one embodiment, this electrical connection may be formed when a metal electrode is crimped around an air contacting electrode. This may allow a serial connection between cells. In some embodiments, a compressive force may be applied between the cells. The compressive force may be applied to the connection between the metal electrode and air contacting electrode. Applying a force that brings the metal electrode and air contacting electrode together may improve the electrical connection between the metal electrode and air contacting electrode. In some embodiments, the metal electrode and air contacting electrode contact point may be sandwiched between plastic frames, and the compressive load may provide a compressive force between the frames and contacts. A fluid tight seal may be formed, which may prevent electrolyte from flowing from one cell to another via the frame contact with the centrode. This seal may be done or supported with adhesive.

Outer walls and interior partitions (which may form frames of the cells) may be structural members designed to properly house and seal the inner workings of each cell, and apply compressive loads on critical cell joints and sealing surfaces. This provides an easily assembled, reliable design and an advantageous structural system when individual cells are stacked vertically. FIG. 1 and FIG. 2 show how the individual cells may be stacked vertically. In some embodiments, a stack may be loaded with a compressive force which may be applied to the frames and/or connections between the metal electrodes and air contacting electrodes.

D. Metal Electrode, Air Contacting Electrode Sub-Assembly

FIG. 1 shows a connection between a metal electrode and air contacting electrode. In some embodiments, a stamped assembly method crimps the metal electrode over the air contacting electrode, forming a hat section for air to pass through. In some embodiments, the metal electrode may be crimped over the air contacting electrode so that a portion of the metal electrode contacts an edge on a first side of the air contacting electrode and an edge on a second side of the air contacting electrode. In other embodiments, the air contacting electrode may be crimped over the metal electrode so that a portion of the air contacting electrode contacts an edge on a first side of the metal electrode and an edge on a second side of the metal electrode. The metal electrode and air contacting electrode may be crimped together in any manner so that they are bent or folded over one another with various configurations. In some embodiments, they are crimped or otherwise attached together so that they contact one another without requiring any bends or folds. Other ways of forming an electrical connection, as mentioned above can be used.

A metal anode contacting electrode assembly may utilize different materials that are crimped to form an electrical flow connection along both sides of the air path. In some embodiments, examples of materials for the metal electrode may include zinc (such as a zinc powdered amalgam), or mercury. Examples of materials for the air contacting electrode may include carbon, Teflon, or manganese.

An electrode assembly may be provided where the metal electrode provides the sealed floor of the electrolyte pool above, while the air contacting electrode forms the sealed cover for the electrolyte pool below. For example, as shown in FIG. 1, a metal electrode 104*a* may form the floor of an electrolyte pool 106*a*. The air contacting electrode 102*a* may form the cover for the electrolyte pool. The metal electrode and/or air contacting electrode may be sealed.

A centrode formed by the metal electrode and air contacting electrode may have any dimensions. One or more of the dimensions (e.g., length or width) may be about 'A", ½" 1", 2", 3", 4", 5", 6", 7", 8", 9", 10", 11", 12" or more.

E. Cross Conductive Design Between Cells

Figure 7:
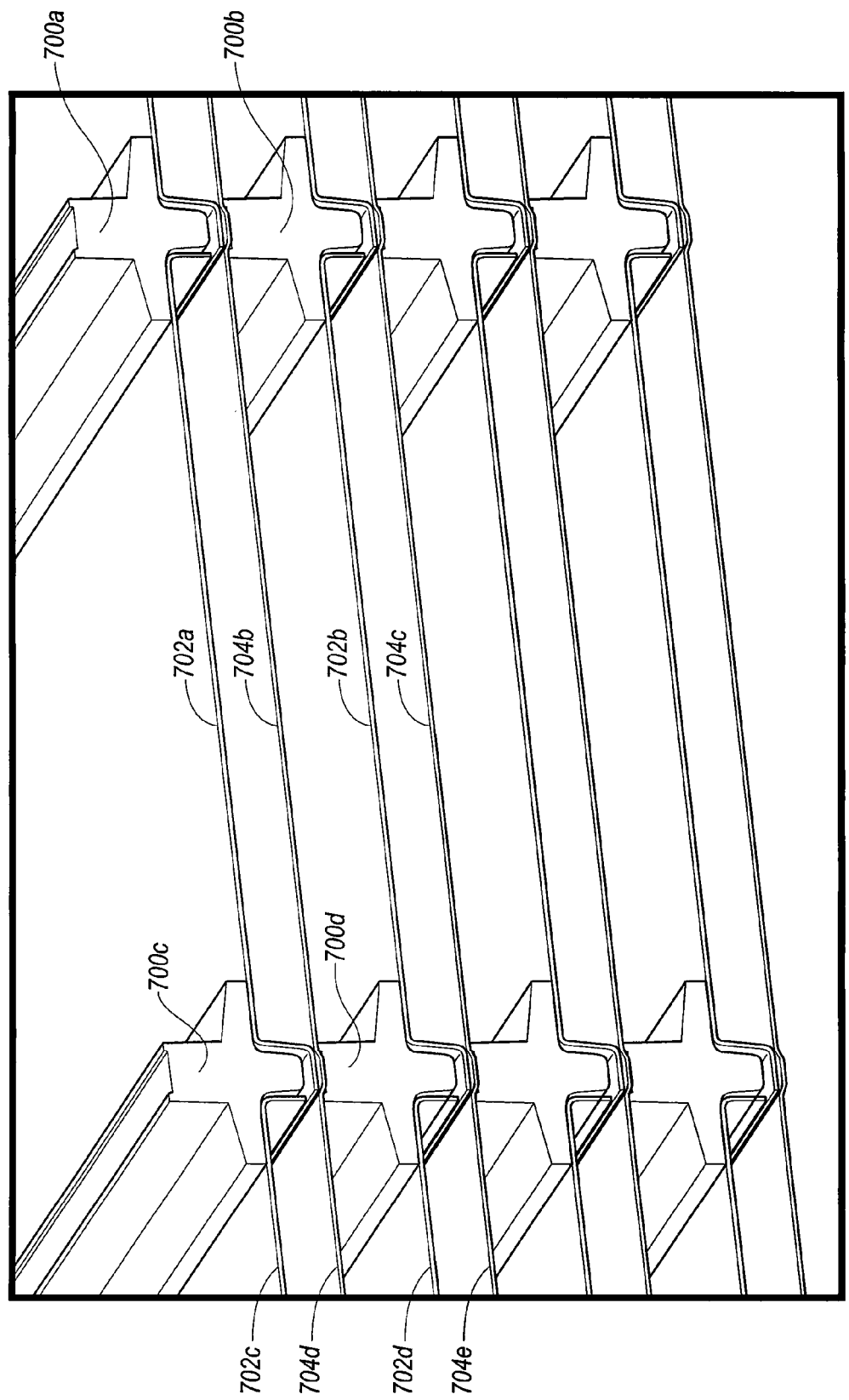
FIG. 7 shows an additional view of a battery stack configuration with metal electrode and air contacting electrode connections vertically and also with horizontal redundancy to allow bypassing a failed cell.

FIG. 7 shows an additional view of a battery stack configuration with metal electrode-air contacting electrode connections. A metal electrode—air contacting electrode assembly configuration may be provided where neighboring crimp flanges or other extensions of centrodes overlap or touch, creating a repeatable, modular and horizontally and vertically electrically connected series configuration.

A first cell may include frame members 700*a*, 700*c*, and may have a metal electrode 702*a*. The metal electrode may be crimped around the air contacting electrode 704*b* of an underlying cell. In some embodiments, the metal electrode of a neighboring cell 702*c* may be crimped around the air contacting electrode its underlying cell 704*d*. In some embodiments, the electrical connection formed by the metal electrode 702*a* and air contacting electrode 704*b* may be in electrical communication with the electrical connection formed by metal electrode 704*c* and air contacting electrode 704*d*. For example, one of the metal electrodes 702*c* may contact the other metal electrode 702*a*. Alternatively, the electrical connection between neighboring cells can be formed by any combination of metal electrodes and/or air contacting electrodes contacting one another. In some embodiments, electrical connections between overlying and underlying cells and adjacent cells (e.g., the connection between 702*c*, 704*d*, 702*a*, 704*b*) may be provided between frames (e.g., 700*c*, 700*d*).

FIG. 7 shows an example of how metal electrodes and air contacting electrodes may make electrical connections by crimping and folding. However, any combination of contacts between metal electrodes and air contacting electrodes folded over or contacting one another may be used in accordance with various embodiments of the invention. The positions of metal electrodes and air contacting electrodes may be reversed in alternate embodiments of the invention, and any discussion relating to metal electrode positions may apply to air contacting electrode positions and vice versa.

Overlapping or otherwise compliant crimp flanges may allow for a series or a series-parallel electrical connection for system reliability, simplicity and flexibility. For example, one advantage of such a system may be that fewer wires and connection points are needed because every row in a cell frame may be electrically connected in series via overlapping crimp flanges.

Figure 9A:
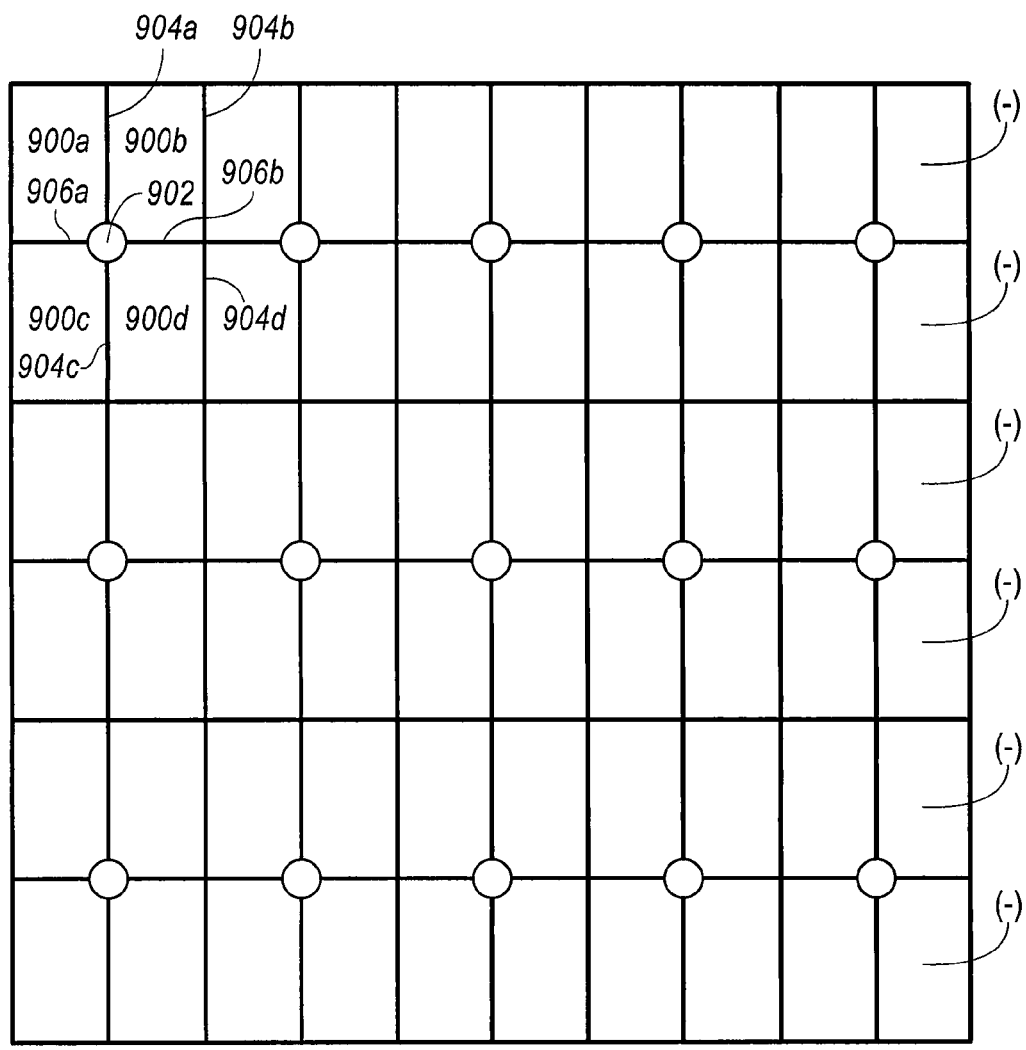
FIG. 9A provides a bottom view of a cell frame assembly or tray with electrical connections at the end of each row that are horizontally connected.

FIG. 9A provides a bottom view of a cell frame assembly with electrical connections. One or more cells 900*a*, 900*b*, 900*c*, 900*d* may form a quad with a common electrolyte management system 902. The bottom of a cell may be formed of a metal electrode. One or more frame components 904*a*, 904*b*, 904*c*, 904*d*, 906*a*, 906*b* may be provided, separating cells. In some embodiments, electrical connections between cells may be provided for adjacent cells. For example, electrical connections may be provided between two or more cells within a row, such as between a first cell 900*a* and a second cell 900*b*. An electrical connection may be provided near a frame 904*a* between the cells. Electrical connections may be provided between two or more cells within a column, such as between a first cell 900*a* and second cell 900*c*. An electrical connection may be provided near a frame 906*a* between the cells. Electrical connections may be provided for any combination of adjacent cells within a row or column.

In some embodiments, electrical connections are not provided between adjacent cells. In some embodiments, electrical connections may be provided only between overlying and underlying cells forming a stack.

Figure 9B:
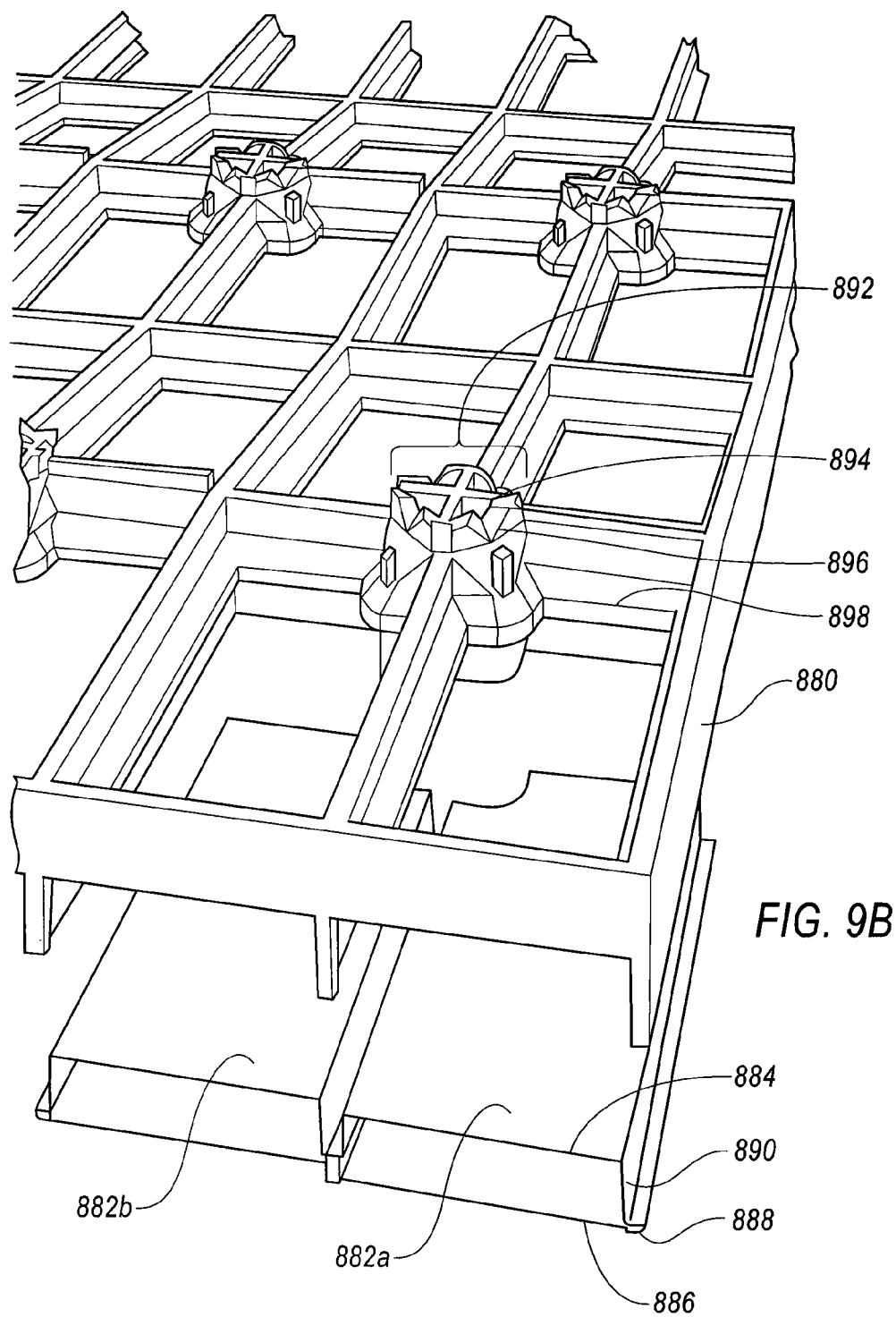
FIG. 9B shows a cell frame or tray assembly together with one or more centrodes.

FIG. 9B shows one view of a frame assembly and one or more centrodes. A frame 880 may be providing for one or more single cells or quads, or a plurality of single cells or quads. One or more centrodes 882*a*, 882*b* may be formed of a metal electrode 884 and an air contacting electrode 886. A centrode may be shaped to fit within the frame. In some embodiments, the frame may rest on the centrodes so that a side portion of the frame forms a wall of a cell and the metal electrode of the centrode forms the floor of the cell. A plurality of adjacent centrodes, e.g., 882a, 882b may be electrically connected to one another. For example, a centrode may have a point where the metal electrode and air contacting electrode contact one another 888. The contact point of a first cell may contact a contact point of the second cell. In some embodiments, the centrode may be formed so that an air tunnel 890 is provided between the metal electrode and the air contacting electrode.

The frame 880 may include an electrolyte distribution assembly 892 that may be integrally formed into the frame. The electrolyte distribution assembly may include a slot 894 that may allow electrolyte to flow to underlying cells. The electrolyte distribution assembly may include an overflow lip 896 that may determine when an electrolyte overflows into the slot. In some embodiments, the height of the overflow lip may provide tolerance for when the cells or overall battery system is tilted. Even if the overall battery system is tilted, if the overflow lip is sufficiently high, sufficient electrolyte will be retained within the cells before overflowing.

The frame may also include a shelf 898 that may protrude from the frame. The metal electrode 884 may contact the shelf. In some embodiments, a fluid-tight seal may be formed between the metal electrode and the shelf. The contact between the metal electrode and the air contacting electrode 888 may contact a bottom portion of the frame 881. The bottom portion of the frame may rest on top of the contact point. A fluid tight connection may or may not be formed. A bottom portion 883 of a frame may rest on top of a contact point formed between adjacent centrodes.

F. Stackable Configuration & Modular Assembly

FIG. 5 shows a design that utilizes one plastic frame component that essentially sandwiches multiple centrodes between two of the common frames. This may advantageously provide a simplified design. For example, as shown, a frame may be provided forming a grid pattern that can span multiple cells. The grid-pattern frames can be stacked on top of one another. In some embodiments, grid-pattern frames may be formed of a single integral piece. Alternatively, the grid-pattern frames may be formed of multiple pieces that may be connected to one another. The multiple pieces may or may not be detachable. Centrodes 512a, 512b may be provided between the frames 514a, 514b, 514c.

The frame design may include a water management system. The water management system may be provided in FIG. 4, which may show water inlets, elevated overflow ports and prismatic drip edges, as previously described. The water management system may be used to ensure a desired electrolyte level within one or more cells.

When stacked, the plastic frame design can form a series of vertical tubes or pipes that allow for water overflow, drip replenishment of electrolyte and gas exhaust. As previously discussed in relation to FIG. 4 and FIG. 6, an electrolyte management system may be provided. When the frames are stacked on one another, the electrolyte management system may be provided for stacks of cells.

The stackable frame assembly configuration may be both modular and efficient. The plastic features may conform to the mating shape of the metal electrode below and the air contacting electrode above the cell beneath it, which may allow for a modular configuration with fewer parts. FIG. 1 and FIG. 2 provide an example of a stack of cells with features in the frames that may be molded to conform to the metal electrode and air contacting electrode connection. Depending on the shape of the metal electrode and air contacting electrode connection, the frames may be shaped to conform to the connection shape. In some embodiments, one or more ridges, grooves, channels, protrusions, or holes may be provided on the plastic frame to complement a corresponding shaped feature of the metal electrode-air contacting electrode connection. In some embodiments, the complementary shape may keep the frame from shifting horizontally in one or more directions. Any features may be integral to the cell or separable from the cell. In some embodiments, frame features may be injection molded.

G. Modular Installation and Utilization Configurations

Multiple battery configurations can be achieved by scaling the frame design up or down. For example the frame design can include a single cell frame, quad cell frame, or multiple quads in a single frame. The frame design for each grouping (e.g., single cell, quad cell, multiple quads) can be formed of a single integral piece. Alternatively, the frame design could include multiple parts.

In some embodiments, multiple frames may also be provided adjacent to one another. For example, multiple single-cell frames, quad-cell frames, or multi-quad frames may be provided adjacent to one another. Frames provided adjacent to one another may or may not be connected to one another using a connector. In some embodiments, a force may be provided to hold the frames against one another.

Frames may be stacked to any desired height depending on power and storage demands. Any number of frames may be stacked on top of one another. For example, one or more, two or more, three or more, four or more, five or more, six or more, seven or more, eight or more, nine or more, ten or more, twelve or more, fifteen or more, twenty or more, thirty or more, sixty or more, ninety or more, 120 or more, or 150 or more frames may be stacked on top of one another. In some embodiments, each frame may be about ⅛", ¼", i/2", ¾", 1", 1.25", 1.5", 2", 2.5", 3", 4", 5", 6", 8", 10", or 12" tall. In some embodiments, an overall height of a stack of frames may be in the order of about 1 or more inches, 3 or more inches, six or more inches, 1 or more feet, 2 or more feet, 3 or more feet, 5 or more feet, 10 or more feet, or 20 or more feet.

Stacks of individual frames may be oriented in various directions to optimize air circulation. For example, air tunnels may be provided within cells. In some embodiments, the air tunnels may be provided between cells. For example, a continuous air tunnel may be formed between adjacent cells. Air tunnels may be provided for columns of cells and/or for rows of cells. In some embodiments, these air tunnels may be parallel to one another. In other embodiments, one or more air tunnels may be perpendicular to one another. In some embodiments, air tunnels may be formed of a straight line, or in other embodiments, air tunnels may have bends or curves. In some embodiments, when cells may be slightly tilted, air tunnels may be substantially horizontally oriented but have a slight rise and fall to accommodate the tilt of the cells. Air may flow in the same direction for parallel air tunnels, or may flow in opposite directions. In some embodiments, an air tunnel may be confined to a single level. In other embodiments, passages may be provided that may allow an air tunnel to be provided over multiple levels of the stacks. Any combination of these configurations may be utilized. A stack or series of stacks can be utilized in various configurations and installed in various housings. For example, stack heights may vary. Similarly, the number of cells provided per level of a stack may vary. In some embodiments, individual cell sizes or shapes may be uniform, while in other embodiments, individual cell sizes or shapes may vary. Housing sizes may vary depending on the size of the stacks. For example, an overall energy storage system may have one or more dimensions (e.g., height, width, length) on the order of inches, feet, tens of feet, or hundreds of feet. Each dimension may be within the same order of magnitude, or may be within varying orders of magnitude. A stack or series of stacks can be configured as a fuel cell system via the exchange or replenishment of electrolyte, and the packaging of said support systems. For example, a zinc-air fuel cell system may include the addition of zinc metal and the removal of zinc oxide. As previously mentioned, zinc pellets may be added to the electrolyte. Zinc oxide or zinc chloride may be removed to a waste tank.

H. Insulated Cargo Container and HVAC Machine Utilization

Figure 8A:
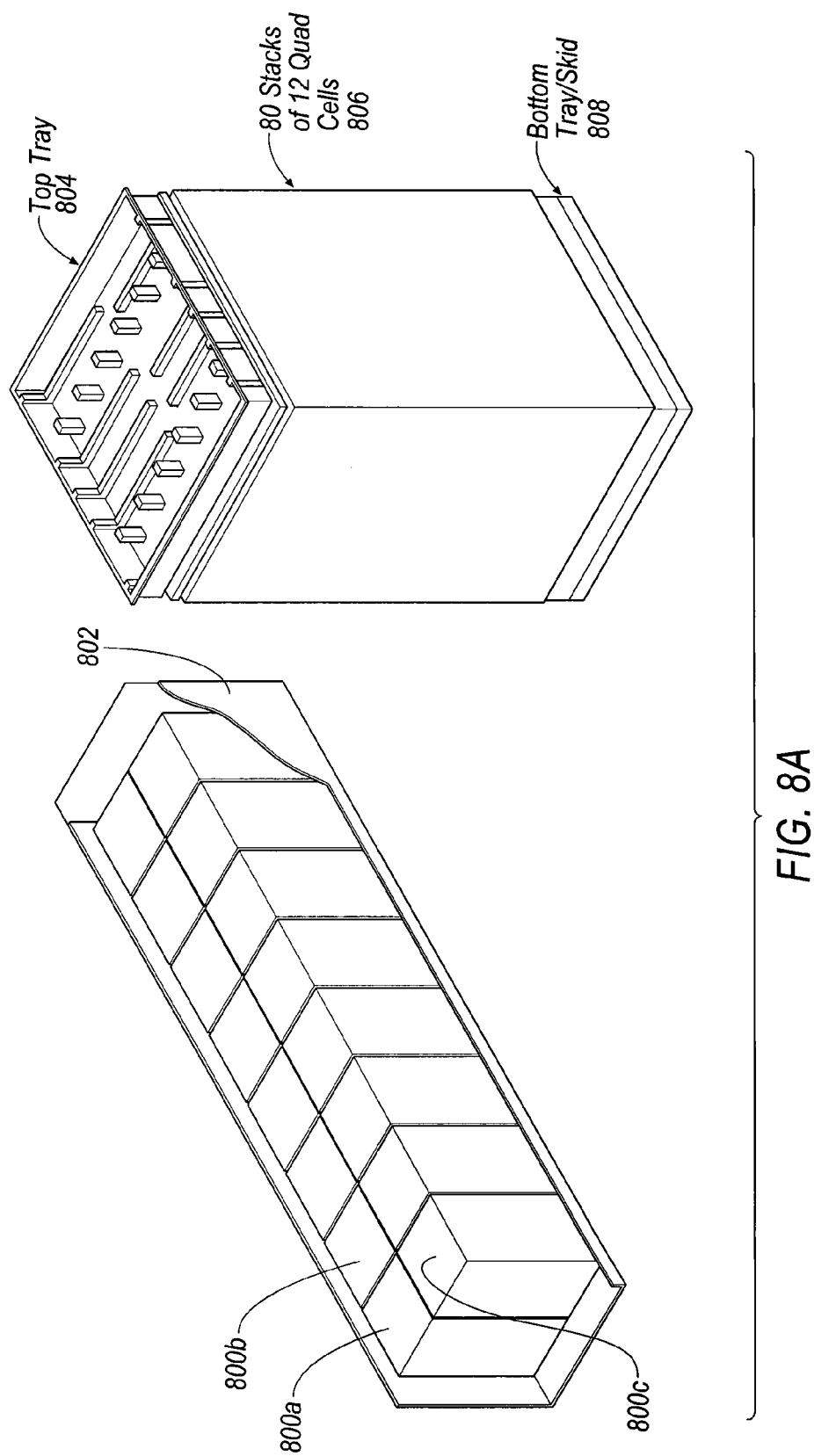
FIG. 8A shows an example of an insulated cargo container and HVAC machine utilization for a battery module with a separate stack of trays with an upper electrolyte storage tank and a lower drain, to be part of an electrolyte recirculation system in accordance with an embodiment of this invention.

FIG. 8A shows an example of an insulated cargo container and HVAC machine utilization for a battery stack in accordance with an embodiment of the invention. A plurality of modules 800a, 800b, 800c may be provided within a housing 802. Each module may have a top tray 804, one or more stacks of cells (which may include one or more levels/layers of single cells, quad cells, and/or any number of cells) 806, and a bottom tray or skid 808. See also FIG. 8H. Each stack of cells might have a manifold whereby electrolyte can be sent or disconnected to a given stack or section of a stack. Similarly, electrical connections can be segregated and disconnected to certain stacks.

In one example, 16 modules 800a, 800b, 800c of 960 quad cells may be provided. Two rows, each having eight modules may be provided. In various embodiments of the invention, any number of modules may be provided, including but not limited to one or more, two or more, three or more, four or more, five or more, six or more, seven or more, eight or more, nine or more, ten or more, twelve or more, fifteen or more, twenty or more, thirty or more, fifty or more, or a hundred or more modules. In some embodiments, the modules may be arranged in one or more rows and/or one or more columns. In some embodiments, the modules may be arranged in an array. A housing 802 may be shaped to fit the modules. In some embodiments, the housing may be about 40, 45, 50 or 52 feet long.

A module may have any dimensions. In some embodiments, a module may be about 50 inches by 44 inches. In one example, a module may comprise 80 or 120 or more stacks of 15 or more or less quad cells. However, a module may be formed of any numbers of levels/layers in stacks, including but not limited to 1 or more layers, 2 or more layers, 3 or more layers, 5 or more layers, 10 or more layers, 20 or more layers, 30 or more layers, 40 or more layers, 50 or more layers, 60 or more layers, 70 or more layers, 80 or more layers, 90 or more layers, 100 or more layers, 120 or more layers, 150 or more layers, or 200 or more layers. Each stack layer may include any number of single or quad cells. For example, each stack level/layer may include 1 or more, 2 or more, 3 or more, 4 or more, 5 or more, 6 or more, 7 or more, 8 or more, 9 or more, 10 or more, 12 or more, 14 or more, 16 or more, 20 or more, 25 or more, 30 or more, 36 or more, 40 or more, 50 or more, or 60 or more single cells or quad cells per level/layer.

In some embodiments, a module may include a top tray 804. The top tray may be configured to accept electrolyte. In some embodiments, the top tray may be configured to distribute the electrolyte to one or more cells. The top tray may be in fluid communication with electrolyte management systems of the cells. In some embodiments, the top tray may be in fluid communication with one or more cells. The top tray may include one or more protrusions. The one or more protrusions may provide structural support for a cover over the tray. The top tray may include one or more channels or grooves. In some embodiments, the top tray may include one or holes or passageways providing fluid communication to the underlying layers.

A module may also include a bottom tray or skid 808. In some embodiments, the bottom tray or skid may collect electrolyte that may overflow from the stacks overhead. The bottom tray or skid may contain the collected electrolyte or may transfer it elsewhere.

A modular design may be crafted to fit in various standard ISO cargo containers in an optimized fashion. In some embodiments, a housing may be an ISO cargo container. The housing may have a length of about 20 ft (6.1 m), 40 ft (12.2 m), 45 ft (13.7 m), 48 ft (14.6 m), and 53 ft (16.2 m). An ISO container may have a width of about 8 feet. In some embodiments, a container may have a height of about 9 ft 6 in (2.9 m) or 4-ft 3-in (1.3 m) or 8 ft 6 in (2.6 m). A modular design may also be crafted fit any other various standard containers, such as air freight containers. The modular design may provide flexibility for the energy storage system to fit within pre-existing containers or structure.

A modular design may take advantage of existing refrigeration and air handling equipment attached to insulated containers as a complete HVAC solution.

Conventional cooling may be accomplished by properly placing cooling vents to the outside of the enclosure.

In some embodiments, a battery system may include one or more battery modules, one or more electrolyte management systems, and one or more air cooling assemblies. In some embodiments, a battery module may include a top fray, bottom fray, and one or more cell stacks. In some embodiments, a stack of cells may include one or more layers or levels of cells. In some embodiments, one or more levels or layers of cells may include a single cell, a quad of cells, a plurality of cells, or a plurality of quads of cells. For example a layer may be made of an m×n array of cells or an m×n array of quads, where m and/or n may be independently selected from any whole number greater than or equal to 1, including but not limited to 1, 2, 3, 4, 5, 6, 7, 8, 9, 10, 11, 12, 13, 14, 15, 16, 17, 18, 19, 20, 21, 22, 23, 24, 25, or more. Each module may incorporate one or more parts of an electrolyte management system. In some embodiments, each quad may share one or more parts of an electrolyte management system.

In some embodiments, a module may be a 50 kW/300 kWh module. In other embodiments, a module may have any other power/energy. For example, a module may provide 10 kW or more, 20 kW or more, 30 kW or more, 50 kW or more, 70 kW or more, 100 kW or more, 200 kW or more, 300 kW or more, 500 kW or more, 750 kW or more, 1 MW or more, 2 MW or more, 3 MW or more, 5 MW or more, 10 MW or more, 20 MW or more, 50 MW or more, 100 MW or more, 200 MW or more, 500 MW or more, or 1000 MW or more. A module may also provide 50 kWh or more, 100 kWh or more, 200 kWh or more, 250 kW hr or more, 300 kWh or more, 350 kWh or more, 400 kWh or more, 500 kWh or more, 700 kWh or more, 1 MWh or more, 1.5 MWh or more, 2 MWh or more, 3 MWh or more, 5 MWh or more, 10 MWh or more, 20 MWh or more, 50 MWh or more, 100 MWh or more, 200 MWh or more, 500 MWh or more, 1000 MWh or more, 2000 MWh or more, or 5000 MWh or more.

Figure 8B:
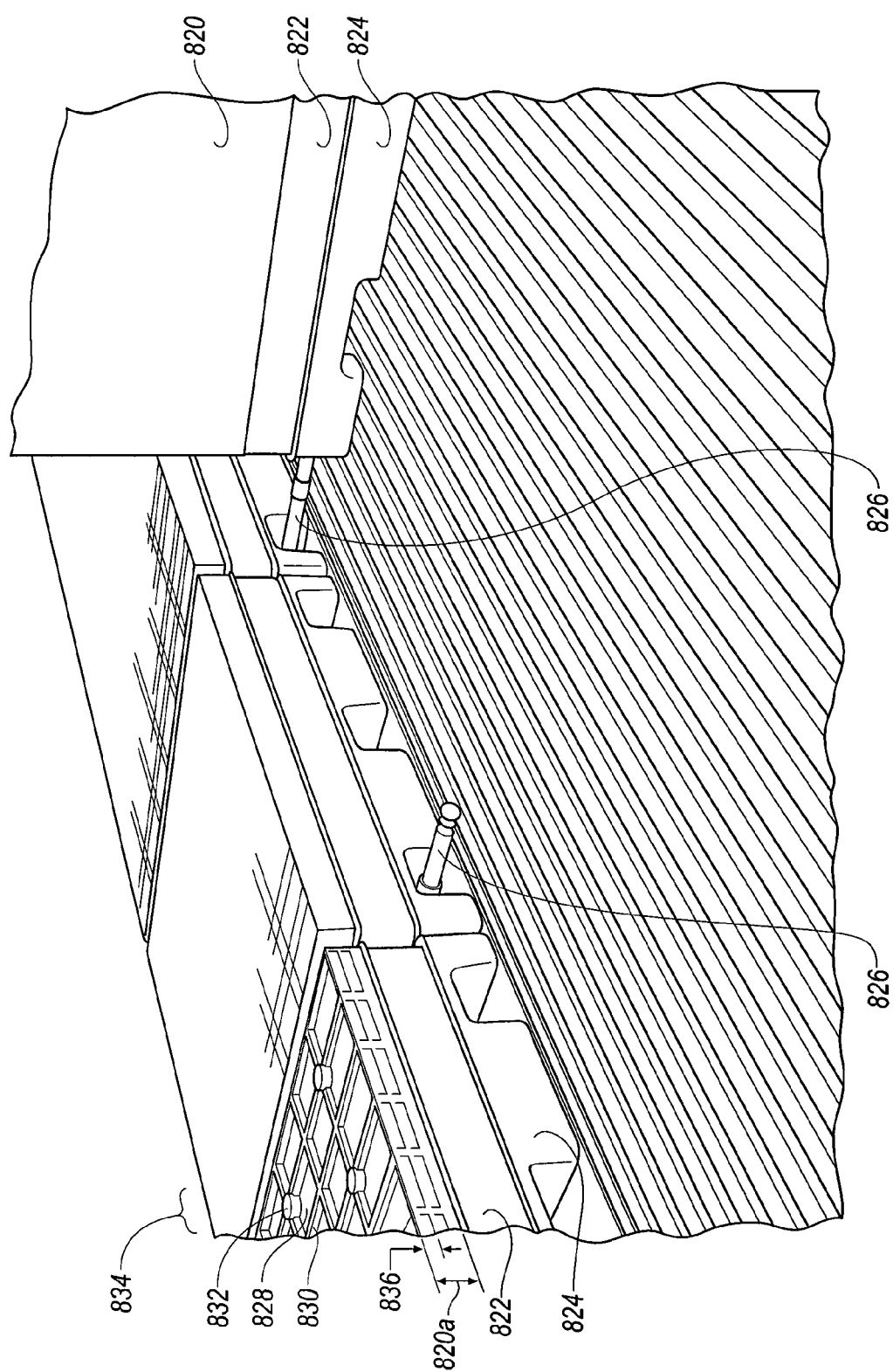
FIG. 8B shows individual trays of cells at bottom of battery modules with pipes that are part of a recirculation system on the container floor in accordance with an embodiment of this invention.

FIG. 8B shows bottom portions of battery modules in accordance with an embodiment of the invention. The bottom portions may include one or more stacks 820 which may include one or more layers/levels 836 of cells. The battery module may include a battery stack support 824 beneath the layers of cells. The stack support may support the stack under a lower tank 822. The lower tank may be configured to contain electrolyte that may flow from the stacks. The stack support may be configured to prevent electrolyte from contacting the bottom of the stacks, such as an air contacting electrode at the bottom of the stack. In other embodiments, the stack support may allow electrolyte to contact the bottom of the stack but may provide support for keep the stack support suspended over portions of the lower tank.

In some embodiments, the lower electrolyte storage tank which may be thermoformed, may receive electrolyte overflow and assist in circulating the electrolyte within the battery system. For example, the lower tank may direct the electrolyte to a testing tank, and then to an upper tank, which may distribute electrolyte to one or more stacks. The lower tank fluidly connect to one or more fluid distribution members 826 which may include pipes, channels, or any other passage for distributing fluid known in the art.

A stack 820 within a battery module may include one or more layers or levels 836. A level or layer may include a frame 830. The frame may be injection molded or formed in any other manner. In some embodiments, a single integrally formed frame may be provided per layer or level. In other embodiments, multiple frames or separable portions of frames may be provided per layer or level. In some embodiments, a frame may include a portion of an electrolyte management system 832. The electrolyte management system may be integrally formed within the frame. When layers of the frames are stacked vertically, portions of the electrolyte management system may become aligned vertically and allow electrolyte to be distributed to the cells 834 within the layers.

A cell 834 may be formed as surrounded by a frame 830 and supported by an electrode 828. In preferable embodiments, the surface of the electrode forming the bottom portion of the cell may be a metal electrode. Electrolyte may flow into the cell and be supported by the electrode and contained by the frame. Any overflow of electrolyte may flow into the electrolyte management system 832 and may be distributed to an underlying cell, or may flow all the way to the lower tank 822.

Figure 8C:
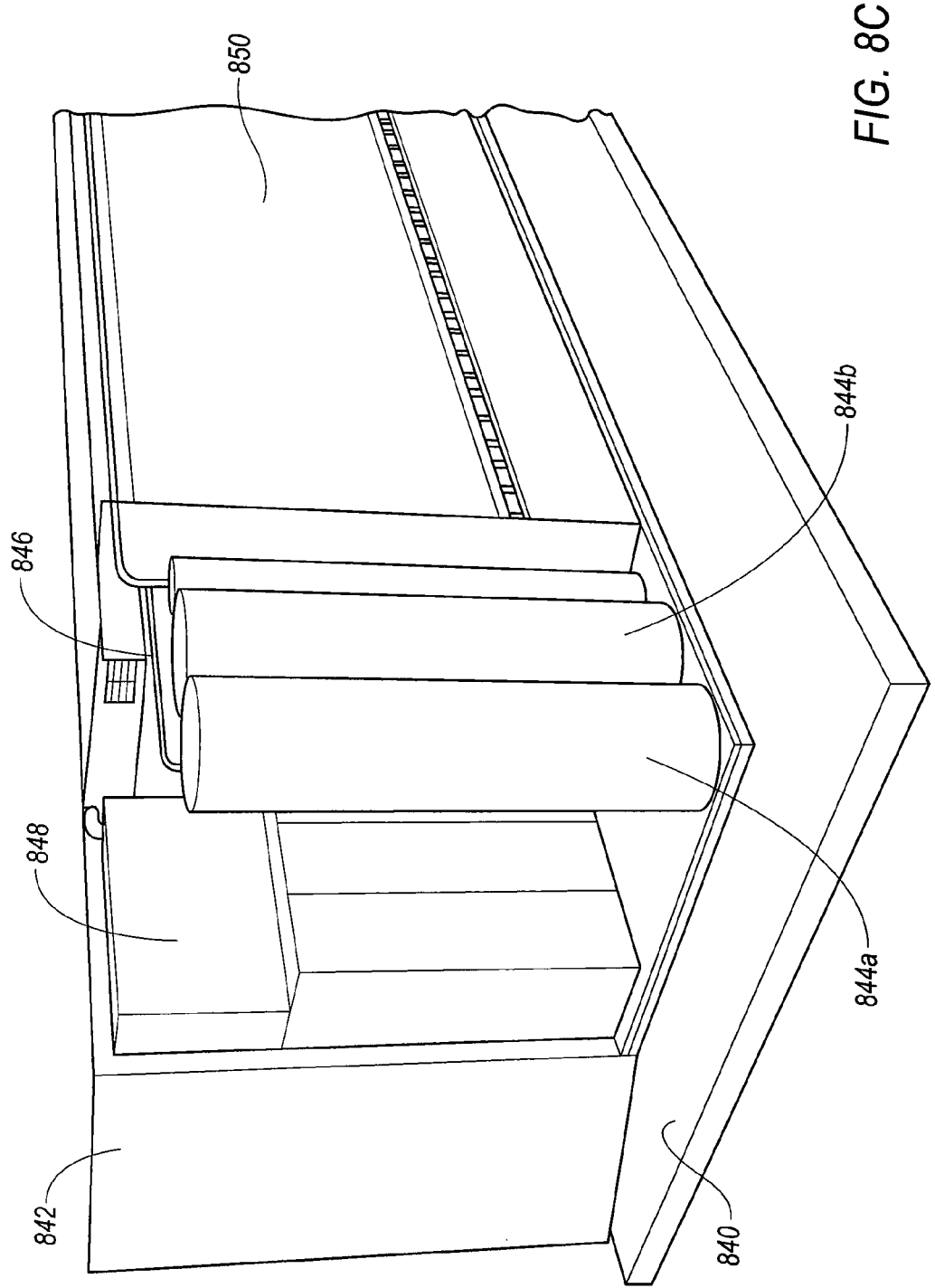
FIG. 8C shows a number of battery modules assembled in a battery system with recirculation tanks, inverters, or other power control equipment.

FIG. 8C shows a plurality of battery modules in a battery system. In some embodiments, a battery system may include a housing which may include a floor 840 or base or one or more walls 842 or coverings. As previously mentioned, in some embodiments, a housing may be a standard container, such as a shipping container.

A battery system may include an electrolyte management system. In some embodiments, an electrolyte management system may include one or more tanks 844a, 844b that may assist with circulation of electrolyte within the system or a reserve or supply of water to ensure consistent electrolyte mix when evaporation occurs. These tanks may assist either with filtering electrolyte within the system or assist in providing additives to the electrolyte within the system. In some embodiments, one or more pumps, valves, or pressure differentials such as a positive pressure source, or negative pressure source may be used within the electrolyte system, thereby assisting electrolyte circulation. In some embodiments, the tank may have an inlet and/or outlet from the system. The inlet and/or outlet may be used to remove waste or filtered material, provide additives, vent gases or excess fluid, or provide fresh fluid into the system. In some embodiments, one or more electrolyte conducting members 846 may be provided within the battery system. The electrolyte conducting member may be a pipe, channel, or any other assembly capable of transporting fluid from tank to upper tanks of stacks directly or via a manifold. The electrolyte conducting members may transfer electrolyte from a tank 844a, 844b to one or more modules 850. In some embodiments, electrolyte may be transferred to an upper tray or tank of the module. In some embodiments, electrolyte conducting members may be used to transfer electrolyte from a module to a tank 844a, 844b. The electrolyte conducting member may transfer electrolyte from a bottom tray or tank of a module to a tank 844a, 844b.

The battery system may include an air flow assembly. The air flow assembly may cause air to be circulated within the battery system. In some embodiments, the air flow assembly may cause air to flow within the modules. In some embodiments, the air flow assembly may cause air to flow in air tunnels between the cells. In some embodiments, one or more air tunnels may be provided between each layer of a stack. In some embodiments, the air flow tunnels may be horizontally oriented. In some embodiments, air flow tunnels may be substantially horizontally oriented and/or may have a slight tilt (e.g., 1 to 5 degrees). An air flow assembly may include a fan, pump, pressure differential such as a positive pressure source or negative pressure source, or any other assembly that may cause air to flow. In some embodiments, an air flow assembly may cause air to flow within tunnels of one or more modules. In some embodiments, air may flow between tunnels of different modules. Cells may be configured so that air tunnels may be continuously formed between adjacent cells and/or adjacent modules. In other embodiments, breaks in the tunnel may occur between cells and/or between modules.

In some embodiments, the battery system may also include one or more inverter banks 848. The inverter bank may convert DC to AC power.

Figure 8D:
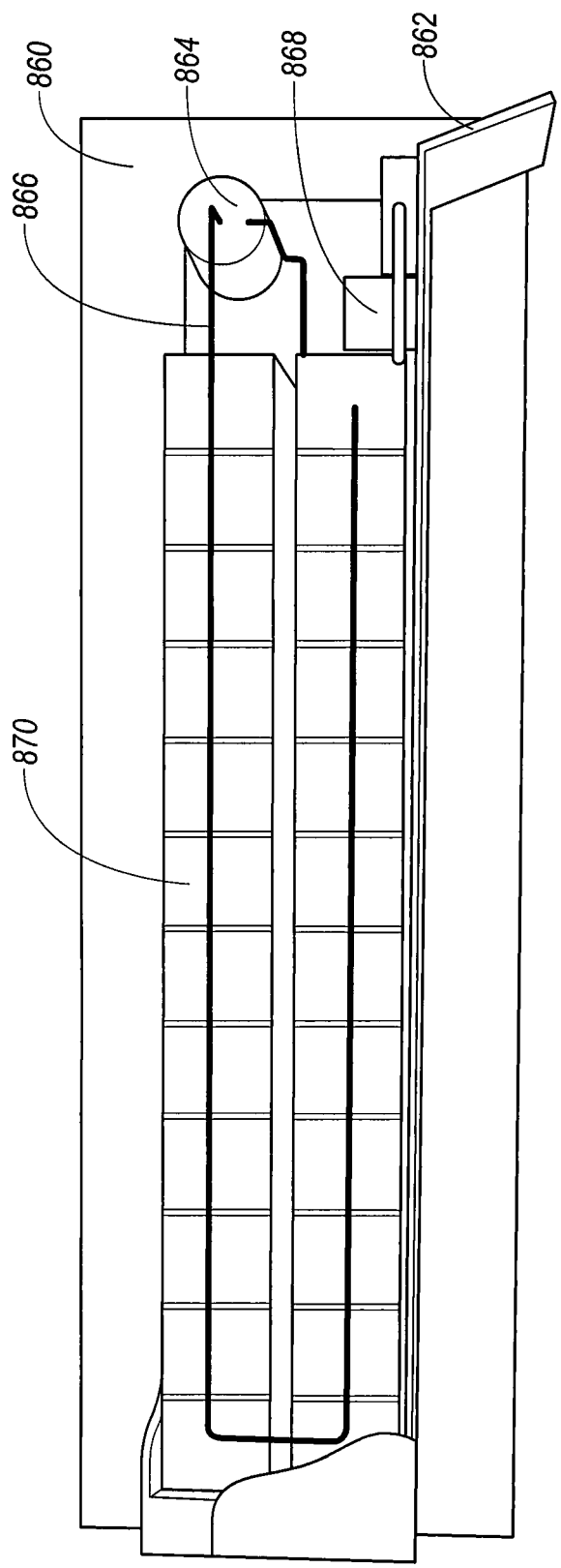
FIG. 8D shows a top view of a battery system including a plurality of battery modules within a container.

FIG. 8D shows a top view of a battery system including a plurality of battery modules. As previously described, a housing may be provided for the battery system. The housing may include a floor 860 and/or a covering or door 862 which may include walls or ceiling. One or more tanks 864 or electrolyte conducting member 866 such as a pipe may be provided. The electrolyte conducting member may fluidly connect the tank with one or more modules 870. In some embodiments, each module may be directly fluidly connected to the tank via the electrolyte conducting member. In some other embodiments, one or more modules may be indirectly connected to the tank via other modules. In some embodiments, an electrolyte conducting member may be connected to one or more modules at the top of the module. The electrolyte conducting member may be configured to provide electrolyte to a top tray of one or more modules.

Any number of modules 870 may be provided within a battery system. For example, one, two, three, four, five, six, seven, eight, nine, ten, eleven, twelve, thirteen, fourteen, fifteen, sixteen, seventeen, eighteen, nineteen, twenty, twenty-on, twenty-two, twenty-three, twenty-four, twenty-five, twenty-six, twenty-seven, twenty-eight, twenty-nine, thirty, or more modules may be provided within a battery system. In some embodiments, a battery system may be a 1 MW, 6 hour energy storage container. In other embodiments, the battery system may be a 100 kW, 200 kW, 300 kW, 500 kW, 700 kW, 1 MW, 2 MW, 3 MW, 5 MW, 7 MW, 10 MW, 15 MW, 20 MW, 30 MW or more system. In some embodiments, the battery system may be a 1 hour, 2 hour, 3 hour, 4 hour, 5 hour, 6 hour, 7 hour, 8 hour, 9 hour, 10 hour, 11 hour, 12 hour, 13 hour, 14 hour, 15 hour or more system.

In some embodiments, for a standard module, one or more of the following characteristics may apply: the system may have features such as 500 k-2 MW, 2-12 MWH, and it is anticipated that the system would have a low cost. Such features are provided by way of example only. It is not intended to limit this invention.

The modules may have any configuration within the battery system. For example, one or more rows and/or columns of modules may be provided. In some embodiments, an array of modules may be provided. For example, two rows of 12 modules each may be provided.

In some embodiments, an electrolyte conducting member may be a pipe that may pass over each module. In some embodiments, the pipe may fluidly communicate with each module at the top of the module. The pipe may transfer electrolyte to the upper tray of each module. In some embodiments, the pipe may pass as a straight pipe over a first row of modules, then may bend and turn around and pass as a straight pipe over a second row of modules. Alternatively, the pipe may have any other bending or zig-zagging configuration.

In some embodiments, the battery system may also include one or more inverter banks 868. The inverter bank may convert DC to AC power.

Figure 8E:
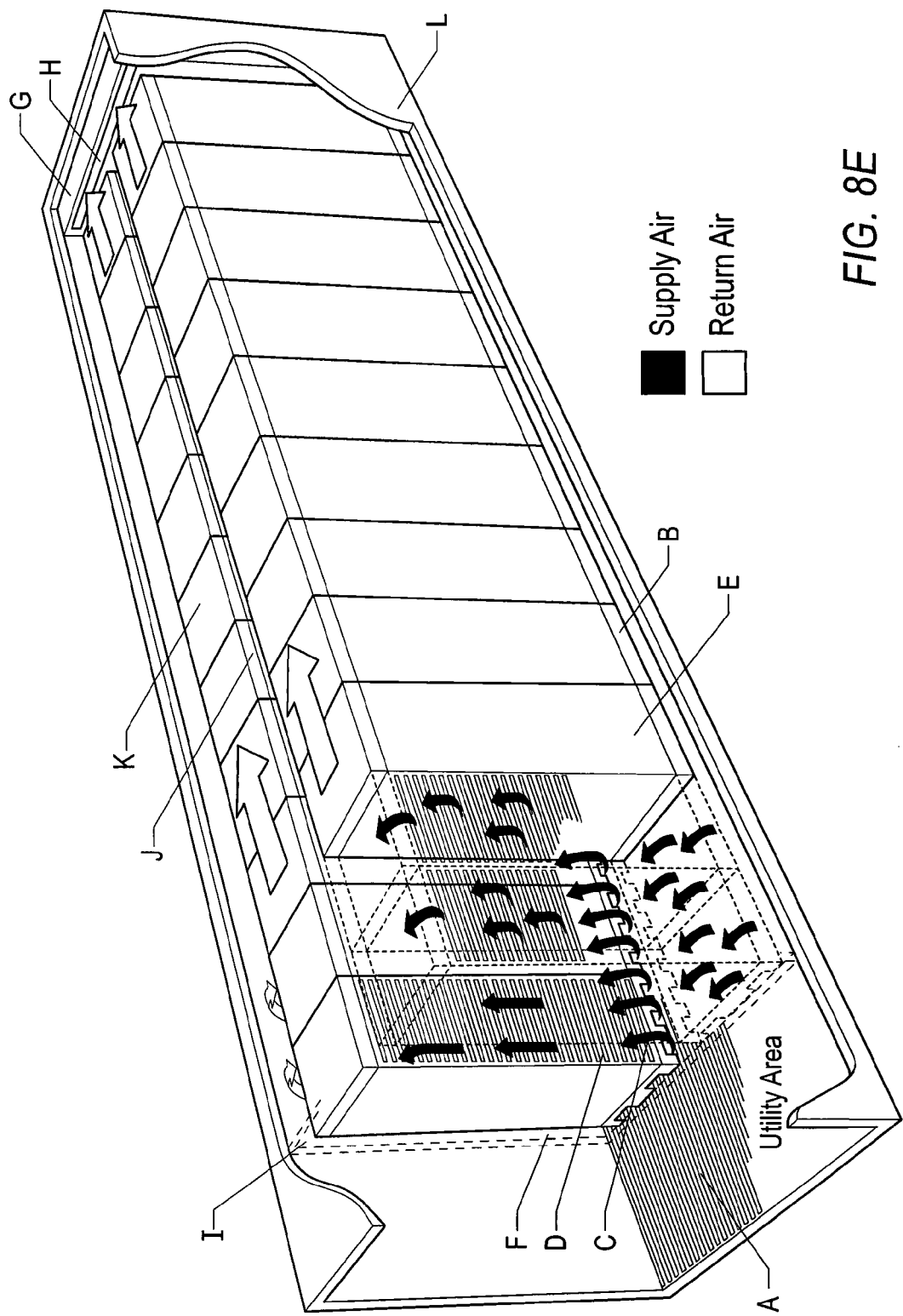
FIG. 8E provides one an example of an air flow assembly.

FIG. 8E shows an example of a battery system including an air flow assembly. A battery assembly may have a container with a front end and a back end. In some embodiments, the container may be thermally insulated and/or electrically insulated. In some embodiments, the container may be a standard container, such as those previously described, or a reefer container. In some embodiments, the container may be about 40 feet long.

One or more modules may be contained within the container. In some embodiments, up to 36 modules may be provided within the container. The modules may be laid out in the container so that two rows of modules are provided, each row having 12 modules. Thus, a battery system may have an arrangement that is 12 modules deep and 2 modules wide. In some embodiments, 1800 quad cells may be provided per module. A module may be 120 cells high (e.g., having 120 layers or levels) and may have 15 quad cells per layer or level. In some embodiments, a battery system may have a total of about 50,000 quad cells.

FIG. 8E provides an example of an air flow assembly. An air flow assembly may be provided within a container. The floor of the container A may include t-bars, grooves, channels, protrusions, ridges, or other shapes. A lower air flow manifold B may be provided or T-flooring may be utilized in some reefer containers. In some embodiments, air in the lower manifold may flow laterally. In some embodiments, air may flow toward a center aisle C of the air flow assembly. In some embodiments, air may rise in the center aisle. One or more air tunnels D may be provided for one or more modules. The air tunnel may have a horizontal orientation. The air tunnels may be provided as part of centrodes of cells. Air may flow from the center aisle, into one or more air tunnels which channel air laterally between cells.

From an air tunnel D, air may laterally flow to a peripheral aisle E. One or more peripheral aisles may be provided. In some embodiments, two peripheral aisles E, F may be provided. Air may rise along the peripheral aisles. A peripheral aisle may be provided between a module K and a container wall I. In some fan or air circulation or expulsion system embodiments, an upper air manifold H may be provided with an upper air manifold casing G. The upper air manifold may receive air from the peripheral aisles. In some embodiments, a blocker J may be provided to prevent air from rising from the central aisle directly into the upper air manifold. This may force some of the air to flow to the air tunnels. In alternate embodiments, some air may rise from the central aisle into the upper manifold. In some embodiments, air may flow lengthwise along the upper air manifold. For example, air may flow from a side of the container with the utility area to the other end of the container.

FIG. 8F provides an additional view of an air flow assembly. An air flow assembly may be provided within a container. The floor of the container A may include t-bars, grooves, channels, protrusions, ridges, or other shapes. Air may flow along the spaces provided on the floor between the floor features. A lower air flow passage or tunnel B may be provided. In some embodiments, air in the lower passage may flow laterally. In some embodiments, air may flow toward a center aisle C of the air flow assembly. In some embodiments, air may rise in the center aisle. One or more air tunnels D may be provided for one or more modules. The air tunnel may have a horizontal orientation. The air tunnels may be provided as part of centrodes of cells. Air may flow from the center aisle, into one or more air tunnels which channels air laterally between cells.

From an air tunnel D, air may laterally flow to a peripheral aisle E. One or more peripheral aisles may be provided. In some embodiments, two peripheral aisles may be provided. Air may rise along the peripheral aisles. A peripheral aisle may be provided between a module and a container wall I. In some embodiments, an upper air manifold J may be provided with an upper air manifold casing. The upper air manifold may receive air from the peripheral aisles. In some embodiments, a blocker H may be provided to prevent air from rising from the central aisle directly into the upper air manifold. This may force some of the air to flow to the air tunnels. In alternate embodiments, some air may rise from the central aisle into the upper manifold. In some embodiments, air may flow lengthwise along the upper air manifold. For example, air may flow from a side of the container with the utility area to the other end of the container.

An upper electrolyte supply tank G may be provided as part of a module. A lower electrolyte receiving tank F may also be provided as part of the module. In some embodiments, the container I may rest on a surface K.

In some embodiments, supply air may be air provided through the floor and lower manifold. The supply air may then rise through the center aisle and flow through the air tunnels. Return air may right through the peripheral aisles and flow through the upper manifold. In alternate embodiments of the invention, air may flow in other directions (e.g., may be supplied from the upper manifold and may flow through air tunnels in opposite directions.

Figure 8G:
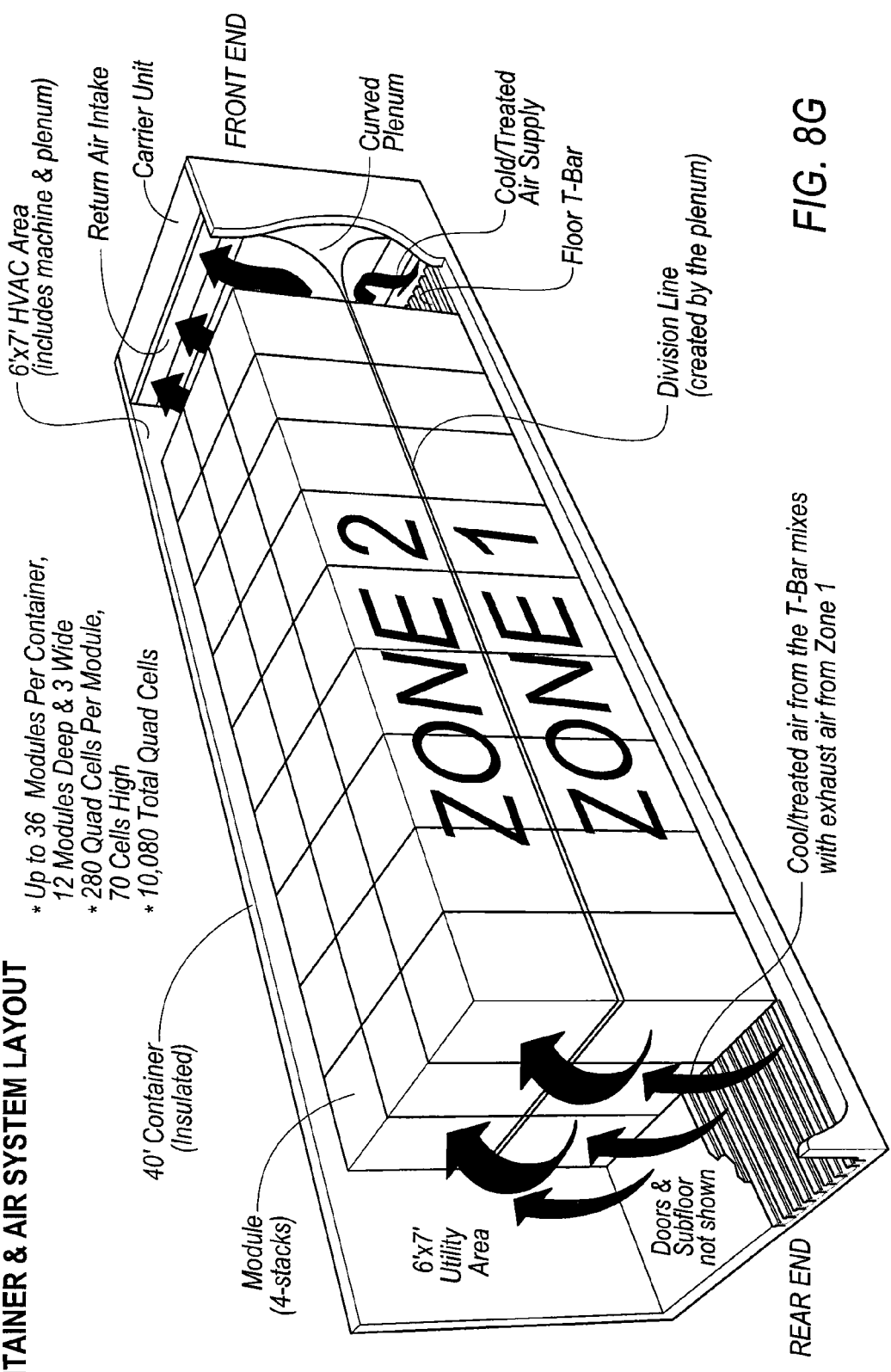
FIG. 8G provides an alternative example of an air flow assembly.

FIG. 8G shows an alternate example of an air flow configuration. In some embodiments, air may flow lengthwise along the container and need not be split up laterally. The air may or may not be circulated back lengthwise along the container.

In some embodiments, the modules may be placed on the floor of the container. In some embodiments, the floor of the container may have a floor T-bar. In some embodiments, the floor may have one or more grooves, channels, slots, protrusions, or ridges, which may support the modules while providing space below the modules. In some embodiments, air may flow within the space beneath the modules. This may help with temperature regulation.

In some embodiments, a utility area may be provided within the container and adjacent to the modules. For example, modules may be positioned within a container to provide a 6 by 7 feet utility area. In some embodiments, a user may be able to access the utility area. The user may be able to enter the container in the utility area. In some embodiments, the utility area may be provided at the rear end of the container.

In some embodiments, a plenum may be provided within a container. The plenum may protrude from a wall of the container at the front end. The plenum may be curved and may meet a module about halfway up. In some embodiments, an air supply may be provided at one portion of the plenum, and an air intake may be provided at the other portion of the plenum. For example, an air supply may be provided at the underside of the plenum, and an air intake may be provided at an upper portion of the plenum, or vice versa. In some embodiments, the air supply may include cold, treated air. The air supply may flow in a first horizontal direction through the modules provided on the supply side of the plenum. For example, if the air supply is provided on the underside of the plenum, the air may flow in the first direction horizontally through the lower half of the modules. The air may flow through one or more air tunnels of the modules.

When air reaches the utility area at the other end of the container, the air may travel to the other portion of the modules. For example, the air may rise to the top half of the modules and flow in a second direction back toward the upper part of the plenum. In some embodiments, the second direction may be horizontal and/or may be opposite the first direction. The air may reach the return air intake at the upper portion of the plenum. The plenum may be provided at a front end of the container. Alternatively, the air need not circulate back and may be accepted by an intake at the utility area side of the container. The utility area side of the container may or may not provide a second air supply that may flow back to the first air supply. A carrier unit may also be provided at the front end of the container. The carrier unit may accept the air intake and may cool it, may vary and/or maintain the temperature of the air, may filter the air, and/or may vary or maintain the composition of the air.

XIII. Balance of Plant Configurations

A. Electrolyte Circulation and Treatment Systems

As previously described and shown in FIG. 4A, an electrolyte circulation and treatment system may be provided, consisting of several components. In some embodiments, a separate balance of plant (air and water/electrolyte management system) may be provided. The electrolyte circulation and treatment system may include one or more of the following:

a) A device to deionize and/or filter any water before entering the system.
b) A chemical tank to introduce and mix various salts and other chemicals with deionized water. This may form a portion of the electrolyte.
c) A tank or series of tanks that measures and treats battery electrolyte.
d) A pump or series of pumps that distributes electrolyte throughout the battery system.
e) Various sensors that measure and monitor total electrolyte volume, temperature, pH levels and other measures of the operation of the system.
f) Supply and return lines that distribute liquid electrolyte to and from the battery.
g) Various sensors and valves to control flow of liquid electrolyte and to control electrical connections from a control box.

Figure 8H:
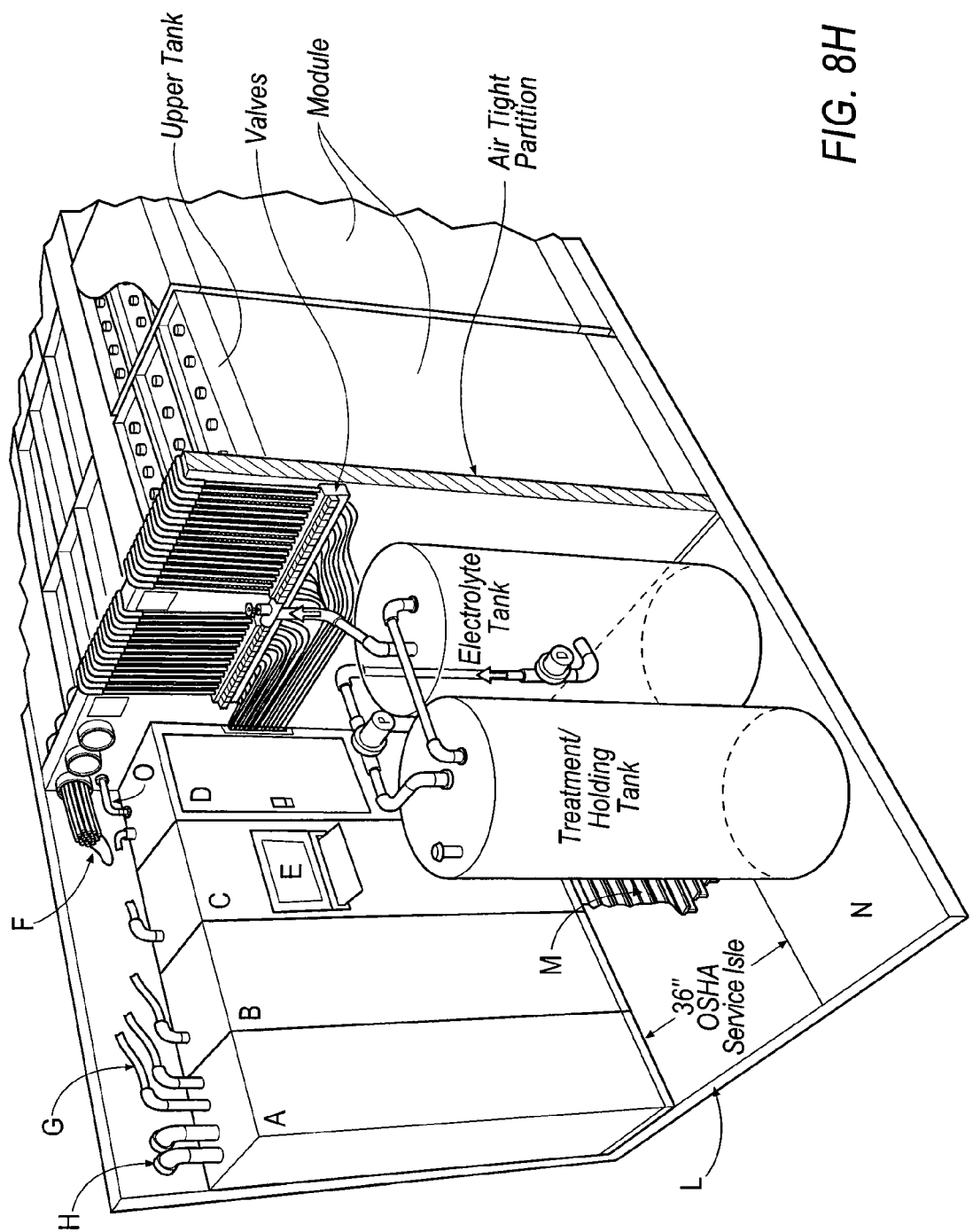
FIG. 8H provides one example of a battery system within a container.

FIG. 8H provides an example of a battery system within a container. One or more tank (e.g., treatment/holding tank, electrolyte tank) may be provided and may be connected to one or more modules via fluid connectors and valves. For example, electrolyte may be provided through a manifold, and then individually divided into separate fluid connectors that transfer the electrolyte to each of the modules within the system. For example, each upper tank of a module within the system may be in fluid communication with the manifold and may receive fluid therefrom. In some embodiments, one or more user interface may be provided.

In some embodiments, an air tight partition may be provided between the modules and the rest of the container. For example a service or utility area may be provided that an operator or other user may access. For example, a service aisle may be provided where an operator or other user can enter. In some embodiments, the service or utility area may include the tanks, user interface, or electronic controls. In one example, the air tight partition may separate the service or utility area from the modules.

B. Air Circulation and Conditioning Systems

FIG. 8A shows an example of an insulated cargo container and HVAC machine utilization in accordance with an embodiment of the invention. An energy storage system may include an air circulation and conditioning system consisting of several components. FIG. 8E provides an example of an air circulation system.

A series of airflow plenums may be provided to control and distribute the flow of air evenly between cells. Forced air cooling may be more effective than convection especially when coupled with good internal heat sinks and plenum style enclosure designs. Heated air may be removed from equipment enclosures by fans or blowers which may also draw cooler air into the enclosure through vents. Depending on cooling requirements, low to high volumes of air can be moved through the enclosure.

In some embodiments, one or more temperature sensors may be provided. Based on the temperature detected by the temperature sensor, the fans or blowers may be varied and/or maintained to control the rate of air flow. A fan system may be provided that forces air through the battery.

The system may include a fresh air make-up and filtration system to introduce oxygen, while filtering unwanted contaminants. In some embodiments, it may be desirable to have higher oxygen content than ambient air.

An HVAC system may be provided that measures and controls air temperature inside the battery housing.

The system may also include a humidity control system that humidifies or dehumidifies air within the battery housing. One or more humidity sensors may be provided. The humidity control system may vary and/or maintain the humidity of the air based on measurements from the humidity sensors.

In some embodiments, a series of sensors may be provided that communicate with various other systems.

C. Electrical Connectivity and Management

An electrical system may be provided that facilitates flow of power within the battery, and distributes power between the battery and the electrical grid or other power source. In some embodiments, the electrical system may determine whether to provide a flow of power between the battery and the electrical grid or other power source or sink. The electrical system may determine the direction and/or amount of power flow between the battery and the power source or sink.

D. Measurement and Control Systems

A centralized measurement system may be comprised of various sensors that are linked to a computerized control system. In some embodiments, the computerized control system may include one or more processors and memory.

The computerized control system may collect the measurements gathered from the various sensors. The computerized control system may perform one or more calculations based on the measurements. Any algorithm, calculation, or other steps may be implemented using tangible computer readable media, which may include code, logic, instructions for performing such steps. Such computer readable media may be stored in memory. One or more processors may access such memory and implement the steps therein.

A computerized control system may be linked to various other mechanical systems. In some embodiments, the computerized control system may instruct one or more mechanical systems to perform an action. For example, the computerized control system may instruct a pump to pump a greater volume of electrolyte into a top tray. The computerized control system may instruct one or more valves, which may affect the distribution of the electrolyte between the plurality of modules. In another example, the computerized control system may cause a fan to blow at a slower rate. In some embodiments, the computerized control system may issue one or more instructions based on measurements received from one or more sensors. Any instructions may be provided by a controller via a wired connection or wirelessly.

A computerized control system may be linked to a phone and/or cellular communication networks. In some embodiments, the computerized control system may include a processing device, such as a computer. Any discussion of a processing device, or any specific type of processing device may include, but is not limited to, a personal computer, server computer, or laptop computer; personal digital assistants (PDAs) such as a Palm-based device or Windows device; phones such as cellular phones or location-aware portable phones (such as GPS); a roaming device, such as a network-connected roaming device; a wireless device such as a wireless email device or other device capable of communicating wireless with a computer network; or any other type of network device that may communicate over a network and handle electronic transactions. In some embodiments, the computerized control system may include multiple devices. In some instances, the computerized control system may include a client-server architecture. In some embodiments, processing devices may be specially programmed to perform one or more steps or calculations or perform any algorithm. A computerized control system may communicate over any network, including but not limited to, cellular communication networks, other telephone networks, a local area network (LAN), or a wide area network (such as the Internet). Any communications may be provided through a wired connection and/or a wireless connection.

In some embodiments, a user may interact with the computerized control system. The user may be remote to the computerized control system, and may communicate with the computerized control system over a network. Alternatively, the user may be connected locally at a user interface of the computerized control system.

E. Environmental Installation and Housing Configurations

Generally, modular batteries and its systems are not limited by size, volume or scale. Common industrial cabinets, containers, buildings and other structures can be configured to house the battery and its systems.

The battery and its support systems can be configured for mobile and stationary configurations. For example, the battery and its support systems could be provided in buildings, shipping containers, vessels and automobiles for example.

XIV. Fuel Cell Configuration

In accordance with some embodiments of the invention, the energy storage system described elsewhere may be utilized in a fuel cell configuration. In a fuel cell configuration, each cell may be supported by a supply inlet and drain outlet valves for transfer or transfusion of electrolyte. In some embodiments, it may utilize the electrolyte transfer system of a gravity-based flow battery. For example, a supply inlet may be provided above a cell and a drain outlet may be provided below the cell. In other embodiments, groups of cells (such as quads or layers) may be supported by a supply inlet and drain outlet.

A fuel cell configuration may provide mechanisms that remove depleted electrolyte and add fresh electrolyte via a remote and convenient transfer or transfusion port.

XV. Market Adoption & Adaptation Scenarios

An energy storage system, which may include embodiments discussed elsewhere herein, may be advantageously used with green power generators. Examples of green power generators may include wind farms, solar farms, or tidal farms. An energy storage system may also be used with traditional power generators, such as fossil fuel steam generators or nuclear generators. In some embodiments, an energy storage system may store energy from a generator. In other embodiments, it may be able to supplement or shift the energy produced by a generator.

An energy storage system may be used in power distribution. For example, it may be used with regional electrical utilities, local electrical utilities, remote storage, and mobile storage.

An energy storage system may also have applications in power storage, management and back-up. For example, the energy storage may be used for governmental and military applications, commercial & industrial applications, community & institutional applications, residential & personal applications (fuel cell or battery). In some embodiments, excess energy may be stored in an energy storage system and used when needed. The energy storage system may be energy-dense to be located at suburban substations or urban basements.

Transportation applications may be provided for the energy storage system. For example, the energy storage system may be used to power locomotive & rail. The energy storage system may also be used for cargo shipping (on land or water). The energy storage system may also be used for mass transit & busing. For instance, the energy storage system may be provided as a fuel cell or battery on the mass transit vehicle. Similarly, the energy storage system may have automotive applications, and may be provided as a fuel cell or battery for an automotive vehicle. Preferably, the energy storage system on a vehicle may be rechargeable.

XVI. Flattened, Four Sided Pyramid Cell Design Compensates for Changing Electrolyte Volumes In rechargeable zinc air cells, electrolyte volumes typically do not remain constant.

During cell discharge, as zinc metal (with relatively high density) is converted to lower density zinc species, electrolyte volumes may increase. During cell charge, the reverse reaction occurs and electrolyte volumes may decrease. Electrolyte volumes may also decrease due to water evaporation.

These changes in electrolyte volumes may adversely affect cell performance. If electrolyte volumes become too low, there may be insufficient conducting electrolyte between metal electrode and air contacting electrode. This may cause an increase in cell resistance which in turn could adversely affect cell performance. Similarly, if electrolyte volumes increase too much, excess electrolyte may be forced into pores of the air contacting electrode. Electrolyte penetrating and flooding air contacting electrode pores prevents oxygen gas from readily diffusing (and becoming electrochemically reduced) inside the pores. Additionally, the increased electrolyte volume applies pressure on the air contacting electrode and could cause mechanical deterioration of the electrode. This causes cell performance to deteriorate.

Controlling these constantly changing electrolyte volumes in an operating full battery stack may be accomplished by having a feedback mechanism that may automatically compensate for changes in electrolyte volumes. When additional electrolyte is needed by cells (for example, during cell charging when electrolyte levels decrease) electrolyte may be allowed to slowly drip from a reservoir into individual cells. During cell discharge, as electrolyte volumes expand, excess electrolyte within cells may be diverted via an overflow port to a reservoir for storage.

Previously described embodiments may include a four-cell, horizontal design that incorporates a fill port and exit port located at the junction where four horizontally positioned cells meet. This hollow fill/exit port may allow electrolyte to drip into and out of individual cells as needed. As a number of these four-cell assemblies are stacked on top of each other, the fill/exit port of the upper four-cell assembly may be positioned exactly above the lower four-cell assembly. This way, a number of vertically stacked four-cell assemblies may share a common fill/exit port that is connected to a common reservoir.

Another horizontal four cell design may be provided in accordance with another embodiment of the invention. The horizontal design may involve assembling a four cell assembly so that each cell in this assembly is slightly sloping (tilted) upwards (on one side only) towards the fill/exit port. This may physically compensate for gas evolution by allowing gas to more readily escape.

Figure 10:
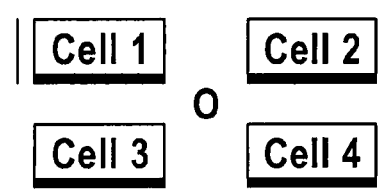
FIG. 10 provides a top view of four planar cells in a horizontal assembly positioned to share a common fill port and exit port. These four, adjacently positioned, cells in a horizontal assembly may be referred to as a "quad".

FIG. 10 illustrates the top view (looking down) on four cells (Cell 1, Cell 2, Cell 3, Cell 4) in a horizontal assembly. The cells may be positioned so that they share a common fill and exit port (indicated by 0). The corner of each individual cell is slightly tilted upwards towards the 0. Thus, the corner of each individual cell furthest from the 0 may be tilted downward.

Another way to visualize this design would be to imagine four individual cells positioned as a four sided pyramid (the top of the pyramid would be the point where all four cells meet) but instead of a sharp upwards incline as in a typical pyramid, this pyramid was flattened until tilt angles were only 1-5 degrees from horizontal. The tilt angle of each individual cell in the four-cell assembly may have any value, including, but limited to, 0.25 degrees or less, 0.5 degrees or less, 0.75 degrees or less, 1 degrees or less, 2 degrees or less, 3 degrees, or less 4 degrees or less, 5 degrees or less, 6 degrees or less, 7 degrees or less, or degrees or less. Preferably, each cell may be tilted at the same angle, while in other embodiments, individual cells may be tilted at various angles. This flattened, four-sided pyramid design is intended to help electrolyte management and gas evolution during discharge/charge cycles.

Figure 11A:
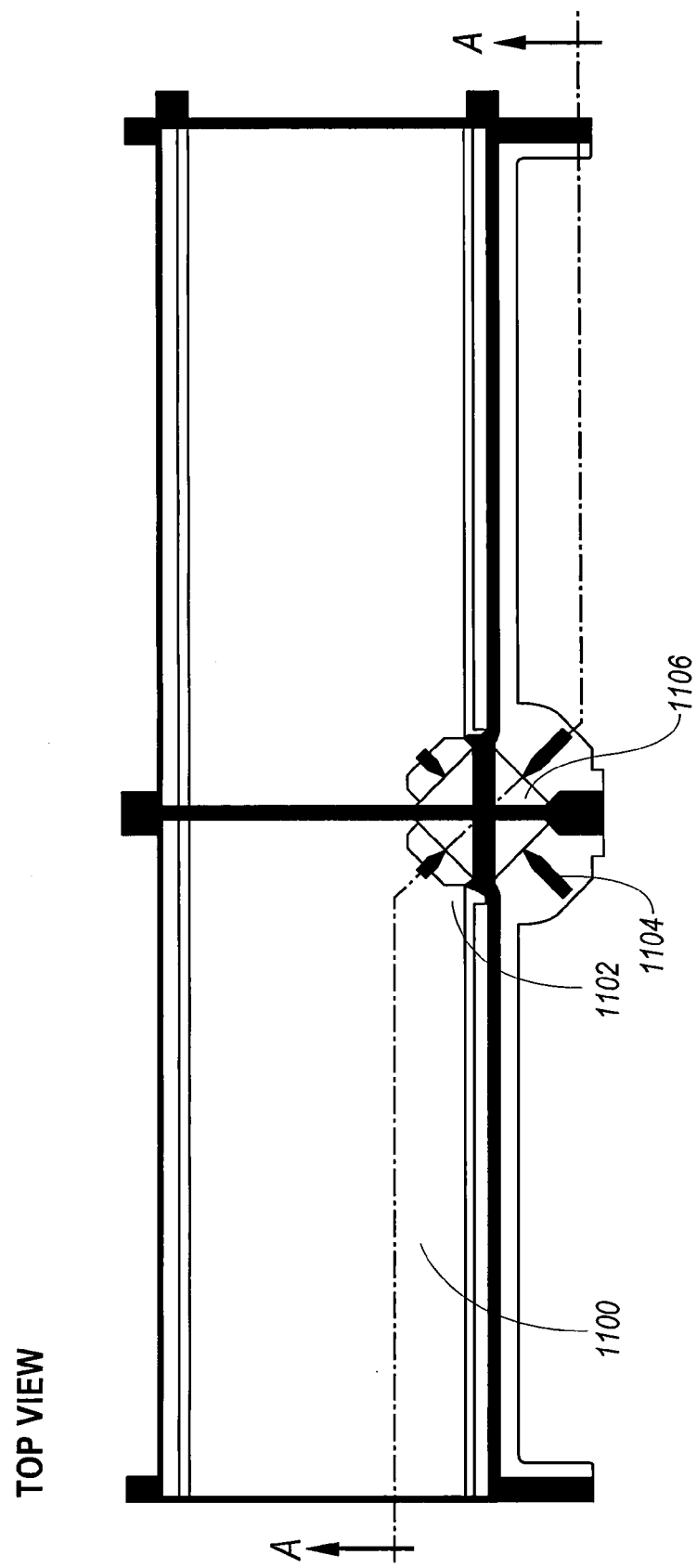
FIG. 11A shows a top view of an energy storage system with a common, shared, fill and overflow port among cells in accordance with an embodiment of the invention.
Figure 11B:
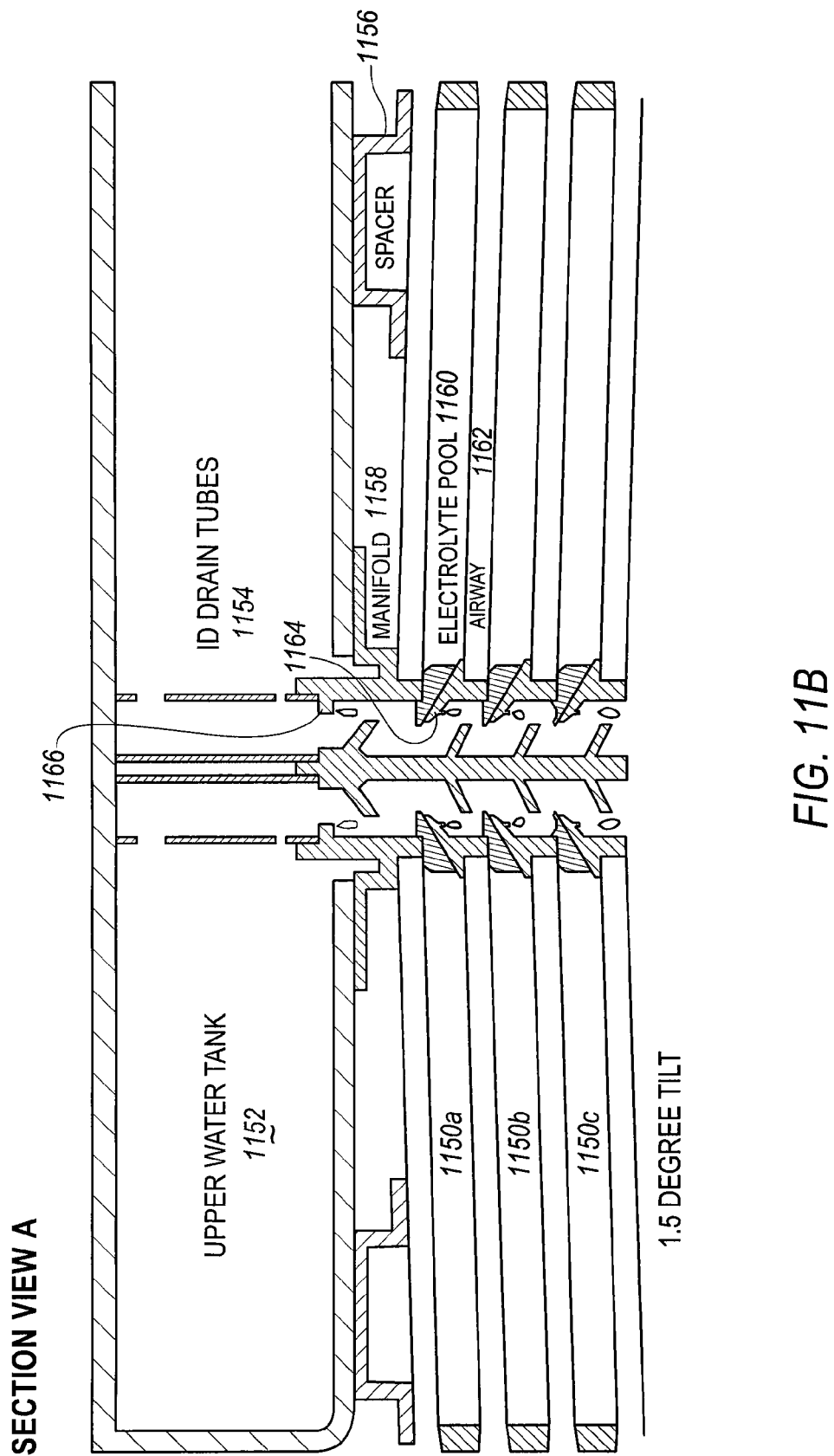
FIG. 11B shows a side view or cross section of an energy storage system from FIG. 11A. Here, each four cell quad may be slightly angled upwards to more easily allow any generated gases to "burp" and be readily released. Gravity assists the flowing of water or electrolyte liquid from the water supply or electrolyte tank situated above the cells to individual cells situated below.

This is shown in the side view of FIG. 11B. Here, each of the cells 1150*a*, 1150*b*, 1150*c* in a stack assembly may be slightly tilted upwards from horizontal towards the fill port. In some embodiments, about a 1.5 degree tilt may be provided. An upper water tank 1152 may have one or more drain tubes 1154. The drain tubes may allow a controlled amount of electrolyte to flow from the upper water tank to the cells below. In some embodiments, ¾" ID drain tubes may be provided.

The design may include one or more spacers 1156 within a manifold 1158. This manifold may provide a gap between the upper water tank and underlying cells. In some embodiments, a spacer may help sustain the gap between the upper water tank and individual cells. In some embodiments, the spacer may provide support between the cells and the upper water tank.

One or more flow control features 1166 may control the flow rate of electrolyte being provided from an upper water tank to underlying cells. In some embodiments, the flow control feature may protrude or may be vertically aligned. The flow control feature may break up electrolyte into small drops. In some embodiments, the flow control feature may keep an electrical connection from being formed between the electrolyte in the upper water tank and electrolyte in any one individual underlying cell. A drop from a flow control feature may be caught by an underlying cell. In some embodiments, underlying cells may have a port with an overflow portion. The flow control features may be vertically aligned over the overflow portion. The ports of the vertically aligned cells may also be vertically aligned. In some embodiments, the drop may flow into the electrolyte pool 1160 of the cell. Electrolyte from an upper cell may flow to an underlying cell. In some embodiments, each cell may have a cell flow control feature 1164 which may also control the flow of electrolyte being provided to underlying cells. The cell flow control feature may break the electrolyte into drops and prevent an electrical connection from being formed between the electrolyte in the cell and electrolyte in the underlying cell. In some embodiments, the flow control features may be in substantial vertical alignment with the flow control features of the cells above and/or below. Alternatively, they may have a staggered or other alignment. One or more airways 1162 may be provided between cells.

As previously discussed, individual cells may be tilted so that the portion of a cell receiving electrolyte may be tilted upwards. Electrolyte may flow from portion of the cell receiving the electrolyte towards the other end of the cell.

A slightly tilted cell orientation has a number of distinct advantages when cells are assembled into a stack. A first advantage is that a constant and reproducible cell resistance is still maintained between metal electrode and air contacting electrode. This helps keep electrolyte resistance under tight control.

A second advantage involves managing gas bubble formation. During cell charge cycles, as water is being reduced, oxygen gas bubbles are necessarily generated. This tilted electrode design may allow these generated gas bubbles to easily migrate towards the upper portion of the electrode—near the electrode corner where they may then be safely vented. Having gas bubbles readily migrate to one side eliminates a potential problem of increased electrolyte resistance due to trapped gas bubbles in the electrolyte. A tilted design may be slightly angled to allow gas escape and facilitate slurry flow in a flow battery configuration.

A third advantage is that during charge cycles (when electrolyte is added from the reservoir to each individual cell), a tilted cell design allows added electrolyte to easily enter and fill each individual cell.

The tilt angle for each cell need not be large. It is clear that if tilt angles of individual cells were to be made too steep, any added electrolyte would flow towards the bottom of the cell and flood the lower portion of the air contacting electrodes.

A preferable tilt angle may fall within the range of only 1-5 degrees from horizontal. This may be sufficiently low so that electrolyte will not substantially gather in the bottom of each cell but any gas bubbles generated are diverted and rise towards the top opening of the assembly and can easily exit.

FIG. 11A shows a top view of an energy storage system in accordance with an embodiment of this invention. In some embodiments, the energy storage system may function like a flow through cell. Alternatively, it need not function as a flow through cell. An upper water tank may have a floor 1100. A drain tube 1102 may be provided, allowing electrolyte to flow to one or more cells below. In some embodiments, one or more flow control feature 1104 may be provided to control the flow rate of electrolyte passing to underlying cells. In some embodiments, the flow control feature may break up electrolyte into small drops. In some embodiments, a flow control feature may be provided for each underlying cell. For example, if four horizontally oriented cells (forming a planar quad) are sharing a common electrolyte management system, four flow control features may be provided. Each flow control feature may protrude over its own corresponding cell. Any number of flow control features may be provided, which may or may not correspond to the number of underlying cells in the layer directly below. For example, one, two, three, four, five, six, seven, eight, nine, ten, or more flow control features may be provided.

A quad cell may also have a central portion which may be slanted downwards toward a cell. Any electrolyte that may fall onto the central portion may flow downward and to an underlying cell. In some embodiments, the central part may be injection molded.

One or more features, characteristics, components, materials, or steps known in the art may be incorporated within the invention, and vice versa. See, e.g., U.S. Pat. Nos. 4,168,349, 4,463,067, 5,126,218, 7,582,385, 7,314,685, 5,716,726. 4,842,963, 4,038,458, 5,242,763, 5,306,579, 6,235,418, U.S. Patent Publication No. 2006/0141340, U.S. Patent Publication No. 2008/0096061, PCT Publication No. WO 2007/144357, which are hereby incorporated by reference in their entirety.

XVI. EXAMPLE

Figure 13:
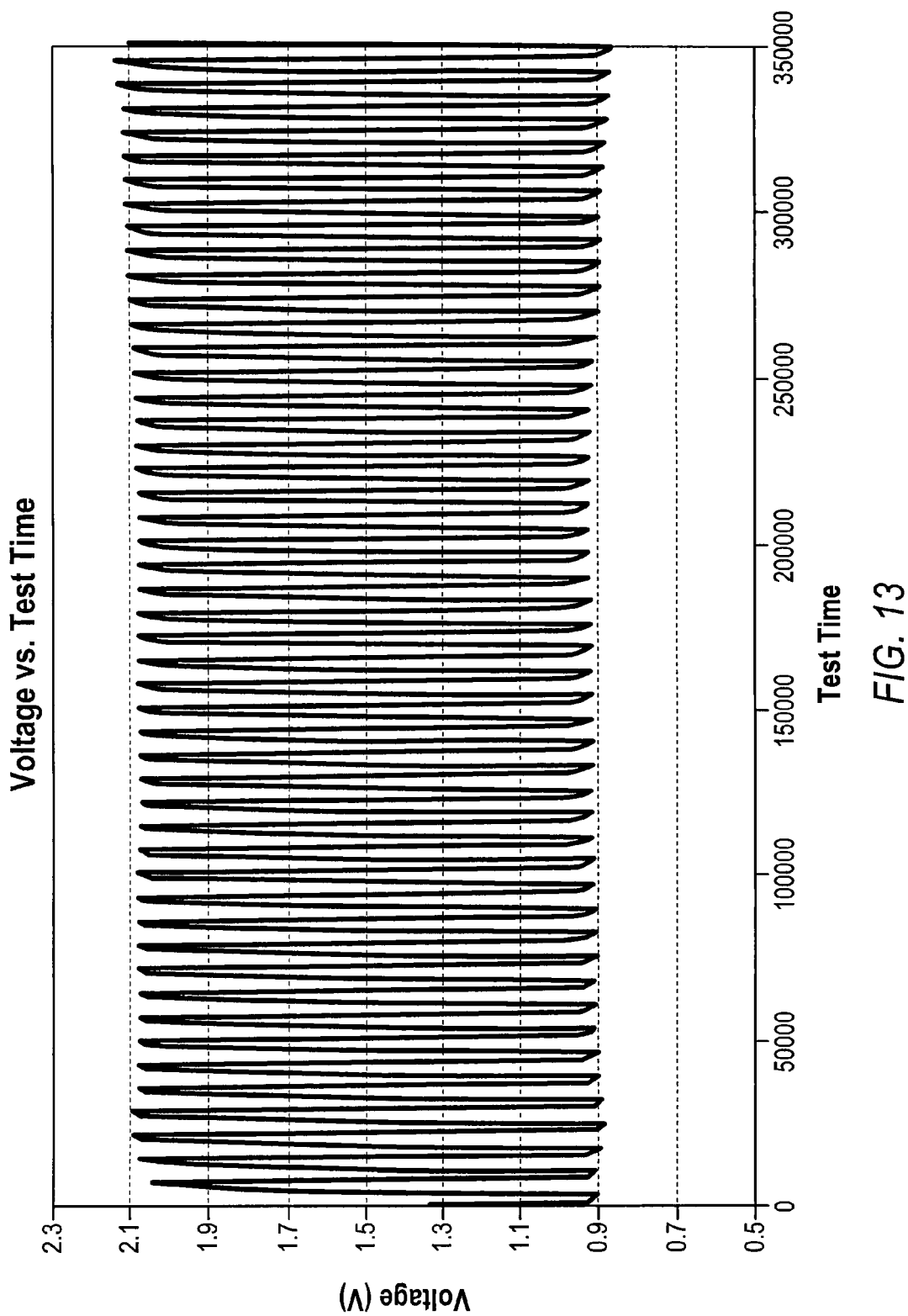
FIG. 13 shows an example of cell voltage as a function of time under test in accordance with an embodiment of the invention.

In one example, a test cell may have been provided. FIG. 13 shows an example of cell voltage over time in accordance with an embodiment of the invention. A test time of 350000 seconds was provided to demonstrate that this system operates as described.

A stable voltage range resulted with the early test cell. There was no physical degradation in the early version of the cell. For example, as shown in FIG. 13, the voltage remained relatively stable for 350000 seconds. For the most part, the voltage cycled between 0.9 and 2.1 volts.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth wherein which depend upon a variety of conditions and variables. Various modifications in form and detail of the embodiments of the invention will be apparent to persons skilled in the art. It is therefore contemplated that the invention shall also cover any such modifications, variations and equivalents.

What is claimed is:

1. An electrically rechargeable metal anode cell comprising:
   a metal electrode;
   an air contacting electrode comprising at least one current collector having a corrosion-resistant outer layer comprising titanium carbide, a conductive inner layer comprising titanium, and an air permeable hydrophobic membrane;
   an aqueous electrolyte situated between the metal electrode and the air contacting electrode; and
   a frame supporting both the metal electrode and the air contacting electrode so that the metal electrode and the air contacting electrode are situated at a fixed distance from one another to define a space in which the aqueous electrolyte is contained, the frame comprising an electrolyte management system integrally formed into the frame, the electrolyte management system comprising:
   a drain/fill port; and
   an overflow lip configured to capture and contain the aqueous electrolyte within the cell as the aqueous electrolyte overflows from one of an upper electrolyte tank or an overlying cell vertically stacked overtop the air contacting electrode of the cell,
   wherein the metal electrode directly contacts the aqueous electrolyte, and without an ionically conducting and electrically insulating material between the air contacting electrode and the aqueous electrolyte,
   wherein an overflow of the aqueous electrolyte within the cell flows over the overflow lip and into the drain/fill port, the drain/fill port allowing the overflow of aqueous electrolyte to drip to one of an electrolyte capturing tank or an underlying cell vertically stacked underneath the metal electrode of the cell.

2. The cell of claim 1, wherein the fixed distance between the metal electrode and the air contacting electrode defines a space in which aqueous electrolyte may be contained.

3. The cell of claim 2, wherein the metal electrode comprises zinc or magnesium.

4. The cell of claim 3, wherein the current collector further comprises an expanded metal, an electrically conducting screen, woven fabric, porous foam, perforated foil, a wire, a shard, a rod, wool, mesh, or any combination thereof.

5. The cell of claim 3, wherein the air contacting electrode and metal electrode are connected in a bipolar configuration.

6. The cell of claim 5, wherein the frame is at least partially formed of a polymer material or plastic.

7. The cell of claim 3, wherein the air contacting electrode is in a horizontal orientation and positioned above the metal electrode.

8. The cell of claim 3, wherein the frame includes a shelf that protrudes within the cell and that contacts the metal electrode.

9. The cell of claim 1, further comprising an auxiliary electrode configured for cell charging and associated oxygen generation that is situated between the air contacting electrode and the metal electrode, or on both sides of the metal electrode.

10. The cell of claim 3, wherein the air contacting electrode comprises a carbon material.

11. The cell of claim 10, wherein the air contacting electrode comprises one or more of the following: carbon black, acetylene black, thermal or furnace black, channel black, activated carbon, graphite, pyrolytic graphite, reticulated vitreous carbon, fluorinated carbons, or glassy carbon.

12. The cell of claim 10, wherein the air contacting electrode comprises carbon-based particles of various shapes and sizes which include one or more of the following: carbon nanotubes, functionalized nanotubes, carbon nanofibers, functionalized nanofibers, wires, flakes, films, graphene, or fullerenes.

13. The cell of claim 10, wherein the air contacting electrode comprises at least one carbon-based compound, wherein the porosity of the air contacting electrode is greater than 30%.

14. The cell of claim 10, wherein the air contacting electrode comprises at least one carbon based electrically conducting polymer.

15. The cell of claim 10, further comprising a binder that imparts the air contacting electrode with a tensile strength of greater than about 2 psi.

16. The cell of claim 3, wherein the air contacting electrode comprises at least one metal or non-metal oxide.

17. The cell of claim 16, wherein the air contacting electrode comprises one or more metal oxides that are non-stoichiometric and have the formula $M_{m-x}O_{m-y}$, wherein M represents a metal, O represents oxygen, subscript x has a value $0 < x < 1$, subscript y has a value $0 \le y \le 1$, and subscript m may have a value $1 \le m \le 5$.

18. The cell of claim 16, wherein the air contacting electrode comprises one or more metal or non-metal oxides belonging to the group selected from: $PtO_2$, $NiO_2$, $Nb_2O_5$, $MoO_3$, $ZnO_2$, $SnO_2$, $Fe_2O_3$, $W_2O_3$, $Al_2O_3$, $Bi_2O_3$, $Yb_2O_3$, $Ge_2O_3$, $B_2O_3$ or $CeO_2$.

19. The cell of claim 3, wherein the air contacting electrode comprises doped or undoped silicon.

20. The cell of claim 3, wherein the air contacting electrode comprises one or more of the following: $SiO_2$, aluminosilicate, ultra-marine, or $Al_2O_3$.

21. The cell of claim 3, wherein the air contacting electrode comprises SnS or $TiS_2$.

22. The cell of claim 3, wherein the air contacting electrode comprises a boride of one or more of the following: a metal, a non metal, or a transitional metal.

23. The cell of claim 22, wherein the air contacting electrode comprises $TiB_2$.

24. The cell of claim 3, wherein the air contacting electrode comprises one or more of the following elements: Ir, Zr, Ti, Pt, Ru, Rh, Co, Mn, V, Ce, Bi, Ag, Cu, Fe or Au.

25. The cell of claim 24, wherein the air contacting electrode comprises nanoparticles comprising one or more of the following elements: Ir, Zr, Ti, Pt, Ru, Rh, Co, Mn, V, Ce, Bi, Ag, Cu, Fe or Au.

26. The cell of claim 3, wherein the air contacting electrode comprises $TiH_2$.

27. The cell of claim 3, wherein the air contacting electrode comprises one or more of the following: $TiO_2$, $Ti_4O_7$, $Ti_5O_8$, or $Ti_5O_9$.

28. The cell of claim 27, wherein the air contacting electrode comprises nanosized particles comprising one or more of the following: $TiO_2$, $Ti_4O_7$, $Ti_5O_8$, or $Ti_5O_9$.

29. The cell of claim 3, wherein the air contacting electrode comprises one or more compounds comprising vanadium and oxygen.

30. The cell of claim 29, wherein the air contacting electrode comprises one or more of the following vanadium compounds: vanadium(II)oxide, vanadium(III)oxide, vanadium(IV) oxide, or vanadium(V)oxide.

31. The cell of claim 29, wherein the air contacting electrode comprises $V_6O_{13}$ or $V_5O_8$.

32. The cell of claim 3, wherein the air contacting electrode comprises one or more manganese compounds wherein manganese has oxidation state of 4.0 or less.

33. The cell of claim 32, wherein the air contacting electrode comprises one or more of the following: $MnO_2$, $Mn_3O_4$, $Mn_5O_8$, or $MnO_x$ where the subscript x is in the range of $1.10 \le x \le 2.01$.

34. The cell of claim 3, wherein the air contacting electrode comprises one or more of the following: $IrO_2$, $RuO_2$, $V_2O_5$, $CeO_2$, or $RhO_2$.

35. The cell of claim 34, wherein the air contacting electrode comprises nanoparticle sized metal oxides including one or more of the following: $IrO_2$, $RuO_2$, $V_2O_5$, $CeO_2$, or $RhO_2$.

36. The cell of claim 3, wherein the air contacting electrode comprises metal alloys, or combinations of metals and metal alloys.

37. The cell of claim 3, wherein the air contacting electrode comprises intermetallic mixed metals.

38. The cell of claim 37, wherein the air contacting electrode comprises one or more of the following: Ag—Ni; Ag—Au; PdPt; $Pt_{0.5}Au_{0.5}$; $Pt_xY_{1-x}$, wherein Y is selected from the group consisting of cobalt, nickel, vanadium, copper, iron, chromium, palladium, titanium, tungsten, aluminum, silver, copper, gold or combinations thereof, and x is between 0.1 and 0.9; or $Pt_xM_zY_{1-x-z}$ wherein M is selected from the group consisting of iridium, rhenium, cobalt and nickel and combinations thereof, Y is selected from the group consisting of cobalt, nickel, vanadium, copper, iron, chromium, palladium, titanium, tungsten, aluminum, silver, copper, gold or combinations thereof, and x+z is between 0.1 and 0.9.

39. The cell of claim 3, wherein the air contacting electrode comprises a porphyrin comprising one or more metals, or thermal or radiation induced decomposition products of a porphyrin comprising one or more metals.

40. The cell of claim 39, wherein the air contacting electrode comprises a tetraazaazulene.

41. The cell of claim 3, wherein the air contacting electrode comprises cobalt or a compound thereof.

42. The cell of claim 3, wherein the air contacting electrode comprises nickel or a compound thereof.

43. The cell of claim 41, wherein the air contacting electrode comprises a plurality of cobalt particles having a mean diameter of less than 1 micron.

44. The cell of claim 32, wherein the air contacting electrode comprises a manganese oxide and an electrically conductive additive.

45. The cell of claim 44, wherein the air contacting electrode comprises a manganese oxide and electrically conductive carbon.

46. The cell of claim 44, wherein the air contacting electrode comprises a manganese oxide and a plurality of conductive particles comprising a metal.

47. The cell of claim 32, wherein the air contacting electrode comprises a manganese oxide having the general formula $A_aMn_xM_yO_zS_sH_h$; wherein A is chosen from H, Li, Na, K, Rb, Sr or Ag; subscript a is $0.00 \le a < 1.2$; Mn represents manganese; M is chosen from V, Ce, Bi, Ti, Fe, Co, Ni, Zr, La, Yb; O represents oxygen; S represents sulfur; subscript s is $0.00 \le s \le 0.1$; H is chosen from F or Cl; subscript h is $0.00 \le h \le 0.15$; and subscripts x, y, and z have values such that the overall compound is electrically neutral.

48. The cell of claim 41, wherein the air contacting electrode comprises cobalt oxides.

49. The cell of claim 41, wherein the air contacting electrode comprises cobalt and oxygen, wherein cobalt has an oxidation number of from +2 to +8.

50. The cell of claim 49, wherein the air contacting electrode comprises one or more of the following: CoO, $CoO_3$, $CoO_4$, or $Co_3O_4$.

51. The cell of claim 50, wherein the air contacting electrode comprises a plurality of particles comprising CoO, $CoO_3$, $CoO_4$, or $Co_3O_4$ and having a mean particle diameter of less than 1 micron.

52. The cell of claim 32, wherein the air contacting electrode comprises $PbMnO_x$ wherein Pb represents lead, Mn represents manganese, and the subscript x is a number such that the compound is electrically neutral.

53. The cell of claim 3, wherein the air contacting electrode comprises one or more compounds having a stable combination of a transition metal, oxygen, and a lanthanide.

54. The cell of claim 53, wherein the air contacting electrode comprises a plurality of particles of one or more compounds having a stable combination of a transition metal, oxygen, and a lanthanide, wherein the particles have a mean diameter of less than 1 micron.

55. The cell of claim 54, wherein the air contacting electrode comprises $LaMnO_3$.

56. The cell of claim 54, wherein the air contacting electrode comprises a compound having the general formula $LaM_xMn_yO$, wherein La represents lanthanide, M represents a metal, Mn represents manganese, O represents oxygen, and subscripts x, y, and z are numbers such that the compound is electrically stable.

57. The cell of claim 56, wherein the air contacting electrode comprises one or more of: $LaNi_{0.5}Mn_{0.5}O_3$, $LaCu_{0.5}Mn_{0.5}O_3$, $La_{0.8}Sr_{0.2}MnO_3$, $La_{2/3}Ca_{1/3}MnO_3$, or $La_{1/2}Sr_{1/2}MnO_3$.

58. The cell of claim 3, wherein the air contacting electrode comprises a transition metal, an alkali or alkaline earth metal, and a phosphate group, having the general formula $A_xM_yPO_z$ wherein A is an alkali or alkaline earth metal, M is transition metal, and subscripts x and y are numbers such that the compound is stable and the subscript z has a value of about 4.

59. The cell of claim 58, wherein the air contacting electrode comprises $LiMnPO_4$, $LiCoPO_4$, or $LiFePO_4$.

60. The cell of claim 3, wherein the air contacting electrode comprises a compound having a combination of a lanthanide, a metal, a transition metal oxide, and a halogen, having the general formula $Mn_xM_yAzO_aH_b$ wherein Mn is manganese, M is a transition metal, A is an alkali or alkaline earth metal, O is oxygen, H is a halogen, and subscripts x, y, a, and b are values such that the compound is electrically stable.

61. The cell of claim 3, wherein the current collector of the air contacting electrode is coated with an oxygen reduction or water oxidation catalyst.

62. The cell of claim 1, wherein the electrolyte comprises an aqueous chloride based electrolyte.

63. The cell of claim 62, wherein the electrolyte comprises a mixture of soluble chloride salts whose cations are suitable for forming soluble chloride salts in solution.

64. The cell of claim 62, wherein the electrolyte is an aqueous chloride based electrolyte having a pH in the range of about 3 to about 10.

65. The cell of claim 62, wherein the electrolyte is an aqueous chloride based electrolyte having a conductivity greater than 30 (milliohm cm)$^{-1}$.

66. The cell of claim 62, wherein the electrolyte is an aqueous chloride based electrolyte having [Cl−] to [Zn++] ratios of 2 or more.

67. The cell of claim 1, wherein the electrolyte comprises a mixture of soluble salts based on at least one of the following anions: sulfates, nitrates, carbonates, hexafluorosilicates, tetrafluoroborates, methane sulfonates, permanganate, hexafluorophosphates, borates, fluorides, or phosphates.

68. The cell of claim 1, wherein the pH level of the electrolyte is such that $CO_2$ normally present in the air is not absorbed by the electrolyte, and little or no carbonates are formed.

69. The cell of claim 1, wherein the electrolyte further comprises an additive that includes at least one of the following: polyethylene glycols, thiourea, Simethicone, Aloe Vera, sodium dodecasulphate, turkey red oil, rosins or other surfactants.

70. The cell of claim 1, wherein the electrolyte further comprises an additive that includes one or more of the following high hydrogen overpotential chloride salts: tin chloride, tin nitrate, lead chloride, lead nitrate, mercurochloride, cadmium chloride, cadmium nitrate, bismuth nitrate, indium nitrate, indium chloride, or bismuth chloride.

71. The cell of claim 1, wherein the electrolyte further comprises an additive anion including at least one of the following anions: benzoates, iodates, stearates, nitrates, citrates or carbonates.

72. The cell of claim 1, wherein the electrolyte comprises an anion and at least one other anion with a pKa of 2 to 11.

73. The cell of claim 1, wherein the electrolyte comprises a soluble manganese salt.

* * * * *